United States Patent
Wang et al.

(10) Patent No.: US 12,467,043 B2
(45) Date of Patent: Nov. 11, 2025

(54) 3' UTR CRISPR-DCAS 13 ENGINEERING SYSTEM AND METHODS OF USING SAME

(71) Applicants: DUKE UNIVERSITY, Durham, NC (US); BAYLOR COLLEGE OF MEDICINE, Houston, TX (US)

(72) Inventors: Qianben Wang, Durham, NC (US); Fuwen Yuan, Durham, NC (US); Wei Li, Irvine, CA (US)

(73) Assignees: Duke University, Durham, NC (US); Baylor College of Medicine, Houston, TX (US)

( * ) Notice: Subject to any disclaimer, the term of this patent is extended or adjusted under 35 U.S.C. 154(b) by 741 days.

(21) Appl. No.: 17/626,561

(22) PCT Filed: Jul. 13, 2020

(86) PCT No.: PCT/US2020/041840
§ 371 (c)(1),
(2) Date: Jan. 12, 2022

(87) PCT Pub. No.: WO2021/011493
PCT Pub. Date: Jan. 21, 2021

(65) Prior Publication Data
US 2022/0403356 A1  Dec. 22, 2022

Related U.S. Application Data

(60) Provisional application No. 62/873,270, filed on Jul. 12, 2019.

(51) Int. Cl.
C12N 9/22 (2006.01)
C12N 15/11 (2006.01)
C12N 15/113 (2010.01)

(52) U.S. Cl.
CPC ............... *C12N 9/22* (2013.01); *C12N 15/11* (2013.01); *C12N 15/1135* (2013.01); *C12N 2310/14* (2013.01); *C12N 2310/20* (2017.05)

(58) Field of Classification Search
CPC ...... C12N 9/22; C12N 15/11; C12N 15/1135; C12N 2310/20; C12N 2310/14
See application file for complete search history.

(56) References Cited

U.S. PATENT DOCUMENTS

| | | |
|---|---|---|
| 2003/0092898 A1 | 5/2003 | Salceda et al. |
| 2005/0272080 A1 | 12/2005 | Palma et al. |
| 2006/0003322 A1 | 1/2006 | Bentwich |
| 2010/0292933 A1 | 11/2010 | Miller et al. |
| 2016/0002639 A1 | 1/2016 | Bentwich et al. |
| 2017/0332610 A1 | 11/2017 | Voronina et al. |
| 2018/0010134 A1 | 1/2018 | Sharp et al. |
| 2018/0085348 A1 | 3/2018 | Chen et al. |
| 2018/0156800 A1 | 6/2018 | Lin et al. |
| 2019/0002875 A1 | 1/2019 | Cheng et al. |
| 2019/0207890 A1 | 7/2019 | Hsu et al. |

FOREIGN PATENT DOCUMENTS

| | | |
|---|---|---|
| WO | 2017219027 A1 | 12/2017 |
| WO | 2018170333 A1 | 9/2018 |
| WO | 2019084495 A1 | 5/2019 |

OTHER PUBLICATIONS

Curinha et al., "Implications of polyadenylation in health and disease." Nucleus 5:6, 508-519. (Year: 2014).*
Anderson et al., "Targeted Cleavage and Polyadenylation of RNA by CRISPR-Cas13." bioRxiv. Jan. 26, 2019. (Year: 2019).*
Steffan J. J., et al., "The Transcription Factor SPDEF Suppresses Prostate Tumor Metastasis," The Journal of Biological Chemistry, 2012, vol. 287, pp. 29968-29978.
Tate J. G., et al., COSMIC: The Catalogue of Somatic Mutations in Cancer, Nucleic Acids Research, 2019, vol. 47, pp. D941-D947.
Tian B., et al., "Alternative Polyadenylation of mRNA Precursors," Nature Reviews Molecular Cell Biology, 2017, vol. 18, No. 1, pp. 18-30.
Tran C., et al., "Development of a Second-Generation Antiandrogen for Treatment of Advanced Prostate Cancer," Science, 2009, vol. 324, pp. 787-790.
Wang H., et al., "CCI-779 Inhibits Cell-Cycle G2-M Progression and Invasion of Castration-Resistant Prostate Cancer via Attenuation of UBE2C Transcription and mRNA Stability," Cancer Research, Jul. 15, 2011, vol. 71, No. 14, pp. 4866-4876.
Wang Q., et al., "Androgen Receptor Regulates a Distinct Transcription Program in Androgen-Independent Prostate Cancer," Cell, 2009, vol. 138, pp. 245-256.
Wang X., et al., "N(6)-Methyladenosine Modulates Messenger RNA Translation Efficiency," Cell, 2015, vol. 161, No. 6, pp. 1388-1399.
Waters C. E, et al., "The FHIT Gene Product: Tumor Suppressor and Genome "Caretaker"," Cellular and Molecular Life Sciences (CMLS), 2014, vol. 71, pp. 4577-4587.
Watson P. A., et al., "Emerging Mechanisms of Resistance to Androgen Receptor Inhibitors in Prostate Cancer," Nature Reviews Cancer, 2015, vol. 15, No. 12, pp. 701-711.
Xia Z., et al., "Dynamic Analyses of Alternative Polyadenylation from RNA-Seq Reveal a 3'-UTR Landscape Across Seven Tumour Types," Nature Communications, 2014, vol. 5, No. 5274, pp. 1-14.
Yin Y., et al., "N-Myc Promotes Therapeutic Resistance Development of Neuroendocrine Prostate Cancer by Differentially Regulating miR-421/ATM Pathway," Molecular cancer, 2019, vol. 18, No. 11.

(Continued)

*Primary Examiner* — Suzanne M Noakes
*Assistant Examiner* — Ciara A Mcknight
(74) *Attorney, Agent, or Firm* — POLSINELLI PC

(57) ABSTRACT

The present disclosure provides a 3'UTR CRISPR-dCas13 Engineering System, and methods of using said system, that allows for the manipulation of the length of 3' untranslated regions by using gRNAs to guide catalytically dead Cas13 to sites upstream and/or downstream of the desired poly adenylation sites. One aspect of the disclosure provides a system for modifying the length a 3' untranslated region (UTR) of an mRNA transcript.

22 Claims, 22 Drawing Sheets
Specification includes a Sequence Listing.

(56) References Cited

OTHER PUBLICATIONS

Yuan F., et al., "Enhanced NOLC1 Promotes Cell Senescence and Represses Hepatocellular Carcinoma Cell Proliferation by Disturbing the Organization of Nucleolus," Aging Cell, 2017, vol. 16, No. 4, pp. 726-737.

Yuan F., et al., "Nucleolar TRF2 Attenuated Nucleolus Stress-Induced HCC Cell-Cycle Arrest by Altering rRNA Synthesis," Cell Death & Disease, 2018, vol. 9, No. 5:518.

Yuan X., et al., "Androgen Receptor Functions in Castration-Resistant Prostate Cancer and Mechanisms of Resistance to New Agents Targeting the Androgen Axis," Oncogene, May 29, 2014, vol. 33, No. 22, 26 pages.

Zhao J., et al., "Polycomb Proteins Targeted by a Short Repeat RNA to the Mouse X Chromosome," Science, 2008, vol. 322, pp. 750-756.

Zhou H., et al., "FBXO32 Suppresses Breast Cancer Tumorigenesis through Targeting KLF4 to Proteasomal Degradation," Oncogene, 2017, vol. 36, No. 23, pp. 3312-3321.

Jenal et al., "The Poly(A)-Binding Protein Nuclear 1 Suppresses Alternative Cleavage and Polyadenylation Sites", Cell, Apr. 27, 2012, vol. 149, Iss. 3, pp. 538-553.

International Search Report and Written Opinion mailed Oct. 19, 2020 in corresponding International Patent Application No. PCT/US2020/041840.

Jillette et al., "CRISPR Artificial Splicing Factors", bioRxiv, Sep. 30, 2018, pp. 1-15.

Aggarwal R., et al., "Clinical and Genomic Characterization of Treatment-Emergent Small-Cell Neuroendocrine Prostate Cancer: A Multi-institutional Prospective Study," Journal of Clinical Oncology: Official Journal of the American Society of Clinical Oncology, 2018, vol. 36, pp. 2492-2503.

Aparicio A., et al., "Neuroendocrine Prostate Cancer Xenografts with Large-Cell and Small-Cell Features Derived from a Single Patient's Tumor: Morphological, Immunohistochemical, and Gene Expression Profiles," Prostate, 2011, vol. 71, pp. 846-856.

Aparicio A., et al., "Understanding the Lethal Variant of Prostate Cancer: Power of Examining Extremes," Cancer discovery, 2011, vol. 1, pp. 466-468.

Aragon-Ching J. B., "Darolutamide: A Novel Androgen-Signaling Agent in Nonmetastatic Castration-Resistant Prostate Cancer," Asian Journal of Andrology, 2019, vol. 22, pp. 76-78.

Attard G., et al., "Selective Inhibition of CYP17 with Abiraterone Acetate is Highly Active in the Treatment of Castration-Resistant Prostate Cancer, "Journal of Clinical Oncology, Aug. 10, 2009, vol. 27, No. 23, pp. 3742-3748.

Bambury R. M., et al., "Novel and Next-Generation Androgen Receptor-Directed Therapies for Prostate Cancer: Beyond Abiraterone and Enzalutamide," Urologic Oncology, 2016, vol. 34, No. 8, pp. 1-8.

Beltran H., et al., "A Phase II Trial of the Aurora Kinase A Inhibitor Alisertib for Patients with Castration-resistant and Neuroendocrine Prostate Cancer: Efficacy and Biomarkers," Clinical Cancer Research, An Official Journal of the American Association for Cancer Research, 2019, vol. 25, pp. 43-51.

Beltran H., et al., "Divergent Clonal Evolution of Castration-Resistant Neuroendocrine Prostate Cancer," Nature Medicine, 2016, vol. 22, No. 3, pp. 298-305.

Beltran H., et al., "Molecular Characterization of Neuroendocrine Prostate Cancer and Identification of New Drug Targets," Cancer Discovery, 2011, vol. 1, pp. 487-495.

Berkovits B. D., et al., "Alternative 3' UTRs act as Scaffolds to Regulate Membrane Protein Localization," Nature, 2015, vol. 522, pp. 363-367.

Birmingham A., et al., "3' UTR Seed Matches, but not Overall Identity, are Associated with RNAi Off-Targets," Nature Methods, 2006, vol. 3, No. 3, pp. 199-204.

Blee A. M., et al., "Lineage Plasticity-Mediated Therapy Resistance in Prostate Cancer," Asian Journal of Andrology, 2019, vol. 21, pp. 241-248.

Brumbaugh J., et al., "Nudt21 Controls Cell Fate by Connecting Alternative Polyadenylation to Chromatin Signaling," Cell, 2018, vol. 172 (1-2), pp. 106-120.

Chen M., et al., "3' UTR Lengthening as a Novel Mechanism in Regulating Cellular Senescence," Genome Research, 2018, vol. 28, pp. 285-294.

Chen Z., et al., "Diverse AR-V7 Cistromes in Castration-Resistant Prostate Cancer are Governed by HoxB13," Proceedings of the National Academy of Sciences of the United States of America, Jun. 26, 2018, vol. 115, No. 26, pp. 6810-6815.

Chen Z., et al., "Ligand-Dependent Genomic Function of Glucocorticoid Receptor in Triple-Negative Breast Cancer," Nature Communication, Sep. 16, 2015, vol. 6, pp. 1-8.

Culig Z., et al., "Antiandrogens in Prostate Cancer Endocrine Therapy," Current Cancer Drug Targets, 2004, vol. 4, No. 5, pp. 455-461.

Culig Z., et al., "Switch from Antagonist to Agonist of the Androgen Receptor Bicalutamide is associated with Prostate Tumour Progression in a New Model System," British Journal of Cancer, 1999, vol. 81, No. 2, pp. 242-251.

Dardenne E., et al., "N-Myc Induces an EZH2-Mediated Transcriptional Program Driving Neuroendocrine Prostate Cancer," Cancer Cell, 2016, vol. 30, pp. 563-577.

Davies A. H., "Cellular Plasticity and The Neuroendocrine Phenotype in Prostate Cancer," Nature Reviews Urology, 2018, vol. 15, pp. 1-16.

De Bono J.S., et al., "Abiraterone and Increased Survival in Metastatic Prostate Cancer," The New England Journal of Medicine, May 26, 2011, vol. 364, No. 21, pp. 1995-2005.

Debes J.D., et al., "Mechanisms of Androgen-Refractory Prostate Cancer," The New England Journal of Medicine, Oct. 7, 2004, vol. 351, No. 15, pp. 1-3.

Feldman B.J., et al., "The Development of Androgen-Independent Prostate Cancer," Nature Reviews Cancer, Oct. 1, 2001, vol. 1, No. 1, pp. 34-45.

Fizazi K., et al., "Darolutamide in Nonmetastatic, Castration-Resistant Prostate Cancer," The New England Journal of Medicine, Mar. 28, 2019, vol. 380, No. 13, pp. 1235-1246.

Furtado P., et al., "Review of Small Cell Carcinomas of the Prostate," Prostate Cancer, 2011, vol. 2011:543272.

Gao D., et al., "Organoid Cultures Derived from Patients with Advanced Prostate Cancer," Cell, 2014, vol. 159, pp. 176-187.

Keyse S. M., "Dual-specificity MAP Kinase Phosphatases (MKPs) and Cancer," Cancer and Metastasis Reviews, 2008, vol. 27, pp. 253-261.

Konermann S., et al., "Transcriptome Engineering with RNA-Targeting Type VI-D CRISPR Effectors," Cell, Mar. 2018, vol. 173, No. 3, pp. 665-676.

Ku S. Y., et al., "Rb1 and Trp53 Cooperate to Suppress Prostate Cancer Lineage Plasticity, Metastasis, and Antiandrogen Resistance," Science, 2017, vol. 355, pp. 78-83.

Kulkarni J. A., et al., "Design of Lipid Nanoparticles for in Vitro and in Vivo Delivery of Plasmid DNA," Nanomedicine, 2017, vol. 13, pp. 1377-1387.

Lee A. R., et al., "A Novel Mechanism of SRRM4 in Promoting Neuroendocrine Prostate Cancer Development via a Pluripotency Gene Network," EBioMedicine, 2018, vol. 35, pp. 167-177.

Lee J. K., et al., "N-Myc Drives Neuroendocrine Prostate Cancer Initiated from Human Prostate Epithelial Cells," Cancer Cell, 2016, vol. 29, pp. 536-547.

Liao Z., et al., "Energy Balance Alters Dunning R3327-H Prostate Tumor Architecture, Androgen Receptor Expression, and Nuclear Morphometry in Rats," The Prostate, 2006, vol. 66, pp. 945-953.

Liao Z., et al., "Increased Phospho-AKT is Associated with Loss of the Androgen Receptor during the Progression of N-Methyl-N-Nitrosourea-Induced Prostate Carcinogenesis in Rats," The Prostate, 2005, vol. 64, pp. 186-199.

Lipianskaya J., et al., "Androgen-Deprivation Therapy-Induced Aggressive Prostate Cancer with Neuroendocrine Differentiation," Asian Journal of Andrology, 2014, vol. 16, pp. 541-544.

(56) References Cited

OTHER PUBLICATIONS

Liu C., et al., "Niclosamide Inhibits Androgen Receptor Variants Expression and Overcomes Enzalutamide Resistance in Castration-Resistant Prostate Cancer," Clinical Cancer Research, 2014, vol. 20, No. 12, pp. 3198-3210.
Masamha C. P., et al. "CFIm25 Links Alternative Polyadenylation to Glioblastoma Tumour Suppression," Nature, 2014, vol. 510, pp. 412-416.
Mayr C., et al., "Widespread Shortening of 3'UTRs by Alternative Cleavage and Polyadenylation Activates Oncogenes in Cancer Cells," Cell, 2009, vol. 138, No. 4, pp. 673-684.
Mayr C., "Regulation by 3'-Untranslated Regions," Annual Review of Genetics, 2017, vol. 51, pp. 171-194.
Mu P., et al., "SOX2 Promotes Lineage Plasticity and Antiandrogen Resistance in TP53-and RB1-Deficient Prostate Cancer," Science, 2017, vol. 355, pp. 84-88.
Palmgren J. S., et al., "Unusual and Underappreciated: Small Cell Carcinoma of the Prostate," Seminars in Oncology, 2007, vol. 34, pp. 22-29.
Park H. J., et al., "3' UTR Shortening Represses Tumor-Suppressor Genes in Trans by Disrupting ceRNA Crosstalk," Nature Genetics, 2018, vol. 50, pp. 783-789.
Park J. W., et al., "Reprogramming Normal Human Epithelial Tissues to a Common, Lethal Neuroendocrine Cancer Lineage," Science, 2018, vol. 362, pp. 91-95.
Paz I., et al., "RBPmap: A Web Server for Mapping Binding Sites of RNA-Binding Proteins," Nucleic Acids Research, 2014, vol. 42, pp. W361-W367.
Puca L., et al., "Neuroendocrine Differentiation in Prostate Cancer: Emerging Biology, Models, and Therapies," Cold Spring Harbor Perspectives in Medicine, 2019, vol. 9, pp. 1-20.
Robinson D., et al., "Integrative Clinical Genomics of Advanced Prostate Cancer," Cell, 2015, vol. 161, pp. 1215-1228.
Ryan C. J., et al., "Abiraterone in Metastatic Prostate Cancer without Previous Chemotherapy," The New England Journal of Medicine, 2013, vol. 368, pp. 138-148.
Scher H. I., et al., "Increased Survival with Enzalutamide in Prostate Cancer after Chemotherapy," The New England Journal of Medicine, 2012, vol. 367, pp. 1187-1197.
Small E. J., et al., "Characterization of Neuroendocrine Prostate Cancer (NEPC) in Patients with Metastatic Castration Resistant Prostate Cancer (mCRPC) Resistant to Abiraterone (Abi) or Enzalutamide (Enz): Preliminary Results from the SU2C/PCF/AACR West Coast Prostate Cancer Dream Team (WCDT)," Journal of Clinical Oncology, Official Journal of the American Society of Clinical Oncology, 2015, vol. 33:Suppl; abstr 5003.
Sondka Z. et al., "The COSMIC Cancer Gene Census: Describing Genetic Dysfunction across all Human Cancers," Nature Reviews Cancer, 2018, vol. 18, pp. 696-705.
Zhao Wenxue et al: "CRISPR-Cas9-mediated functional dissection of 3'-UTRs", Nucleic Acids Research, vol. 45, No. 18, Oct. 13, 2017 (Oct. 13, 2017), pp. 10800-10810.
Yan W et al: "Cas13d Is a Compact RNA-Targeting Type VI CRISPR Effector Positively Modulated by a WYL-Domain-Containing Accessory Protein", Molecular Cell, vol. 70, No. 2, Apr. 19, 2018 (Apr. 19, 2018), pp. 1-19.
Yuan Fuwen et al: "Alternative polyadenylation of mRNA and its role in cancer", Genes & Diseases, vol. 8, No. 1, Oct. 25, 2019 (Oct. 25, 2019), pp. 61-72.
Bae Bongmin et al: "CRISPR-Mediated Knockout of Long 3' UTR mRNA Isoforms in mESC-Derived Neurons", Frontiers in Genetics, vol. 12, Dec. 17, 2021 (Dec. 17, 2021).

* cited by examiner

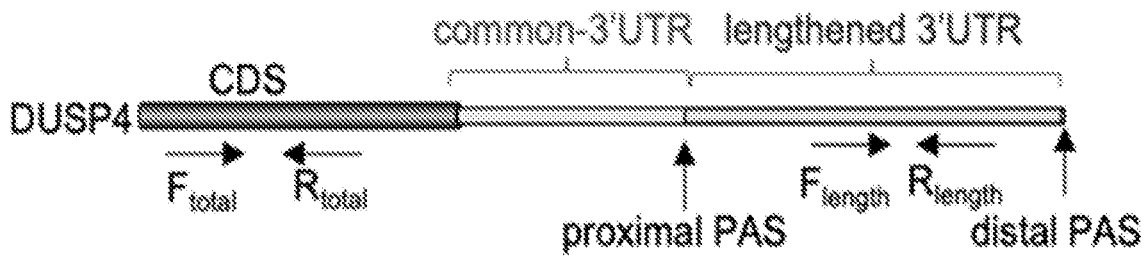
FIG. 12A
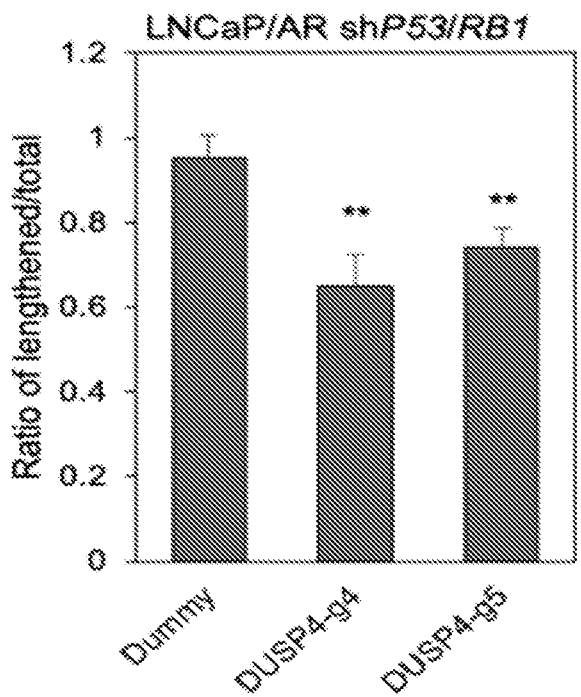 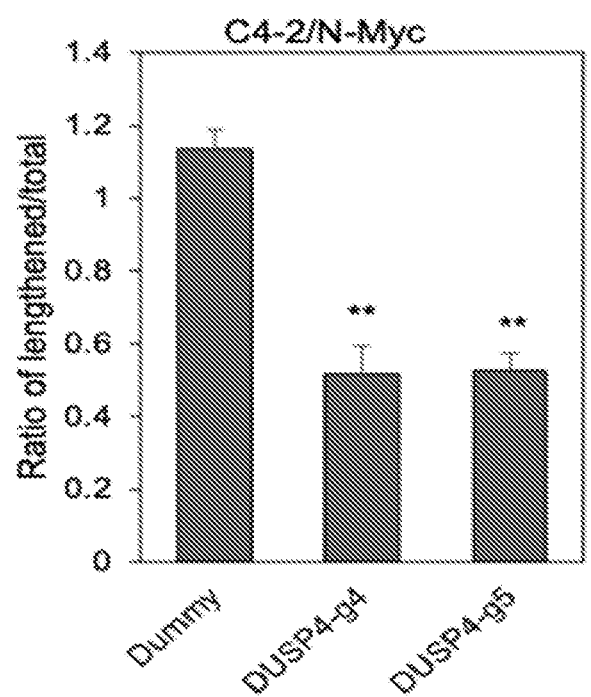
FIG. 12B  FIG. 12C

SEQUENCE LISTING

<160> NUMBER OF SEQ ID NOS: 84

<210> SEQ ID NO 1
<211> LENGTH: 36
<212> TYPE: DNA
<213> ORGANISM: Artificial Sequence
<220> FEATURE:
<223> OTHER INFORMATION: Synthetic nucleic acid

<400> SEQUENCE: 1
caaagtttgg ggctggtcaa ccatccccaa atgaac                                   36

<210> SEQ ID NO 2
<211> LENGTH: 3787
<212> TYPE: DNA
<213> ORGANISM: Artificial Sequence
<220> FEATURE:
<223> OTHER INFORMATION: hU6pregRNA_EF1adCasRx2AEGFP

<400> SEQUENCE: 2

| | |
|---|---|
| atgagcccca agaagaagag aaaggtggga ggccagcatc gaaaaaaaaa agtccttcgc | 60 |
| caagggcatg gccgtgaagt ccacactcgt gtccggctcc aaagtgtaca tgacaacctt | 120 |
| cgccgaaggc agcgacgcca ggctggaaaa gatcgtggag ggcgacagca tcaggagcgt | 180 |
| gaatgagggc gaggccttca gcgctgaaat ggccgataaa aacgccggct ataagatcgg | 240 |
| caacgccaaa ttcagccatc ctaagggcta cgccgtggtg ctaacaaccc tctgtatac | 300 |
| aggacccgtc cagcaggata tgctcggcct gaaggaaact ctggaaaaga ggtacttcgg | 360 |
| cgagagcgct gatggcaatg acaatatttg tatccaggtg atccataaca tcctggacat | 420 |
| tgaaaaaatc ctcgccgaat acattaccaa cgccgcctac gccgtcaaca atatctccgg | 480 |
| cctggataag gacattattg gattcggcaa gttctccaca gtgtatacct acgacgaatt | 540 |
| caaagacccc gagcaccata gggccgcttt caacaataac gataagctca tcaacgccat | 600 |
| caaggcccag tatgacgagt cgacaacttc cctcgataac cccagactcg gctatttcgg | 660 |
| ccaggccttt ttcagcaagg agggcagaaa ttacatcatc aattacgca acgaatgcta | 720 |
| tgacattctg gccctcctga gcggactggc gcactgggtg gtcgctaaca cgaagaaga | 780 |
| gtccaggatc tccaggacct ggctctacaa cctcgataag aacctcgaca cgaatacat | 840 |
| ctccaccctc aactacctct acgacaggat caccaatgag ctgaccaact ccttctccaa | 900 |
| gaactccgcc gccaacgtga actatattgc cgaaactctg ggaatcaacc ctgccgaatt | 960 |
| cgccgaacaa tatttcagat tcagcattat gaaagagcag aaaaacctcg gattcaatat | 1020 |
| caccaagctc agggaagtga tgctggacag gaaggatatg tccgagatca ggaaaaatca | 1080 |
| taaggtgttc gactccatca ggaccaaggt ctacaccatg atggactttg tgatttatag | 1140 |
| gtattacatc gaagaggatg ccaaggtggc tgccgccaat aagtccctcc ccgataatga | 1200 |
| gaagtccctg agcgagaagg atatctttgt gattaacctg aggggctcct tcaacgacga | 1260 |
| ccagaaggat gccctctact acgatgaagc taatagaatt tggagaaagc tcgaaaatat | 1320 |
| catgcacaac atcaaggaat ttagggggaa caagacaaga gagtataaga agaaggacgc | 1380 |
| ccctagactg cccagaatcc tgcccgctgg ccgtgatgtt tccgccttca gcaaactcat | 1440 |
| gtatgccctg accatgttcc tggatggcaa ggagatcaac gacctcctga ccaccctgat | 1500 |
| taataaattc gataacatcc agagcttcct gaaggtgatg cctctcatcg gagtcaacgc | 1560 |
| taagttcgtg gaggaatacg cctttttcaa agactccgcc aagatcgccg atgagctgag | 1620 |
| gctgatcaag tccttcgcta agatgggaga acctattgcc gatgccagga gggccatgta | 1680 |

```
tatcgacgcc atccgtattt taggaaccaa cctgtcctat gatgagctca aggccctcgc   1740
cgacaccttt tccctggacg agaacggaaa caagctcaag aaaggcaagc acggcatgag   1800
aaatttcatt attaataacg tgatcagcaa taaaaggttc cactacctga tcagatacgg   1860
tgatcctgcc cacctccatg agatcgccaa aaacgaggcc gtggtgaagt tcgtgctcgg   1920
caggatcgct gacatccaga aaaacagggc cagaacggcc aagaaccaga tcgacaggta   1980
ctacgaaact tgtatcggaa aggataaggg caagagcgtg agcgaaaagg tggacgctct   2040
cacaaagatc atcaccggaa tgaactacga ccaattcgac aagaaaagga gcgtcattga   2100
ggacaccgga agggaaaacg ccgagaggga gaagtttaaa aagatcatca gcctgtacct   2160
caccgtgatc taccacatcc tcaagaatat tgtcaatatc aacgccaggt acgtcatcgg   2220
attccattgc gtcgagcgtg atgctcaact gtacaaggag aaaggctacg acatcaatct   2280
caagaaactg gaagagaagg gattcagctc cgtcaccaag ctctgcgctg cattgatga   2340 aactgccccc gataagagaa aggacgtgga aaaggagatg gctgaaagag ccaaggagag   2400
cattgacagc ctcgagagcg ccaaccccaa gctgtatgcc aattacatca aatacagcga   2460
cgagaagaaa gccgaggagt tcaccaggca gattaacagg gagaaggcca aaaccgccct   2520
gaacgcctac ctgaggaaca ccaagtggaa tgtgatcatc agggaggacc tcctgagaat   2580
tgacaacaag acatgtaccc tgttcgcaaa caaggccgtc gccctggaag tggccaggta   2640
tgtccacgcc tatatcaacg acattgccga ggtcaattcc tacttccaac tgtaccatta   2700
catcatgcag agaattatca tgaatgagag gtacgagaaa agcagcggaa aggtgtccga   2760
gtacttcgac gctgtgaatg acgagaagaa gtacaacgat aggctcctga aactgctgtg   2820
tgtgcctttc ggctactgta tccccaggtt taagaacctg agcatcgagg ccctgttcga   2880
taggaacgag gccgccaagt tcgacaagga gaaaagaag gtgtccggca attccggatc   2940
cggacctaag aaaaagagga aggtggcggc cgcttaccca tacgatgttc cagattacgc   3000
tgctagcggc agtggagagg gcagaggaag tctgctaaca tgcggtgacg tcgaggagaa   3060
tcctggccca gtgagcaagg gcgaggagct gttcaccggg gtggtgccca tcctggtcga   3120
gctggacggc gacgtaaacg gccacaagtt cagcgtgtcc ggcgagggcg agggcgatgc   3180
cacctacggc aagctgaccc tgaagttcat ctgcaccacc ggcaagctgc ccgtgccctg   3240
gcccaccctc gtgaccaccc tgacctacgg cgtgcagtgc ttcagccgct accccgacca   3300
catgaagcag cacgacttct tcaagtccgc catgcccgaa ggctacgtcc aggagcgcac   3360
catcttcttc aaggacgacg gcaactacaa gacccgcgcc gaggtgaagt tcgagggcga   3420
caccctggtg aaccgcatcg agctgaaggg catcgacttc aaggaggacg gcaacatcct   3480
ggggcacaag ctggagtaca actacaacag ccacaacgtc tatatcatgg ccgacaagca   3540
gaagaacggc atcaaggtga acttcaagat ccgccacaac atcgaggacg gcagcgtgca   3600
gctcgccgac cactaccagc agaacacccc catcggcgac ggccccgtgc tgctgcccga   3660
caaccactac ctgagcaccc agtccgccct gagcaaagac cccaacgaga gcgcgatca   3720 catggtcctg ctggagttcg tgaccgccgc cgggatcact ctcggcatgg acgagctgta   3780
caagtaa                                                            3787
```

<210> SEQ ID NO 3
<211> LENGTH: 24
<212> TYPE: DNA
<213> ORGANISM: Artificial Sequence
<220> FEATURE:

<223> OTHER INFORMATION: Synthetic nucleic acid

<400> SEQUENCE: 3
agccccaaga agaagagaaa ggtg                                                    24

<210> SEQ ID NO 4
<211> LENGTH: 21
<212> TYPE: DNA
<213> ORGANISM: Artificial Sequence
<220> FEATURE:
<223> OTHER INFORMATION: Synthetic nucleic acid

<400> SEQUENCE: 4
cctaagaaaa agaggaaggt g                                                       21

<210> SEQ ID NO 5
<211> LENGTH: 2917
<212> TYPE: DNA
<213> ORGANISM: Artificial Sequence
<220> FEATURE:
<223> OTHER INFORMATION: Synthetic nucleic acid

<400> SEQUENCE: 5

| | |
|---|---|
| ggaggccagc atcgaaaaaa aaaagtcctt cgccaagggc atgggcgtga agtccacact | 60 |
| cgtgtccggc tccaaagtgt acatgacaac cttcgccgaa ggcagcgacg ccaggctgga | 120 |
| aaagatcgtg gagggcgaca gcatcaggag cgtgaatgag ggcgaggcct tcagcgctga | 180 |
| aatggccgat aaaaacgccg gctataagat cggcaacgcc aaattcagcc atcctaaggg | 240 |
| ctacgccgtg gtggctaaca accctctgta tacaggaccc gtccagcagg atatgctcgg | 300 |
| cctgaaggaa actctggaaa agaggtactt cggcgagagc gctgatggca atgacaatat | 360 |
| ttgtatccag gtgatccata acatcctgga cattgaaaaa atcctcgccg aatacattac | 420 |
| caacgccgcc tacgccgtca caatatctc cggcctggat aaggacatta ttggattcgg | 480 |
| caagttctcc acagtgtata cctacgacga attcaaagac cccgagcacc ataggggccgc | 540 |
| tttcaacaat aacgataagc tcatcaacgc catcaaggcc cagtatgacg agttcgacaa | 600 |
| cttcctcgat aaccccagac tcggctattt cggccaggtc tttttcagca aggagggcag | 660 |
| aaattacatc atcaattacg gcaacgaatg ctatgacatt ctggccctcc tgagcggact | 720 |
| ggcgcactgg gtggtcgcta acaacgaaga agagtccagg atctccagga cctggctcta | 780 |
| caacctcgat aagaaccctcg acaacgaata catctccacc ctcaactacc tctacgacag | 840 |
| gatcaccaat gagctgacca actccttctc caagaactcc gccgccaacg tgaactatat | 900 |
| tgccgaaact ctgggaatca accctgccga attcgccgaa caatatttca gattcagcat | 960 |
| tatgaaagag cagaaaaacc tcggattcaa tatcaccaag ctcagggaag tgatgctgga | 1020 |
| caggaaggat atgtccgaga tcaggaaaaa tcataaggtg ttcgactcca tcaggaccaa | 1080 |
| ggtctacacc atgatggact tgtgatttta taggtattac atcgaagagg atgccaaggt | 1140 |
| ggctgccgcc aataagtccc tccccgataa tgagaagtcc ctgagcgaga aggatatctt | 1200 |
| tgtgattaac ctgaggggct ccttcaacga cgaccagaag gatgccctct actacgatga | 1260 |
| agctaataga atttggagaa agctcgaaaa tatcatgcac aacatcaagg aatttagggg | 1320 |
| aaacaagaca agagagtata agaagaagga cgcccctaga ctgcccagaa tcctgcccgc | 1380 |
| tggccgtgat gtttccgcct tcagcaaact catgtatgcc ctgaccatgt tcctggatgg | 1440 |
| caaggagatc aacgacctcc tgaccaccct gattaataaa ttcgataaca tccagagctt | 1500 |
| cctgaaggtg atgcctctca tcggagtcaa cgctaagttc gtggaggaat acgccttttt | 1560 |

```
caaagactcc gccaagatcg ccgatgagct gaggctgatc aagtccttcg ctagaatggg    1620
agaacctatt gccgatgcca ggagggccat gtatatcgac gccatccgta ttttaggaac    1680
caacctgtcc tatgatgagc tcaaggccct cgccgacacc ttttccctgg acgagaacgg    1740
aaacaagctc aagaaggca agcacggcat gagaaatttc attattaata cgtgatcag     1800 caataaaagg ttccactacc tgatcagata cggtgatcct gcccacctcc atgagatcgc    1860
caaaaacgag gccgtggtga agttcgtgct cggcaggatc gctgacatcc agaaaaaaca    1920
gggccagaac ggcaagaacc agatcgacag gtactacgaa acttgtatcg aaaggataa     1980 gggcaagagc gtgagcgaaa aggtggacgc tctcacaaag atcatcaccg aatgaacta     2040 cgaccaattc gacaagaaaa ggagcgtcat tgaggacacc ggcagggaaa acgccgagag    2100
ggagaagttt aaaagatca tcagcctgta cctcaccgtg atctaccaca tcctcaagaa     2160
tattgtcaat atcaacgcca ggtacgtcat cggattccat tgcgtcgagc gtgatgctca    2220
actgtacaag gagaaaggct acgacatcaa tctcaagaaa ctggaagaga agggattcag    2280
ctccgtcacc aagctctgcg ctggcattga tgaaactgcc cccgataaga gaaaggacgt    2340
ggaaaaggag atggctgaaa gagccaagga gagcattgac agcctcgaga gcgccaaccc    2400
caagctgtat gccaattaca tcaaatacag cgacgagaag aaagccgagg agttcaccag    2460
gcagattaac agggagaagg ccaaaaccgc cctgaacgcc tacctgagga acaccaagtg    2520
gaatgtgatc atcagggagg acctcctgag aattgacaac aagacatgta ccctgttcgc    2580
aaacaaggcc gtcgccctgg aagtggccag gtatgtccac gcctatatca acgacattgc    2640
cgaggtcaat tcctacttcc aactgtacca ttacatcatg cagagaatta tcatgaatga    2700
gaggtacgag aaaagcagcg aaaggtgtc cgagtacttc gacgctgtga atgacgagaa     2760
gaagtacaac gataggctcc tgaaactgct gtgtgtgcct ttcggctact gtatcccag     2820 gtttaagaac ctgagcatcg aggccctgtt cgataggaac gaggccgcca agttcgacaa    2880
ggagaaaaag aaggtgtccg gcaattccgg atccgga                             2917
```

<210> SEQ ID NO 6
<211> LENGTH: 36
<212> TYPE: DNA
<213> ORGANISM: Artificial Sequence
<220> FEATURE:
<223> OTHER INFORMATION: Synthetic nucleic acid

<400> SEQUENCE: 6

```
gcggccgctt acccatacga tgttccagat tacgct                              36
```

<210> SEQ ID NO 7
<211> LENGTH: 54
<212> TYPE: DNA
<213> ORGANISM: Artificial Sequence
<220> FEATURE:
<223> OTHER INFORMATION: Synthetic nucleic acid

<400> SEQUENCE: 7

```
gagggcagag gaagtctgct aacatgcggt gacgtcgagg agaatcctgg ccca          54
```

<210> SEQ ID NO 8
<211> LENGTH: 714
<212> TYPE: DNA
<213> ORGANISM: Artificial Sequence
<220> FEATURE:
<223> OTHER INFORMATION: Synthetic nucleic acid

```
<400> SEQUENCE: 8
gtgagcaagg gcgaggagct gttcaccggg gtggtgccca tcctggtcga gctggacggc    60
gacgtaaacg gccacaagtt cagcgtgtcc ggcgagggcg agggcgatgc cacctacggc   120
aagctgaccc tgaagttcat ctgcaccacc ggcaagctgc ccgtgccctg cccaccctc    180 gtgaccaccc tgacctacgg cgtgcagtgc ttcagccgct accccgacca catgaagcag   240
cacgacttct tcaagtccgc catgcccgaa ggctacgtcc aggagcgcac catcttcttc   300
aaggacgacg gcaactacaa gacccgcgcc gaggtgaagt tcgagggcga caccctggtg   360
aaccgcatcg agctgaaggg catcgacttc aaggaggacg gcaacatcct ggggcacaag   420
ctggagtaca actacaacag ccacaacgtc tatatcatgg ccgacaagca gaagaacggc   480
atcaaggtga acttcaagat ccgccacaac atcgaggacg gcagcgtgca gctcgccgac   540
cactaccagc agaacacccc catcggcgac ggccccgtgc tgctgcccga caaccactac   600
ctgagcaccc agtccgccct gagcaaagac cccaacgaga gcgcgatca catggtcctg    660 ctggagttcg tgaccgccgc cgggatcact ctcggcatgg acgagctgta caag         714

<210> SEQ ID NO 9
<211> LENGTH: 15
<212> TYPE: DNA
<213> ORGANISM: Artificial Sequence
<220> FEATURE:
<223> OTHER INFORMATION: Synthetic nucleic acid

<400> SEQUENCE: 9
gctagcggca gtgga                                                    15

<210> SEQ ID NO 10
<211> LENGTH: 900
<212> TYPE: DNA
<213> ORGANISM: Artificial Sequence
<220> FEATURE:
<223> OTHER INFORMATION: Synthetic nucleic acid

<400> SEQUENCE: 10
ctgttagaaa gtgggaatgg ggtccctagc agacttgcct ggaaggagcc tattatagag    60
ggttggttat gttgggagat tgggcctgaa tttctccaca gaaataagtt gccatcctca   120
ggttggccct ttcccaagca ctgtaagtga gtgggtcagg caaagcccca aatgagggt    180 tggttagatt cctgacagtt tgccagccag gccccaccta cagcgtctgt cgaacaaaca   240
gaggtctggt ggttttccct actatcctcc cactcgagag ttcacttctg gttgggagac   300
aggattccta gcacctccgg tgtcaaaagg ctgtcatggg gttgtgccaa ttaattacca   360
aacattgagc ctgcaggctt tgagtgggag tgttgccccc aggagcctta tctcagccaa   420
ttacctttct tgacagtagg agcggcttcc ctctcccatt ccctcttcac tccctttct    480 tccttttcccc tgtcttcatg ccactgcttt cccatgcttc tttcggttg taggggagac   540 tgactgcctg ctcaaggaca ctccctgctg ggcataggat gtgcctgcaa aaagttccct   600
gagcctgtaa gcactccagg tggggaagtg acaggagcc attggtcata accagacaga   660
atttggaaac attttcataa agctccatgg agagttttaa agaaacatat gtagcatgat   720
tttgtaggag aggaaaaaga ttatttaaat aggatttaaa tcatgcaaca acgagagtat   780
cacagccagg atgacccttg ggtcccattc ctaagacatg gttactttat tttcccttg    840 ttaagacata ggaagactta attttttaaac ggtcagtgtc cagttgaagg cagaacacta   900
```

```
<210> SEQ ID NO 11
<211> LENGTH: 300
<212> TYPE: DNA
<213> ORGANISM: Artificial Sequence
<220> FEATURE:
<223> OTHER INFORMATION: Synthetic nucleic acid

<400> SEQUENCE: 11
accggcatcc gtagccatgg acagaggtcc ctggtcttcc ctcatcctcc gtggctgcct      60
ccatgggaca aggaccgatt ccaacacagg ctcctctttc cccttcccg acatcagcag     120 aaggcagcat ccctgcatgc cgtccgtata caacccctct ttgaaaaaag acacagagaa    180
taaactccta cgaaagccct acattgagct ccaatctgct cggggtggga cgggtgcttc    240
ccacacctct gggagaaggc tgcagccacc tgggggtccc agggtggtgg ggtggcagg    300

<210> SEQ ID NO 12
<211> LENGTH: 300
<212> TYPE: DNA
<213> ORGANISM: Artificial Sequence
<220> FEATURE:
<223> OTHER INFORMATION: Synthetic nucleic acid

<400> SEQUENCE: 12
gagctccgct aagacctccc caccccgct gggggtgggg gcgggtgtcc gtccggaaat      60
gaaggaatag cccgaggacc gggctggggt ttatttaaac tgttctgtgt gggtctgggg    120
agggagagca ccttaatatt attggggttg gttggggtgg ggcaggatct cagccataaa    180
gtgccagttt gcttagttct cactgtctcc tggtctgtgc tgccctgctc tggggatgca    240
cggcggcagg gtgggggagg gaggttcctc gcaggtctca gcccgggaca gggtcttgca    300

<210> SEQ ID NO 13
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 13
ccccaataat attaaggtgc tc                                               22

<210> SEQ ID NO 14
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 14
gagcacctta atattattgg gg                                               22

<210> SEQ ID NO 15
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 15
caccccaacc aaccccaata at                                               22

<210> SEQ ID NO 16
<211> LENGTH: 22
<212> TYPE: DNA
```

```
<213> ORGANISM: Artificial Sequence
<220> FEATURE:
<223> OTHER INFORMATION: Synthetic nucleic acid

<400> SEQUENCE: 16
attattgggg ttggttgggg tg                                           22

<210> SEQ ID NO 17
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 17
gagatcctgc cccaccccaa cc                                           22

<210> SEQ ID NO 18
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 18
ggttggggtg gggcaggatc tc                                           22

<210> SEQ ID NO 19
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 19
cactttatgg ctgagatcct gc                                           22

<210> SEQ ID NO 20
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 20
gcaggatctc agccataaag tg                                           22

<210> SEQ ID NO 21
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 21
taagcaaact ggcactttat gg                                           22

<210> SEQ ID NO 22
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 22
ccataaagtg ccagtttgct ta                                           22
```

<210> SEQ ID NO 23
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 23
gacagtgaga actaagcaaa ct                                              22

<210> SEQ ID NO 24
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 24
agtttgctta gttctcactg tc                                              22

<210> SEQ ID NO 25
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 25
cacagaccag gagacagtga ga                                              22

<210> SEQ ID NO 26
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 26
tctcactgtc tcctggtctg tg                                              22

<210> SEQ ID NO 27
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 27
agagcagggc agcacagacc ag                                              22

<210> SEQ ID NO 28
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 28
ctggtctgtg ctgccctgct ct                                              22

<210> SEQ ID NO 29
<211> LENGTH: 22
<212> TYPE: DNA
<213> ORGANISM: Artificial Sequence
<220> FEATURE:

<223> OTHER INFORMATION: Synthetic nucleic acid

<400> SEQUENCE: 29
ccgtgcatcc ccagagcagg gc    22

<210> SEQ ID NO 30
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 30
gccctgctct ggggatgcac gg    22

<210> SEQ ID NO 31
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 31
cccaccctgc cgccgtgcat cc    22

<210> SEQ ID NO 32
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 32
ggatgcacgg cggcagggtg gg    22

<210> SEQ ID NO 33
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 33
gaacctccct cccccaccct gc    22

<210> SEQ ID NO 34
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 34
gcagggtggg ggagggaggt tc    22

<210> SEQ ID NO 35
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 35
gtatacggac ggcatgcagg ga    22

```
<210> SEQ ID NO 36
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 36
tccctgcatg ccgtccgtat ac                                              22

<210> SEQ ID NO 37
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 37
caaagagggg ttgtatacgg ac                                              22

<210> SEQ ID NO 38
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 38
gtccgtatac aacccctctt tg                                              22

<210> SEQ ID NO 39
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 39
tgtgtctttt ttcaaagagg gg                                              22

<210> SEQ ID NO 40
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 40
cccctctttg aaaaaagaca ca                                              22

<210> SEQ ID NO 41
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 41
gagtttattc tctgtgtctt tt                                              22

<210> SEQ ID NO 42
<211> LENGTH: 22
<212> TYPE: DNA
<213> ORGANISM: Artificial Sequence
<220> FEATURE:
<223> OTHER INFORMATION: Synthetic nucleic acid
```

```
<400> SEQUENCE: 42
aaaagacaca gagaataaac tc                                              22

<210> SEQ ID NO 43
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 43
gggctttcgt aggagtttat tc                                              22

<210> SEQ ID NO 44
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 44
gaataaactc ctacgaaagc cc                                              22

<210> SEQ ID NO 45
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 45
gagctcaatg tagggctttc gt                                              22

<210> SEQ ID NO 46
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 46
acgaaagccc tacattgagc tc                                              22

<210> SEQ ID NO 47
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 47
ccgagcagat tggagctcaa tg                                              22

<210> SEQ ID NO 48
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 48
cattgagctc caatctgctc gg                                              22

<210> SEQ ID NO 49
<211> LENGTH: 22
```

<212> TYPE: DNA
<213> ORGANISM: Artificial Sequence
<220> FEATURE:
<223> OTHER INFORMATION: Synthetic nucleic acid

<400> SEQUENCE: 49
acccgtccca ccccgagcag at                                              22

<210> SEQ ID NO 50
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 50
atctgctcgg ggtgggacgg gt                                              22

<210> SEQ ID NO 51
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 51
ggtgtgggaa gcacccgtcc ca                                              22

<210> SEQ ID NO 52
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 52
tgggacgggt gcttcccaca cc                                              22

<210> SEQ ID NO 53
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 53
ccttctccca gaggtgtggg aa                                              22

<210> SEQ ID NO 54
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 54
ttcccacacc tctgggagaa gg                                              22

<210> SEQ ID NO 55
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 55
aggtggctgc agccttctcc ca                                              22

<210> SEQ ID NO 56
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 56
tgggagaagg ctgcagccac ct                                              22

<210> SEQ ID NO 57
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 57
ccccaataat attaaggtgc tc                                              22

<210> SEQ ID NO 58
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 58
caccccaacc aaccccaata at                                              22

<210> SEQ ID NO 59
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 59
gagatcctgc cccaccccaa cc                                              22

<210> SEQ ID NO 60
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 60
cactttatgg ctgagatcct gc                                              22

<210> SEQ ID NO 61
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 61
taagcaaact ggcactttat gg                                              22

<210> SEQ ID NO 62
<211> LENGTH: 22
<212> TYPE: DNA
<213> ORGANISM: Artificial Sequence

```
<220> FEATURE:
<223> OTHER INFORMATION: Synthetic nucleic acid

<400> SEQUENCE: 62
gacagtgaga actaagcaaa ct                                              22

<210> SEQ ID NO 63
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 63
cacagaccag gagacagtga ga                                              22

<210> SEQ ID NO 64
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 64
agagcagggc agcacagacc ag                                              22

<210> SEQ ID NO 65
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 65
ccgtgcatcc ccagagcagg gc                                              22

<210> SEQ ID NO 66
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 66
cccaccctgc cgccgtgcat cc                                              22

<210> SEQ ID NO 67
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 67
gaacctccct cccccaccct gc                                              22

<210> SEQ ID NO 68
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 68
gtatacggac ggcatgcagg ga                                              22
```

```
<210> SEQ ID NO 69
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 69
caaagagggg ttgtatacgg ac                                              22

<210> SEQ ID NO 70
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 70
tgtgtctttt ttcaaagagg gg                                              22

<210> SEQ ID NO 71
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 71
gagtttattc tctgtgtctt tt                                              22

<210> SEQ ID NO 72
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 72
gggctttcgt aggagtttat tc                                              22

<210> SEQ ID NO 73
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 73
gagctcaatg tagggctttc gt                                              22

<210> SEQ ID NO 74
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 74
ccgagcagat tggagctcaa tg                                              22

<210> SEQ ID NO 75
<211> LENGTH: 22
<212> TYPE: DNA
<213> ORGANISM: Artificial Sequence
<220> FEATURE:
<223> OTHER INFORMATION: Synthetic nucleic acid
```

<400> SEQUENCE: 75
acccgtccca ccccgagcag at                                    22

<210> SEQ ID NO 76
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 76
ggtgtgggaa gcacccgtcc ca                                    22

<210> SEQ ID NO 77
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 77
ccttctccca gaggtgtggg aa                                    22

<210> SEQ ID NO 78
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 78
aggtggctgc agccttctcc ca                                    22

<210> SEQ ID NO 79
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 79
aataaataaa accagacata tt                                    22

<210> SEQ ID NO 80
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 80
aatatgtctg gttttattta tt                                    22

<210> SEQ ID NO 81
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 81
tggttgaaaa tgtatttatt tt                                    22

<210> SEQ ID NO 82

```
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 82
aaaataaata cattttcaac ca                                              22

<210> SEQ ID NO 83
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 83
aataaataaa accagacata tt                                              22

<210> SEQ ID NO 84
<211> LENGTH: 22
<212> TYPE: DNA
<213> ORGANISM: Artificial Sequence
<220> FEATURE:
<223> OTHER INFORMATION: Synthetic nucleic acid

<400> SEQUENCE: 84
tggttgaaaa tgtatttatt tt                                              22
```

3' UTR CRISPR-DCAS 13 ENGINEERING SYSTEM AND METHODS OF USING SAME

CROSS REFERENCE TO RELATED APPLICATIONS

This application is a U.S. national phase application under 35 U.S.C. § 371 of International Application No. PCT/US2020/041840, filed on Jul. 13, 2020 which claims priority to U.S. Provisional Patent Application Ser. No. 62/873,270, filed Jul. 12, 2019, the contents of each of which are hereby incorporated by reference in their entirety.

FEDERAL FUNDING LEGEND

This invention was made with government support under Grant Nos. W81XWH-20-1-0068 and W81XWH-20-1-0183 awarded by the Department of Defense. The Federal Government has certain rights to this invention.

INCORPORATION BY REFERENCE OF SEQUENCE LISTING PROVIDED ELECTRONICALLY

This application contains a Sequence Listing submitted as an electronic text file named "20-1069-WO_Sequence-Listing_ST25.txt," having a size in bytes of 28 kb, and created on Jul. 13, 2020. The information contained in this electronic file is hereby incorporated by reference in its entirety.

BACKGROUND

Field

The present disclosure provides a 3'UTR CRISPR-dCas13 Engineering System, and methods of using said system, that allows for the manipulation of the length of 3' untranslated regions by using gRNAs to guide catalytically dead Cas13 to sites upstream and/or downstream of the desired polyadenylation sites.

Description of the Related Art

While primary localized prostate cancer is curable, advanced androgen-dependent prostate cancer (ADPC) ultimately progresses to lethal castration-resistant prostate cancer (CRPC) (Feldman et al., Nat Rev Cancer, (2001) 1(1): 34-45; Debes et al., NEJM (2004) 351(15):1488-90). Contemporary therapy for CRPC employs agents (e.g. enzalutamide) targeting the androgen receptor (AR) transcription axis (Culig et al. Curr Cancer Drug Targets. 2004; 4(5):455-61; Bambury et al. Urol Oncol. 2016; 34(8):348-55). However, these agents only provide a temporary response and modest increase in survival (Watson et al. Nat Rev Cancer. 2015; 15(12):701-11).

Androgen-deprivation therapies (ADT) have been the mainstay of treatment for advanced ADPC for over 70 years. While such therapies initially lead to disease regression, patients will ultimately progress to castration-resistant prostate adenocarcinoma (CRPC) that will eventually lead to death (Feldman et al. Nat Rev Cancer 2001; 1:34-45; Debes et al. NEJM 2004; 351:1488-90). Several new agents targeting reactivated androgen receptor (AR) pathways in CRPC, including abiraterone acetate (Attard et al. Journal of Clinical Oncology 2009; 27:3742-8; de Bono et al. NEJM 2011; 364:1995-2005; Ryan et al. NEJM 2013; 368:138-48), enzalutamide (Tran et al. Science 2009; 324:787-90; Scher et al. NEJM 2012; 367:1187-97), and darolutamide (Fizazi et al. NEJM 2019; 380:1235-46) have recently demonstrated strong anti-cancer activity and clinical benefit. However, these agents have not vastly improved overall survival in CRPC patients, due to the rapid development of resistance (Yuan et al. Oncogene 2014; 33:2815-25; Watson et al. Nat Rev Cancer 2015; 15:701-11). Neuroendocrine prostate cancer (NEPC) is an important aggressive subtype of prostate cancer that rarely arises de novo, but it is present in up to 20% of CRPC patients who have failed AR-targeted therapies (Aparicio et al. Cancer Discovery 2011; 1:466-8; Davies et al. Nat Rev Urol 2018; 15:271-86). NEPC can be treatment-induced from the use of AR antagonists (e.g., enzalutamide and bicalutamide). Treatment-induced NEPC is distinct from primary NEPC because patients with these tumors usually have a history of, or concomitant, typical prostatic adenocarcinoma, and have received single or multiple rounds of radiation therapy or chemotherapy. Treatment-induced NEPC is a clinical challenge. NEPC is rapidly fatal and currently has no standard therapy that is effective. Thus, there is an urgent need to uncover molecular mechanisms to enable the development of targeted therapies.

Recent studies have found various genetic and epigenetic changes that facilitate aberrant oncogenetic transcriptional regulation driving NEPC. In the context of genetic alternations in RB1 and TP53 that characterize the majority of NEPC, transcription factors/components such as SOX2, SRRM4, LHX2 and ISL1 are highly expressed in NEPC and regulate target genes that contribute to cell growth and resistance to AR inhibitors (Mu et al. Science 2017; 355: 84-8; Ku et al. Science 2017; 355:78-83; Lee et al. EBioMedicine 2018; 35:167-77; Park et al. Science 2018; 362: 91-5). In addition to genetic disruption of tumor suppressor genes, genomic amplification and overexpression of the MYCN oncogene induces an EZH2-regulated transcriptional program, driving the NEPC phenotype (Lee et al. Cancer Cell 2016; 29:536-47; Dardenne et al. Cancer Cell 2016; 30:563-77). One of the main epigenetic changes during progression from CRPC to NEPC occurs at the level of DNA methylation (Beltran et al. Nature Medicine 2016; 22:298-305). The transcriptional regulator SPDEF is hyper-methylated and under-expressed in NEPC (Beltran et al. Nature Medicine 2016; 22:298-305), inhibiting its function to suppressing tumor growth and metastasis (Beltran et al. Nature Medicine 2016; 22:298-305; Steffan et al. The Journal of Biological Chemistry 2012; 287:29968-78). Although these studies have identified multiple transcriptional components that may serve as therapeutic targets, clinical trials of inhibitors that target the transcriptional machinery have so far produced disappointing results. For example, the AURKA inhibitors danusertib and alisertib, designed to disrupt the formation of the AURKA-MYCN complex, have yielded only a modest benefit in clinical trials (Davies et al. Nat Rev Urol 2018; 15:271-86; Beltran et al. Clinical Cancer Research 2019; 25:43-51).

Length changes of 3' untranslated region (3'UTR) in mRNA encoding genes impact various aspects of posttranscriptional gene regulation including mRNA stability, translation, and protein localization. Previous studies by the inventors have found that 3'UTR is shortened in various cancer samples compared with paired normal tissues, including bladder urothelial carcinoma (BLCA), head and neck squamous cell carcinoma, lung squamous cell carcinoma (LUSC), lung adenocarcinoma (LUAD), breast invasive carcinoma (BRCA), kidney renal clear cell carcinoma (KIRC) and uterine corpus endometrioid carcinoma (UCEC)

(see, e.g., Xia et al. *Nat Commun*, 5: 5274, 2014). As described herein, the inventors have found that 3'UTR lengths are significantly shortened in lethal castration-resistant adenocarcinoma (CRPC) patients compared with primary prostate cancer patients, and that 3'UTR lengths are significantly lengthened in neuroendocrine prostate cancer (NEPC) compared with CRPC. Interestingly, the inventors have also found that genes with 3' UTR length changes during prostate cancer progression promote CRPC and NEPC cell growth and invasion. These findings raised an important question of whether it is possible to manipulate 3' UTR lengths, thus impairing oncogenic function of 3' UTR controlled genes and inhibiting cancer growth. While manipulation expression of polyadenylation machinery factors (e.g. CFIM25) can globally regulate 3' UTR length (see, e.g., Masamha et al. *Nature*, 510: 412-6, 2014; Brumbaugh et al. *Cell*, 172: 106-120; 2018), current technologies are not able to directly manipulate the length of a desired 3' UTR.

Thus, there is a need for identification of novel oncogenic gene regulatory mechanisms fundamental to NEPC growth and development of novel targeted therapies for NEPC.

BRIEF SUMMARY OF THE DISCLOSURE

The present disclosure provides, in part, a 3'UTR CRISPR-dCas13 Engineering System (termed "3' UTRCES"), and methods of using said system, that allows for the manipulation of the length of 3' untranslated regions by using gRNAs to guide catalytically dead Cas13 to sites upstream and/or downstream of the desired polyadenylation sites.

One aspect of the disclosure provides a system for modifying the length a 3' untranslated region (UTR) of an mRNA transcript, the system comprising one or more nucleic acid molecules comprising: (i) a nucleic acid sequence encoding a direct repeat RNA sequence that can bind a catalytically dead Cas13; (ii) a nucleic acid sequence encoding a guide RNA (gRNA) sequence that can bind to a target site that is proximal and/or distal to a polyadenylation site (PAS) of the 3' UTR of the mRNA transcript; and (iii) a nucleic acid sequence encoding a catalytically dead Cas13, wherein the system causes modification of the length of the 3' untranslated region (UTR) of an mRNA transcript.

In some embodiments of the disclosure, the system components (i), (ii), and (iii) are located on the same nucleic acid molecule. In other embodiments of the disclosure, the system components (i) and (ii) are located on the same nucleic acid molecule and component (iii) is located on a separate nucleic acid molecule.

In some embodiments of the disclosure, the catalytically dead Cas13 is dCas13a, dCas13b, dCas13c, or dCas13d. In other embodiments of the disclosure, the catalytically dead Cas13 is Cas13d-NLS from *Ruminococcus flavefaciens* XPD3002 (dCasRx).

In some embodiments of the disclosure, the one or more nucleic acids molecules are contained in one or more vectors.

In some embodiments of the disclosure, the target site is proximal to the PAS of the 3' UTR of the mRNA transcript. In other embodiments of the disclosure, the target site is distal to the PAS of the 3' UTR of the mRNA transcript.

In some embodiments of the disclosure, the mRNA transcript is from a CDC26, INPPL1, DLL1, HEATR3, SLC25A40, SPSB1, MRI1, MED18, GABPA, and/or TTC8 gene.

In some embodiments of the disclosure, the mRNA transcript is from a DUSP4, TUBB2B, ELAV1, CHGA, MAP3K4, and/or FHIT gene.

In some embodiments of the disclosure, the vector comprises a viral vector or non-viral vector. In some embodiments of the disclosure, the vector comprises a dCas13d gRNA all-in-one vector (e.g., hU6pregRNA_EF1adCasRx2AEGFP). In other embodiments of the disclosure, the vector comprises a lenti-gRNA-RFP-PuroR and/or a lenti-dCas13Rx-EGFP vector. In other embodiments of the disclosure, the vector comprises a nucleic acid sequence set forth in SEQ ID NO:02 or a sequence having at least 50%-90% sequence identity to the sequence set forth in SEQ ID NO:02.

In some embodiments of the disclosure, the gRNA sequence targets an INPPL1 mRNA transcript (e.g., g3, g6, or g10). In some embodiments of the disclosure, the gRNA sequence targets a SPSB1 mRNA transcript (e.g., g3, g6, or g10).

In some embodiments of the disclosure, the gRNA sequence targets a DUSP4 mRNA transcript (e.g., g4 or g5).

Another aspect of the disclosure provides a method of modifying the length of a 3' UTR of an mRNA transcript, the method comprising: introducing into a cancer cell a system for modifying the length a 3' untranslated region (UTR) of an mRNA transcript, the system comprising one or more nucleic acid molecules comprising: (i) a nucleic acid sequence encoding a direct repeat RNA sequence that can bind a catalytically dead Cas13; (ii) a nucleic acid sequence encoding a guide RNA (gRNA) sequence that can bind to a target site that is proximal and/or distal to a polyadenylation site (PAS) of the 3' UTR of the mRNA transcript; and (iii) a nucleic acid sequence encoding a catalytically dead Cas13, wherein the system causes modification of the length of the 3' untranslated region (UTR) of an mRNA transcript, wherein the system causes modification of the length of the 3' UTR of the mRNA relative to a cancer cell that has not been transformed with the system.

In some embodiments of the disclosure, the modification of the 3' UTR causes the 3' UTR to increase, decrease, or stay about the same length.

In some embodiments of the disclosure, the modification of the 3' UTR prevents the progression of a prostate cancer cell to an advanced androgen-dependent prostate cancer (ADPC) cell, castration-resistant prostate cancer (CRPC) cell, or a neuroendocrine prostate cancer (NEPC) cell.

In some embodiments of the disclosure, the 3' UTRCES system prevents PAS cleavage or polyadenylation.

In some embodiments, the cancer cell is a primary prostate cancer cell, an ADPC cell, a CRPC cell, or a NEPC cell.

Another aspect of the disclosure provides a method of treating or preventing the progression of prostate cancer, the method comprising administering to a subject a therapeutically effective amount of a 3' UTRCES system.

In some embodiments of the disclosure, the prostate cancer is CRPC or NEPC.

In some embodiments of the disclosure, the method further comprises improving sensitivity to an androgen receptor (AR) inhibitor (e.g., enzalutamide, bicalutamide, abiraterone acetate, darolutamide or apalutamide).

In some embodiments of the disclosure, the 3' UTRCES system is contained in a lipid nanoparticle. In other embodiments, the lipid nanoparticle comprises or consists of DLin-KC2-DMA, DOPE, Cholesterol, and PEG-DMG.

Yet another aspect of the disclosure provides a method of identifying usable dCas13 blocking sites in a 3' UTR region of an mRNA transcript, the method comprising (i) introducing into a cell a nucleic acid molecule comprising nucleic acid sequences encoding a luciferase protein, a repressor-3'UTR sequence, a target PAS sequence, a direct repeat RNA sequence, a gRNA sequence that can bind to a site that is proximal or distal to the target PAS, and a nucleic acid sequence encoding a catalytically dead Cas13 protein (e.g., dCasRx); and (ii) measuring luciferase activity post-transfection for identifying a gRNA with improved manipulation efficiency relative to other gRNA sequences that are tested.

In some embodiments of the disclosure, the target mRNA transcript is an mRNA transcript that exhibits 3' UTR lengthening or shortening in prostate cancer.

In some embodiments of the disclosure, decreased luciferase activity relative to a control sample indicates a gRNA with improved manipulation efficiency. In some embodiments of the disclosure, decreased luciferase activity relative to other gRNA sequences tested indicates a gRNA with improved manipulation efficiency.

BRIEF DESCRIPTION OF THE DRAWINGS

FIG. 1A are graphs showing DaPars analysis of RNA-seq data from CRPC and TCGA (primary prostate cancer) patient datasets (left panel). The difference in Percentage of Distal polyA site Usage Index (PDUI) is calculated to identify 3'UTR shortening (dark dots towards lower right corner) or lengthening (dark dots towards upper left corner) in transcripts from CRPC compared with primary cancer. DaPars analysis of RNA-seq data from NEPC and CRPC patient datasets (right panel). The difference in Percentage of Distal polyA site Usage Index (PDUI) is calculated to identify 3'UTR lengthening (dark dots towards upper left corner) or shortening (dark dots towards lower right corner) in transcripts from NEPC compared with CRPC. FIG. 1B are UCSC genome browser views of RNA-seq signals over the INPPL1 locus in CRPC and TCGA data sets (Left) and the DUSP4 locus in CRPC and NEPC data sets (Right).

FIG. 4A is a graph showing biological process analysis of 3'UTR shortened genes in CRPC vs. primary cancer. FIG. 4B is a graph showing biological process analysis of 3'UTR lengthened genes in NEPC vs. CRPC. The GO biological process analysis was performed using the Genomatix Software Suite.

FIGS. SA-5B show that 3'UTR shortening is associated with prostate cancer progression.

FIG. 6A are graphs showing that knockdown of INPPL1, SPSB1 and SLC25A40 in 22RV1 cells inhibited cell proliferation. FIG. 6B are representative photomicrographs showing that knockdown of SPSB1 or DLL1 decreases colony formation of 22RV1 cells (left); right is a graph showing quantification of colonies after siRNA.

FIG. 7A is a schematic showing the location of gRNAs targeting around the pPAS of candidate genes in CRPC cell lines.

FIG. 7I is a schematic showing the pSTUB system, which consists of psiCHECK2 (psiC), pSTAR bearing MLI-3'UTR fragment (termed repressor-3'UTR), pSTUB containing the target gene's PAS upstream of the repressor-3'UTR and pSTUB$^{dCas13d}$. FIG. 7C is a graph showing luciferase activity of pSTUB and pSTUB$^{dCas13d}$ and gRNA-guided dCas13d blocking of proximal PAS sites in INPPL1 were transfected into 22RV1(CRPC) cells for 72 hr. FIG. 7D is a graph showing luciferase activity of pSTUB and pSTUB$^{dCas13d}$ and gRNA-guided dCas13d blocking of proximal PAS sites in INPPL1 were transfected into 22RV1 (CRPC) cells for 72 hr. FIG. 7E is a graph showing luciferase activity of pSTAR, pSTUB and pSTUB$^{dCas13d}$ and gRNA-guided dCas13d blocking of proximal PAS sites in SLC25A40 when transfected into 22RV1 (CRPC) cells for 72 hr. The relative luciferase activity (average±standard deviation [SD]) was determined. **, p<0.01; *, p<0.05. FIG. 7F is a diagram representation of the hU6-pregRNA_EF1a-dCasRx-2A-EGFP vector that can express both pre-gRNA and dCasRx (dCas13d).

FIG. 8A is a diagram representation of primer pairs target positions used to quantify the total mRNA and long isoform mRNA of target genes. FIG. 5B is a graph showing the expression levels of total mRNA and long isoform mRNA for nine candidate genes were determined by quantitative RT-PCR using the indicated primer pairs. FIG. 8C is a comparison of total mRNA expression from the six 3'UTR lengthened genes, DUSP4, TUBB2B, ELAVL1, CHGA, M4P3K4, and FHIT, in LNCaP/AR shTP53/RB1 versus LNCaP/AR shNT. **, P<0.01, *, P<0.05. FIG. 8D is a graph showing comparison of total mRNA expression from RNA-seq data of the six 3'UTR lengthened genes from FIG. 8C in RNA-seq data from NEPC patient samples (n=15) versus CRPC patient samples (n=76) (P=0.0582). Expression (FKPM) was estimated by counting all nucleotides mapped to each gene and were normalized by the total number of mapped nucleotides (per million) and the gene length (per Kb).

FIG. 9A are graphs showing quantification DUSP4 or FIT mRNA silencing of invaded LNCaP/AR shTP53/RB1 and C4-2/N-Myc cells after siRNA transfection. siControl is the Dharmacon siControl On-Target pool. FIG. 9B are graphs showing cell proliferation assays show that FHIT knockdown inhibits LNCaP/AR shTP53/RB1 and C4-2/N-Myc cell proliferation, while DUPS4 silencing decreases C4-2/N-Myc cell proliferation. **P<0.01. FIG. 9C are representative images of xenografts from stable DUSP4-silenced and control-silenced LNCaP/AR shTP53/RB1 cells. FIG. 9D is a graph showing tumor weights from the indicated groups were statistically analyzed (n=4). *p<0.05, **p<0.01.

FIG. 10A is a diagram representation of gRNA target positions used for dPAS blocking (identified dPAS). FIG. 10B is a schematic of the pSTUB system consists of psiCHECK2 (psiC) dual luciferase vectors, pSTAR bearing the MLL-3' UTR fragment (termed repressor-3'UTR), pSTUB containing the target gene's PAS upstream of the repressor-3'UTR, and pSTUB$^{dCas13d}$ containing gRNA to guide dCas13d to the target gene's PAS. FIG. 10C is a graph showing luciferase activity of pSTUB and pSTUB$^{dCas13d}$ were transfected into prostate cancer cells for 72 hr. *Renilla* luciferase activity was determined. **, P<0.01.

FIGS. 12A-12C show that manipulation of 3'UTR length of the endogenously expressed DUSP4 by 3'UTRCES. FIG. 12A is a diagram representation of primer pair target positions used to detect the total and long isoform DUSP4 mRNA, FIG. 12B is a graph showing the ratio of lengthening in LNCaP/AR shTP53/RB1 cells that were transfected with dCas13d-gRNA all-in-one vector (see FIG. 7F) bearing Dummy or DUSP4-g4 or DUSP4-g5. FIG. 12C is a graph showing the ratio of lengthening in C4-2/N-Myc cells that were transfected with dCas13d-gRNA all-in-one vector (see FIG. 7F) bearing Dummy or DUSP4-g4 or DUSP4-g5. Total and long isoform DUSP4 mRNA were determined by quantitative RT-PCR using the indicated primer pairs. **, P<0.01.

FIG. 14A is a schematic showing the lentivirus gRNA (see FIG. 14B; Lenti-gRNA-RFP-PuroR) and dCasRx plasmids (Addgene #109050) system.

FIG. 143 is a schematic showing that the Lenti-gRNA-RFP-PuroR vector (Right) was generated based the pCRISPR-LvSG03 (Left, GeneCopoeia, Inc.) by deleting T7 promoter, followed by inserting dCasRx DR and gRNA downstream of U6 promoter.

FIG. 15A is a graph showing Real-time PCR measurement of the editing efficiency of 3'UTRCES on endogenous gene INPPL1. FIG. 15B is a graph showing Real-time PCR measurement of the editing efficiency of 3'UTRCES on endogenous gene SPSB1. *, p<0.05, **, p<0.01.

FIG. 16A is a graph showing that blocking INPPL1 proximal PAS by 3'UTECES inhibits 22RV1 CRPC cells growth. FIG. 16B is a graph showing that blocking SPSB1 proximal PAS by 3UTECES inhibits 22RV1 CRPC cells growth. *, p<0.05, **, p<0.01.

DETAILED DESCRIPTION

Figure 1A:
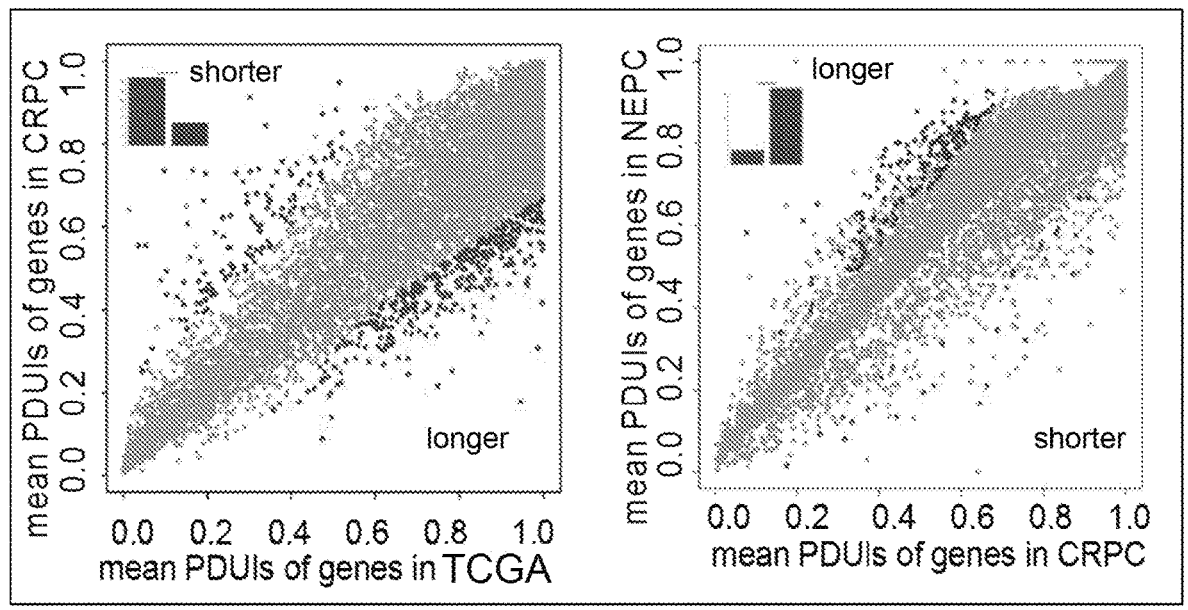
FIGS. 1A-1B show that 3'UTR lengths are changed in transcripts in patient samples during prostate cancer progression.

For the purposes of promoting an understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

As used in the specification, articles "a" and "an" are used herein to refer to one or to more than one (i.e., at least one) of the grammatical object of the article. By way of example, "an element" means at least one element and can include more than one element.

"About" is used to provide flexibility to a numerical range endpoint by providing that a given value may be "slightly above" or "slightly below" the endpoint without affecting the desired result. The term "about" in association with a numerical value means that the numerical value can vary plus or minus by 5% or less of the numerical value.

Throughout this specification, unless the context requires otherwise, the word "comprise" and "include" and variations (e.g., "comprises," "comprising." "includes," "including") will be understood to imply the inclusion of a stated component, feature, element, or step or group of components, features, elements or steps but not the exclusion of any other integer or step or group of integers or steps.

As used herein, "and/or" refers to and encompasses any and all possible combinations of one or more of the associated listed items, as well as the lack of combinations where interpreted in the alternative ("or").

As used herein, the transitional phrase "consisting essentially of" (and grammatical variants) is to be interpreted as encompassing the recited materials or steps "and those that do not materially affect the basic and novel characteristic(s)" of the claimed invention. Thus, the term "consisting essentially of" as used herein should not be interpreted as equivalent to "comprising."

Moreover, the present disclosure also contemplates that in some embodiments, any feature or combination of features set forth herein can be excluded or omitted. To illustrate, if the specification states that a complex comprises components A, B and C, it is specifically intended that any of A, B or C, or a combination thereof, can be omitted and disclaimed singularly or in any combination.

Recitation of ranges of values herein are merely intended to serve as a shorthand method of referring individually to each separate value falling within the range, unless otherwise-Indicated herein, and each separate value is incorporated into the specification as if it were individually recited herein. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this disclosure.

Unless otherwise defined, all technical terms used herein have the same meaning as commonly understood by one of ordinary skill in the art to which this disclosure belongs.

3'UTR CRISPR-dCas13 Engineering System

The present disclosure is based, in part, on the discovery by the inventors of the development of a 3'UTR CRISPR-dCas13 Engineering System (termed 3' UTRCES), and methods of using said system, that allows for the manipulation of the length of 3'UTR mRNA transcripts by using gRNA to guide catalytically dead Cas13 (dCas13) to cis elements upstream and/or downstream of the desired polyadenylation sites (PAS), thus preventing binding of trans factors involved in cleavage and polyadenylation during post-transcriptional modification and redirecting these processes to the alternative PAS.

Accordingly, one aspect of the present disclosure provides a 3' UTRCES system for modifying the length of a 3' untranslated region (UTR) of an mRNA transcript, the system comprising, consisting, or consisting essentially of one or more nucleic acid molecules comprising: (i) a nucleic acid sequence encoding a direct repeat RNA sequence that can bind a catalytically dead Cas13; (ii) a nucleic acid sequence encoding a guide RNA (gRNA) sequence that can bind to a target site that is proximal and/or distal to a polyadenylation site (PAS) of the 3' UTR of the mRNA transcript; and (iii) a nucleic acid sequence encoding a catalytically dead Cas13d protein, wherein the system causes modification of the length 3' untranslated region (UTR) of an mRNA transcript.

In some embodiments, the nucleic acid sequences encoding components of the 3' UTRCES system can be located on the same nucleic acid molecule. In other embodiments, nucleic acid sequences encoding the components of the 3' UTRCES system can be located on different nucleic acid molecules (e.g., one nucleic acid molecule comprising a nucleic acid sequence encoding a catalytically dead Cas13 protein and a second nucleic acid molecule comprising a nucleic acid sequence encoding a direct repeat and gRNA sequences).

Cas13 refers to RNA-guided and RNA-activated ribonucleases that have advantages over other CRISPR systems (e.g., CRISPR-Cas9). The Cas13 enzymes have higher on-target specificity (and less off-targets effects than other Cas enzymes). Furthermore, the Cas13d enzyme is small (e.g., approximately 2.8 kb in size) and can be packaged in low-capacity vectors (e.g., AAV or lentivirus).

Cas13 proteins are classified into distinct subfamilies (Cas13a, Cas13b, Cas13c, and Cas13d). Examples of Cas13 proteins include, but are not limited to, Cas13a from *Leptotrichia shahii* (LshCas13a), Cas13a from Cas13a from *Leptotrichia wadeii* (LwaCas13a), Cas13b from *Prevotella* sp. P5-125 (PspCas13b), Cas13c from *Fusobacterium perfoeterns*, Cas13d-NLS from *Ruminococcus flavefaciens* strain XPD3002 (CasRx).

Cas13 proteins (e.g, Cas13a, Cas13b, Cas13c, and Cas13d) can be modified to create a catalytically dead protein that is still able to retain interaction with its targets. Catalytically dead Cas13 proteins are referred to herein as "dCas13." In some embodiments, the catalytically dead Cas13 used in the 3' UTRCES system is dCas13a, dCas13b, dCas13c, and/or dCas13d. A catalytically dead Cas13 protein can be from a bacterial species from a genus that includes, but is not limited to, Lachnospiraceae, *Clostridium, Carnobacterium, Paludibacter, Listeria, Leptotrichia,* and *Rhodobacter.* Examples of catalytically dead Cas13 proteins include, but are not limited to, dCas13a from *Leptotrichia shahii*, dCas13a from Cas13a from *Leptotrichia wadeii*, dCas13b from *Prevotella* sp. P5-125, dCas13c from *Fusobacterium perfoetens*, dCas13d from *Ruminococcus flavefaciens*. In some embodiments, the catalytically dead Cas13 used in the 3' UTRCES system is Cas13d-NLS from *Ruminococcus flavefaciens* XPD3002 (dCasRx).

The 3' UTRCES system can be made up of two main components: a dCas13 protein and a CRISPR-RNA (termed crRNA or mature crRNA), which together forms a crRNA-guided RNA-targeting complex. In some embodiments, the mature crRNA comprises, consists essentially of, or consists of a direct repeat sequence and a gRNA sequence (also referred to as a spacer sequence). The direct repeat sequence serves as a binding scaffold for dCas13.

In some embodiments, the mature crRNA comprises about 18 to 25 nucleotides (e.g., 18, 19, 20, 21, 22, 23, 24, or 25 nucleotides) of direct repeat followed by about 18 to 25 nucleotides or more of a gRNA sequence (e.g., 18, 19, 20, 21, 22, 23, 24, or 25 nucleotides). Thus, the mature crRNA can be about 36 to 50 nucleotides (e.g., about 36, 37, 38, 39, 40, 41, 42, 43, 44, 45, 46, 47, 48, 49, or 50 nucleotides) total in length.

In some embodiments, the gRNA sequence is 22 nucleotides in length. Exemplary gRNA sequences of the present disclosure are set forth in SEQ ID NOS: 57-78 and 83-84 as described in Table 5 and Table 7.

In some embodiments, the direct repeat sequence can have a length of about 18-42 nucleotides (e.g., 18, 21, 24, 27, 30, 33, 36, 39, or 42, nucleotides) and can optionally contain one or more stem loop structures. In some embodiments, the direct repeat sequence has a nucleic acid sequence of 3'-CAAGTAAACCCCTACCAACTGGTCGGGGTTT-GAAAC-5' (SEQ ID NO: 01).

As used herein, the term "gRNA" refers to a guide RNA sequence that is complementary to an endogenous target RNA sequence (e.g., mRNA). A target RNA sequence can be single stranded or double stranded. A gRNA is capable, for example, of directing a catalytically active Cas13 to mediate single stranded or double stranded cleavage of target RNA. A gRNA is also capable, for example, of directing a catalytically dead Cas13 to mediate post-transcriptional interferences of target RNA. Single-stranded gRNA sequences can be transcribed from double-stranded DNA sequences inside the cell.

gRNAs can be synthetically generated or by making the gRNA in vivo or in in vitro, starting from a DNA template.

One method of making gRNAs comprises expressing the gRNA sequence in cells from a transformed or transfected plasmid. The gRNA sequence is cloned into a plasmid vector, which is then introduced into cells. The cells use their normal RNA polymerase enzyme to transcribe the genetic information in the newly introduced DNA to generate the gRNA.

gRNA can also be made by in vitro transcription (IVT), gRNA is transcribed from a corresponding DNA sequence outside the cell. A DNA template is designed that contains the guide sequence and an additional RNA polymerase promoter site upstream of the gRNA sequence. The gRNA is then transcribed using commercially available kits with reagents and recombinant RNA polymerase.

gRNAs can also be synthetically generated. Synthetically generated gRNAs can be chemically modified to prevent degradation of the molecule within the cell.

The gRNAs of the system and methods described herein can also be truncated (e.g., comprising 12-16 nucleotide targeting sequences). The gRNA can be unmodified or modified. For example, modified gRNAs can comprise one or more 2'-O-methyl and/or 2'-O-methyl phosphorothioate nucleotides.

Exemplary oligonucleotides that can be used to synthesize gRNAs of the systems described herein are listed in Table 4 and Table 6.

gRNAs are not particularly limited and can be any gRNA. A gRNA that is capable of binding a dCas13 that causes post-transcriptional interference can be, for example, g2, g3, g4, g5, g6, g7, g8, g9, g10, or g11 that target a INPPL1 mRNA transcript, g2, g3, g4, g5, g6, g7, g8, g9, g10, or g11 that target a SPSB1 mRNA transcript, or g4 or g5 that target a DUSP4 mRNA transcript.

A gRNA can target a regulatory element (e.g., a cis-acting regulatory site) on a target RNA.

A target RNA sequence can be, for example, about 20-23 nucleotides (e.g., 18, 19, 20, 21, 22, 23, 24, 25 nucleotides) in length.

The term "3' UTR" refers to the three prime untranslated region found in the section of messenger RNA (mRNA) that immediately follows the translation termination codon. The 3' UTR can contain regulatory regions that post-transcriptionally influence gene expression.

The term "mRNA transcript" refers to a single strand of messenger RNA is that transcribed from and complementary to one of the DNA strands on the gene.

The term "polyadenylation site (PAS)" refers to a recognition signal on the mRNA transcript, which is defined by an hexameric consensus sequence (usually A[A/U]UAAA) located ~20-30 nucleotides upstream of the cleavage site.

The term "proximal" refers to a site that is upstream of second site on a gene or mRNA transcript. For example, a site that is proximal to a polyadenylation site (PAS) of the 3' UTR of the mRNA transcript is a site that is upstream of the PAS.

The term "distal" refers to a site that is downstream of second site on a gene or mRNA transcript. For example, a site that is distal to a polyadenylation site (PAS) of the 3' UTR of the mRNA transcript is a site that is downstream of the PAS.

The 3' UTRCES system of the present disclosure can be used to target and modify a variety of mRNA transcripts of genes. As used herein, the term "target" refers to the ability of the RNA-guided Cas13 protein to bind to a specific portion of endogenous RNA that is complementary to the gRNA sequence. As used herein, the term "modify" when used with respect to modifying the 3'UTR region of an mRNA transcript refers to changing the length of a 3'UTR region by blocking interactions of trans factors via dCas13 binding. Modifying the length of a 3'UTR can involve shortening the 3'UTR, lengthening the 3'UTR, or maintaining the length of the 3'UTR relative to an endogenous 3'UTR in a cell. For example, blocking positions with dCas13 that are proximal to the PAS site (pPAS) in a 3'UTR can lengthen the 3'UTR or cause the 3'UTR to stay about the same length. As another example, blocking positions with dCas13 that are distal to the PAS site (dPAS) in a 3'UTR can shorten the 3'UTR or cause the 3'UTR to stay about the same length.

In some embodiments, the 3' UTRCES system can be used to target and modify the mRNA transcripts of any gene where the length of the 3'UTR is associated with a disease or cancer in the subject. For example, the results described herein demonstrate correlations between 3'UTR length changes and the progression of prostate cancer from primary prostate cancer to CRPC and NEPC.

In some embodiments, the 3' UTRCES system can be used to target and modify the 3' UTR region of mRNA transcripts from genes that include, but are not limited to, (CCND1, SMOC1, CDC26, INPPL1, DLL1, HEATR3, SLC25A40, SPSB1, MRI1, MED18, GABPA, TTC8, DUSP4, TUBB2B, ELAVL1, CHGA, MAP3K4, and/or FHIT.

PSTUB System

As described below and in the Examples, the pSTUB system (a plasmid system to identify usable dCas13d blocking sites) can be used to identify blocking sites (both proximal and distal to a PAS site) in order to modify the length of a 3'UTR region. As currently there is no tool for designing gRNAs that guide dCas13 to bind to a specific transcript and block binding of other rans factors, the pSTUB system can be used to efficiently identify gRNAs guiding dCas13 to a targeted 3'UTR for length manipulation.

The pSTUB system was developed by the inventors and consists of psiCHECK2 (psiC) dual luciferase vectors, pSTAR bearing the MLL-3'UTR fragment (termed repressor-3'UTR), pSTUB containing the target gene's pPAS upstream of the repressor-3'UTR, and pSTUB-dCas13d containing gRNA to guide dCas13d to the target gene's pPAS or dPAS.

Accordingly, another aspect of the present invention provides a method of identifying usable dCas13 blocking sites in a 3' UTR region of an mRNA transcript, the method comprising, consisting, or consisting essentially of (i) introducing into a cell a nucleic acid molecule comprising nucleic acid sequences encoding a luciferase protein, a repressor-3'UTR sequence, a target PAS sequence, a direct repeat RNA sequence, a gRNA sequence that can bind to a site that is proximal or distal to the PAS, and a nucleic acid sequence encoding a catalytically dead Cas13 protein; and (ii) measuring luciferase activity post-transfection for identifying a gRNA with improved manipulation efficiency relative to other gRNA sequences that are tested.

In some embodiments, the target mRNA transcript is an mRNA transcript that exhibits 3' UTR lengthening or shortening in a prostate cancer cell.

In some embodiments, a catalytically dead Cas13d subtype of Cas13d is used in the pSTUB system (e.g., dCasRx). However, it will be appreciated that other catalytically dead subtypes of Cas13 can also be used (e.g., dCas13a, dCas13b, or dCas13c).

Luciferase proteins can be produced from a variety of organisms. Example of luciferase proteins include, but are not limited to, the luciferase protein of the Photinini firefly *Photinus pyralis*, the luciferase protein of the sea pansy *Renilla reniformis*, the *Metridia* coelenterazine-dependent luciferase (MetLuc, A0A1L6CBM1) from *Metridia longa*, a bacterial bioluminescence protein from *Vibrio fischeri*, *Vibrio haweyi*, or *Vibrio harveyi*, or the dinoflagellate luciferase protein. In some embodiments, the luciferase protein is a *Renilla reniformis* Luciferase protein (*Renilla*-luciferin 2-monooxygenase).

In some embodiments, a decreased level of luciferase activity observed with pSTUB$^{dCas13d}$ relative to a control (e.g., pSTUB) can identify a gRNA with improved manipulation efficiency. In other embodiments, decreased luciferase activity relative to other gRNA sequences tested can indicate a gRNA with improved manipulation efficiency.

Nucleic Acid Molecules

Also provided are examples of nucleic acid molecules useful in the systems and methods described herein.

The terms "nucleic acid molecule," "nucleotide," and "oligonucleotide" are used interchangeably. They refer to a polymeric form of nucleotides of any length, either deoxyribonucleotides or ribonucleotides, or analogs thereof. Polynucleotides may have any three dimensional structure, and may perform any function, known or unknown. Nucleic acid molecule means a single- or double-stranded linear polynucleotide containing either deoxyribonucleotides or ribonucleotides that are linked by 3'-5'-phosphodiester bonds. A nucleic acid construct is a nucleic acid molecule which is isolated from a naturally occurring gene or which has been modified to contain segments of nucleic acid which are combined and juxtaposed in a manner which would not otherwise exist in nature. The following are non-limiting examples of polynucleotides: coding or non-coding regions of a gene or gene fragment, loci (locus) defined from linkage analysis, exons, introns, messenger RNA (mRNA), transfer RNA, ribosomal RNA, short interfering RNA (siRNA), short-hairpin RNA (shRNA), guide RNA (gRNA), micro- RNA (miRNA), ribozymes, cDNA, recombinant polynucleotides, branched polynucleotides, plasmids, vectors, isolated DNA of any sequence, isolated RNA of any sequence, nucleic acid probes, and primers. A nucleic acid molecule may comprise one or more modified nucleotides, such as methylated nucleotides and nucleotide analogs. If present, modifications to the nucleotide structure can be imparted before or after assembly of the polymer. The sequence of nucleotides can be interrupted by non-nucleotide components. A nucleic acid molecule can be further modified after polymerization, such as by conjugation with a labeling component.

Homology refers to the similarity between two nucleic acid sequences. Homology among DNA, RNA, or proteins is typically inferred from their nucleotide or amino acid sequence similarity. Significant similarity is strong evidence that two sequences are related by evolutionary changes from a common ancestral sequence. Alignments of multiple sequences are used to indicate which regions of each sequence are homologous. The term "percent homology" is used herein to mean "sequence similarity." The percentage of identical nucleic acids or residues (percent identity) or the percentage of nucleic acids residues conserved with similar physicochemical properties (percent similarity), e.g. leucine and isoleucine, is used to quantify the homology.

Complement or complementary sequence means a sequence of nucleotides which forms a hydrogen-bonded duplex with another sequence of nucleotides according to Watson-Crick base-pairing rules. For example, the complementary base sequence for 5'-AAGGCT-3' is 3'-TCCGA-5'. Downstream refers to a relative position in DNA or RNA and is the region towards the 3' end of a strand. Upstream means on the 5' side of any site in DNA or RNA.

As described herein, "sequence identity" is related to sequence homology. Homology comparisons may be conducted by eye or using sequence comparison programs. These commercially available computer programs may calculate percent (%) homology between two or more sequences and may also calculate the sequence identity shared by two or more amino acid or nucleic acid sequences. Sequence homologies may be generated by any of a number of computer programs known in the art, for example BLAST or FASTA.

Percentage (%) sequence identify can be calculated over contiguous sequences, i.e., one sequence is aligned with the other sequence and each amino acid or nucleotide in one sequence is directly compared with the corresponding amino acid or nucleotide in the other sequence, one residue at a time. This is called an "ungapped" alignment. Ungapped alignments are performed only over a relatively short number of residues. Although this is a very simple and consistent method, it fails to take into consideration that, for example, in an otherwise identical pair of sequences, one insertion or deletion may cause the following amino acid residues to be put out of alignment, thus potentially resulting in a large reduction in percent homology when a global alignment is performed. Therefore, most sequence comparison methods are designed to produce optimal alignments that take into consideration possible insertions and deletions without unduly penalizing the overall homology or identity score. This is achieved by inserting "gaps" in the sequence alignment to try to maximize local homology or identity.

Vectors

Another aspect of the present disclosure provides one or more vectors comprising, consisting of, or consisting essentially of a nucleic acid molecule comprising a nucleic acid sequence encoding the 3' UTRCES system.

It will be apparent to those skilled in the art that any suitable vector can be used to deliver the nucleic acid sequence encoding the 3' UTRCES system of the disclosure to the target cell(s) or subject of interest. The choice of delivery vector can be made based on a number of factors known in the art, including age and species of the target host, in vitro vs. in vivo delivery, level and persistence of expression desired, intended purpose (e.g., for therapy or diagnosis), the target cell or organ, route of delivery, size of the isolated nucleic acid, safety concerns, and the like.

Suitable vectors that are known in the art and that can be used to deliver, and optionally, express the nucleic acid sequence encoding the 3' UTRCES system of the disclosure (e.g., viral and non-viral vectors), including, virus vectors (e.g., retrovirus, adenovirus, AAV, lentiviruses, or herpes simplex virus), lipid vectors, poly-lysine vectors, synthetic polyamino polymer vectors that are used with nucleic acid molecules, such as a plasmid, and the like. In some embodiments, the non-viral vector can be a polymer based vector (e.g., polyethylenimine (PEI), chitosan, poly (DL-Lactide) (PLA), or poly (DL-lactidie-co-glycoside) (PLGA), dendrimers, polymethacrylate) a peptide based vector, a lipid nanoparticle, a solid lipid nanoparticle, or a cationic lipid based vector.

In some embodiments, the vector is a lipid nanoparticle. In other embodiments, the lipid nanoparticle consists of DLin-KC2-DMA, DOPE, Cholesterol, and PEG-DMG (Kulkarni et al. *Nanomedicine* 2017; 13:1377-87). A detailed description of lipid nanoparticles capable of encapsulating and delivering the 3' UTRCES system is described in the International Patent Application titled "Nanoparticle systems for targeted delivery of CRISPR/Cas13 and methods of using same." which claims priority to U.S. Provisional Patent Application No. 62/873,295 (filed on Jul. 12, 2019) and incorporated herein by reference.

Protocols for producing recombinant viral vectors and for using viral vectors for nucleic acid delivery can be found in *Current Protocols in Molecular Biology*; Ausubel, F. M. et al. (eds.) Greene Publishing Associates: (1989) and other standard laboratory manuals (e.g., Vectors for Gene Therapy, In: *Current Protocols in Human Genetics*, John Wiley and Sons, Inc.; 1997).

"Recombinant" is used herein to refer to new combinations of genetic material as a result of genetic engineering. For instance, a recombinant organism (e.g., bacteria) can be an organism that contains different genetic material from either of its parents as a result of genetic modification, recombinant DNA can be a form of artificial DNA, a recombinant protein or enzyme can be an artificially produced and purified form of the protein or enzyme, and a recombinant virus can be a virus formed by recombining genetic material.

In some embodiments, the 3' UTRCES system can be incorporated into a recombinant viral vector.

Examples of viral vectors the suitable for use with the 3' UTRCES system include, but are not limited to vectors derived from: Adenoviridae; Birnaviridae; Bunyaviridae; Caliciviridae, Capillovirus group; Carlavirus group; Carmovirus virus group; Group Caulimovirus; Closterovirus Group; Commelina yellow mottle virus group; Comovirus virus group; Coronaviridae; PM2 phage group; Corcicoviridae; Group Cryptic virus; group Cryptovirus; Cucumovirus virus group family ([PHgr]6 phage group; Cysioviridae; Group Carnation ringspot; Dianthovirus virus group; Group Broad bean wilt, Fabavirus virus group; Filoviridae; Flaviviridae; Furovirus group; Group Germinivirus; Group Giardiavirus; Hepadnaviridae; Herpesviridae; Hordeivirus virus group; Illarvirus virus group; Inoviridae; Iridoviridae; Leviviridae; Lipothrixviridae; Luteovirus group; Marafivirus virus group; Maize chlorotic dwarf virus group; icroviridae; Myoviridae; Necrovirus group; Nepovirus virus group; Nodaviridae; Orthomyxoviridae; Papovaviridae; Paramyxoviridae; Parsnip yellow fleck virus group; Partitiviridae; Parvoviridae; Pea enation mosaic virus group; Phycodnaviridae; Picornaviridae; Plasmaviridae; Prodoviridae; Polydnaviridae; Potexvirus group; Potyvirus; Poxyiridae; Reoviridae; Retroviridae; Rhabdoviridae; Group Rhizidiovirus; Siphoviridae; Sobemovirus group; SSV 1-Type Phages; Tectiviridae; Tenuivirus; Tetraviridae; Group Tobamovirus; Group Tobravirus; Togaviridae; Group Tombusvirus; Group Torovirus; Totiviridae; Group Tymovirus; and plant virus satellites.

In some embodiments, the recombinant viral vector is selected from the group consisting of adenoviruses, Adeno-associated viruses (AAV) (e.g., AAV serotypes and genetically modified AAV variants), a herpes simplex viruses (e.g., e.g., HSV-1. HSV), a retrovirus vector (e.g., MMSV, MSCV), a lentivirus vector (HIV-1, HIV-2), an alphavirus vector (e.g., SFV, SIN, VEE, M1), a flavivirus vector (e.g., Kunjin, West Nile, Dengue virus), a rhabdovirus vector (e.g., Rabies, VSV), a measles virus vector (e.g., MV-Edm), a Newcastle disease virus vector, a poxvirus vector (VV), or a picornavirus vector (e.g., Coxsackievirus). The recombinant viral vector of the present disclosure includes any type of viral vector that is capable of packaging and delivering the 3' UTRCES system.

Yet another suitable vector is a lentiviral vector. Lentiviruses are a subtype of retroviruses but they have the unique ability to infect non-dividing cells, and therefore can have a ride range of potential applications.

In some embodiments, the vector is a lentiviral vector.

In other embodiments, the vector comprises a lenti-gRNA-RFP-PuroR vector and a lenti-dCas13Rx-EGFP vector.

A lenti-dCas13Rx-EGFP vector can comprise the following elements in order of 5' to 3': a 5' long terminal repeat sequence (LTR), a promoter sequence (e.g., EF1alpha, EFS, MNDU3), catalytically dead Cas13 sequence (e.g., dCasRx), a fluorescent protein sequence (e.g., GFP, EGFP), and a 3'LTR.

In some embodiments, the lenti-dCas13Rx-EGFP vector can comprise a nucleic acid sequence encoding a dCasRx protein having the sequence set forth in SEQ ID NO: 05 or a sequence having at least 50%, 60%, 65%, 70%, 75%, 80%, 85%, 90%, 95%, 96%, 97%, or 98% sequence identity to the sequence set forth in SEQ ID NO:05.

In some embodiments, the lenti-dCas13Rx-EGFP vector can comprise the nucleic acid sequence set forth in SEQ ID NO: 02, or a sequence having at least 70%, 75%, 80%, 85%, 90%, 95%, 96%, 97%, or 98% sequence identity to the sequence set forth in SEQ ID NO:02.

A lenti-gRNA-RFP-PuroR vector can comprise an IRES-containing bicistronic vectors. In some embodiments, a lenti-gRNA-RFP-PuroR vector can comprise the following elements in order of 5' to 3': a 5' LTR, an RNA polymerase type III promoter sequence (e.g., U6, H1), a gRNA sequence, a promoter sequence (e.g., Sv40), a fluorescent protein sequence (e.g., mCherry), an internal ribosome entry site (IRES) and an antibiotic resistance gene sequence (e.g., Puromycin [PuroR], blasticidin or G418), and a 3'LTR. Exemplary gRNA sequences that can be included in a lenti-gRNA-RFP-PuroR are set forth in SEQ ID NOS: 57-78 and 83-84 as shown in Table 5 and Table 7.

As described herein, the Lenti-gRNA-RFP-PuroR vector can be generated based the pCRISPR-LvSG03 (GeneCopoeia, Inc.) by deleting the 17 promoter, followed by inserting a dCasRx direct repeat sequence and gRNA sequence downstream of U6 promoter.

In some embodiments, a lenti-gRNA-RFP-PuroR vector and a lenti-dCas13Rx-EGFP vector are co-transfected/infected into a cell in order to express the components of the 3'UTRCES system.

A nucleic acid molecule encoding a 3'UTRCES system can be provided to the cell using any method known in the art. For example, the template can be supplied by a non-viral (e.g., plasmid) or viral vector.

In other embodiments of the present disclosure, the delivery vector of interest is a retrovirus. Retroviruses can bind to a species specific cell surface receptor, e.g., CD4 (for HIV); CAT (for MLV-E; ecotropic Murine leukemic virus E); RAMI/GLVR2 (for murine leukemic virus-A; MLV-A); GLVR1 (for Gibbon Ape leukemia virus (GALV) and Feline leukemia virus B (FeLV-B)). The development of specialized cell lines (termed "packaging cells") which produce only replication-defective retroviruses has increased the utility of retroviruses for gene therapy, and defective retroviruses are characterized for use in gene transfer for gene therapy purposes. A replication-defective retrovirus can be packaged into virions which can be used to infect a target cell through the use of a helper virus by standard techniques.

Yet another suitable vector is a poxvirus vector. These viruses contain more than 100 proteins. Extracellular forms of the virus have two membranes while intracellular particles only have an inner membrane. The outer surface of the virus is made up of lipids and proteins that surround the biconcave core. Poxviruses are very complex antigenically, inducing both specific and cross-reacting antibodies after infection. Poxvirus can infect a wide range of cells.

In addition to viral transfer methods, such as those illustrated above, non-viral methods can also be employed. Many non-viral methods of gene transfer rely on normal mechanisms used by mammalian cells for the uptake and intracellular transport of macromolecules. In particular embodiments, non-viral delivery systems rely on endocytic pathways for the uptake of the nucleic acid molecule by the targeted cell. Exemplary nucleic acid delivery systems of this type include liposomal derived systems, poly-lysine conjugates, and artificial viral envelopes.

In particular embodiments, plasmid vectors are used in the practice of the present disclosure.

In some embodiments, the plasmid vector is a dCas13dgRNA all-in-one vector (e.g., hU6pregRNA_EF1adCasRx2AEGFP). In some embodiments, the vector comprises the sequence set forth in SEQ ID NO: 02, or a sequence having at least 70%, 75%, 80%, 85%, 90%, 95%, 96%, 97%, or 98% sequence identity to the sequence set forth in SEQ ID NO:02. The nucleic acid construct having the sequence set forth in SEQ ID NO:02 is shown in Table 1.

TABLE 1

| | Nucleic Acid Construct |
|---|---|
| Nucleic Acid construct | ATGAGCCCCAAGAAGAAGAGAAAGGTGGGAGGCCAGCATCGAAAAAAAAAGT CCTTCGCCAAGGGCATGGGCGTGAAGTCCACACTCGTGTCCGGCTCCAAAGTG |

TABLE 1-continued

| | Nucleic Acid Construct |
|---|---|
| containing the following elements in order of 5' to 3' NLS, dCasRx, NLS, HA, linker, T2A, andGFP | TACATGACAACCTTCGCCGAAGGCAGCGACGCCAGGCTGGAAAAGATCGTGGA GGGCGACAGCATCAGGAGCGTGAATGAGGGCGAGGCCTTCAGCGCTGAAATGG CCGATAAAAACGCCGGCTATAAGATCGGCAACGCCAAATTCAGCCATCCTAAG GGCTACGCCGTGGTGGCTAACAACCCTCTGTATACAGGACCCGTCCAGCAGGA TATGCTCGGCCTGAAGGAAACTCTGGAAAAGAGGTACTTCGGCGAGAGCGCTG ATGGCAATGACAATATTTGTATCCAGGTGATCCATAACATCCTGGACATTGAA AAAATCCTCGCCGAATACATTACCAACGCCGCCTACGCCGTCAACAATATCTC CGGCCTGGATAAGGACATTATTGGATTCGGCAAGTTCTCCACAGTGTATACCT ACGACGAATTCAAAGACCCCGAGCACCATAGGGCCGCTTTCAACAATAACGAT AAGCTCATCAACGCCATCAAGGCCCAGTATGACGAGTTCGACAACTTCCTCGA TAACCCCAGACTCGGCTATTTCGGCCAGGCCTTTTTCAGCAAGGAGGGCAGAA ATTACATCATCAATTACGGCAACGAATGCTATGACATTCTGGCCCTCCTGAGC GGACTGGCGCACTGGGTGGTCGCTAACAACGAAGAAGAGTCCAGGATCTCCAG GACCTGGCTCTACAACCTCGATAAGAACCTCGACAACGAATACATCTCCACCC TCAACTACCTCTACGACAGGATCACCAATGAGCTGACCAACTCCTTCTCCAAG AACTCCGCCGCCAACGTGAACTATATTGCCGAAACTCTGGGAATCAACCCTGC CGAATTCGCCGAACAATATTTCAGATTCAGCATTATGAAAGAGCAGAAAAACC TCGGATTCAATATCACCAAGCTCAGGGAAGTGATGCTGGACAGGAAGGATATG TCCGAGATCAGGAAAAATCATAAGGTGTTCGACTCCATCAGGACCAAGGTCTA CACCATGATGGACTTTGTGATTTATAGGTATTACATCGAAGAGGATGCCAAGG TGGCTGCCGCCAATAAGTCCCTCCCCGATAATGAGAAGTCCCTGAGCGAGAAG GATATCTTTGTGATTAACCTGAGGGGCTCCTTCAACGACGACCAGAAGGATGC CCTCTACTACGATGAAGCTAATAGAATTTGGAGAAAGCTCGAAAATATCATGC ACAACATCAAGGAATTTAGGGGAAACAAGACAAGAGAGTATAAGAAGAAGGAC GCCCCTAGACTGCCCAGAATCCTGCCCGCTGGCCGTGATGTTTCCGCCTTCAG CAAACTCATGTATGCCCTGACCATGTTCCTGGATGGCAAGGAGATCAACGACC TCCTGACCACCCTGATTAATAAATTCGATAACATCCAGAGCTTCCTGAAGGTG ATGCCTCTCATCGGAGTCAACGCTAAGTTCGTGGAGGAATACGCCTTTTTCAA AGACTCCGCCAAGATCGCCGATGAGCTGAGGCTGATCAAGTCCTTCGCTAGAA TGGGAGAACCTATTGCCGATGCCAGGAGGGCCATGTATATCGACGCCATCCGT ATTTTAGGAACCAACCTGTCCTATGATGAGCTCAAGGCCCTCGCCGACACCTT TTCCCTGGACGAGAACGGAAACAAGCTCAAGAAAGGCAAGCACGGCATGAGAA ATTTCATTATTAATAACGTGATCAGCAATAAAAGGTTCCACTACCTGATCAGA TACGGTGATCCTGCCCACCTCCATGAGATCGCCAAAAACGAGGCCGTGGTGAA GTTCGTGCTCGGCAGGATCGCTGACATCCAGAAAAAACAGGGCCAGAACGGCA AGAACCAGATCGACAGGTACTACGAAACTTGTATCGGAAAGGATAAGGGCAAG AGCGTGAGCGAAAAGGTGGACGCTCTCACAAAGATCATCACCGGAATGAACTA CGACCAATTCGACAAGAAAAGGAGCGTCATTGAGGACACCGGCAGGGAAAACG CCGAGAGGGAGAAGTTTAAAAAGATCATCAGCCTGTACCTCACCGTGATCTAC CACATCCTCAAGAATATTGTCAATATCAACGCCAGGTACGTCATCGGATTCCA TTGCGTCGAGCGTGATGCTCAACTGTACAAGGAGAAAGGCTACGACATCAATC TCAAGAAACTGGAAGAGAAGGGATTCAGCTCCGTCACCAAGCTCTGCGCTGGC ATTGATGAAACTGCCCCCGATAAGAGAAAGGACGTGGAAAAGGAGATGGCTGA AAGAGCCAAGGAGAGCATTGACAGCCTCGAGAGCGCCAACCCCAAGCTGTATG CCAATTACATCAAATACAGCGACGAGAAGAAAGCCGAGGAGTTCACCAGGCAG ATTAACAGGGAGAAGGCCAAAACCGCCCTGAACGCCTACCTGAGGAACACCAA GTGGAATGTGATCATCAGGGAGGACCTCCTGAGAATTGACAACAAGACATGTA CCCTGTTCGCAAACAAGGCCGTCGCCCTGGAAGTGGCCAGGTATGTCCACGCC TATATCAACGACATTGCCGAGGTCAATTCCTACTTCCAACTGTACCATTACAT CATGCAGAGAATTATCATGAATGAGAGGTACGAGAAAAGCAGCGGAAAGGTGT CCGAGTACTTCGACGCTGTGAATGACGAGAAGAAGTACAACGATAGGCTCCTG AAACTGCTGTGTGTGCCTTTCGGCTACTGTATCCCCAGGTTTAAGAACCTGAG CATCGAGGCCCTGTTCGATAGGAACGAGGCCGCCAAGTTCGACAAGGAGAAAA AGAAGGTGTCCGGCAATTCCGGATCCGGACCTAAGAAAAAGAGGAAGGTGGCG GCCGCTTACCCATACGATGTTCCAGATTACGCTGCTAGCGGCAGTGGAGAGGG CAGAGGAAGTCTGCTAACATGCGGTGACGTCGAGGAGAATCCTGGCCCAGTGA GCAAGGGCGAGGAGCTGTTCACCGGGGTGGTGCCCATCCTGGTCGAGCTGGAC GGCGACGTAAACGGCCACAAGTTCAGCGTGTCCGGCGAGGGCGAGGGCGATGC CACCTACGGCAAGCTGACCCTGAAGTTCATCTGCACCACCGGCAAGCTGCCCG TGCCCTGGCCCACCCTCGTGACCACCCTGACCTACGGCGTGCAGTGCTTCAGC CGCTACCCCGACCACATGAAGCAGCACGACTTCTTCAAGTCCGCCATGCCCGA AGGCTACGTCCAGGAGCGCACCATCTTCTTCAAGGACGACGGCAACTACAAGA CCCGCGCCGAGGTGAAGTTCGAGGGCGACACCCTGGTGAACCGCATCGAGCTG AAGGGCATCGACTTCAAGGAGGACGGCAACATCCTGGGGCACAAGCTGGAGTA CAACTACAACAGCCACAACGTCTATATCATGGCCGACAAGCAGAAGAACGGCA TCAAGGTGAACTTCAAGATCCGCCACAACATCGAGGACGGCAGCGTGCAGCTC GCCGACCACTACCAGCAGAACACCCCCATCGGCGACGGCCCCGTGCTGCTGCC CGACAACCACTACCTGAGCACCCAGTCCGCCCTGAGCAAAGACCCCAACGAGA AGCGCGATCACATGGTCCTGCTGGAGTTCGTGACCGCCGCCGGGATCACTCTC GGCATGGACGAGCTGTACAAGTAA (SEQ ID NO: 02) |

In some embodiments, the all-in-one vector comprises the following elements in order of 5' to 3': a nucleic acid sequence encoding a nuclear localization peptide (NLS), a nucleic acid sequence encoding a dCas13 (e.g., dCasRx), a nucleic acid sequence encoding a nuclear localization peptide (NLS), a nucleic acid sequence encoding an epitope tag (e.g., human influenza hemagglutinin (HA)), a nucleic acid sequence encoding a linker peptide, a nucleic acid sequence encoding a 2A self-cleaving peptide (e.g., P2A, E2A, F2A and T2A), and a nucleic acid sequence encoding a fluorescent protein (e.g., GFP).

In some embodiments, the all-in-one vector comprises a nucleic acid sequence encoding one or more nuclear localization peptides (NLS). In some embodiments, the all-in-one vector comprises a nucleic acid sequence encoding a NLS peptide having the sequence AGCCCCAAGAAGAAGAGAAAGGTG (SEQ ID NO: 03) and/or CCTAAGAAAAAGAGGAAGGTG (SEQ ID NO: 04).

In some embodiments, the all-in-one vector comprises a nucleic acid sequence encoding a dCasRx protein is the sequence set forth in SEQ ID NO: 05 or a sequence having at least 50%, 60%, 65%, 70%, 75%, 80%, 83%, 90%, 95%, 96%, 97%, or 98% sequence identity to the sequence set forth in SEQ ID NO:05.

In some embodiments, the all-in-one vector comprises a nucleic acid sequence encoding an HA epitope tag having the sequence set forth in SEQ ID NO: 06.

In some embodiments, the all-in-one vector comprises a nucleic acid sequence encoding a T2A 2A self-cleaving peptide having the sequence set forth in SEQ ID NO: 07.

In some embodiments, the all-in-one vector comprises a nucleic acid sequence encoding a GFP having the sequence set forth in SEQ ID NO: 08.

In some embodiments, the all-in-one vector can comprise one or more linker sequences. The term "linker sequence" as used herein refers to a nucleic acid sequence that encodes a short polypeptide sequence. A linker sequence can comprise at least 6 nucleotides, at least 15 nucleotides, 27 nucleotides, or at least 30 nucleotides. In other embodiments, the linker sequence has IS nucleotides. A linker sequence can be used to connect various encoded elements in the vector constructs. Exemplary nucleic acid linker sequences that can be used in the nucleic acid constructs of the present disclosure include, but are not limited to GCTAGCGGCAGTGGA (SEQ ID NO: 09).

In some embodiments, the all-in-one vector can express one or more gRNA sequences. Exemplary gRNA sequences that can be included in an all-in-one vector are set forth in SEQ ID NOS: 57-78 and 83-84 as shown in Table 5 and Table 7.

Naked plasmids can be introduced into cells by injection into the tissue. Expression can extend over many months. Cationic lipids can aid in introduction of DNA into some cells in culture. Injection of cationic lipid plasmid DNA complexes into the circulation of mice can result in expression of the DNA in organs (e.g., the lung). One advantage of plasmid DNA is that it can be introduced into non-replicating cells.

In a representative embodiment, a nucleic acid molecule (e.g., a plasmid) can be entrapped in a lipid particle bearing positive changes on its surface and, optionally, tagged with antibodies against cell surface antigens of the target tissue.

Liposomes that consist of amphiphilic cationic molecules are useful non-viral vectors for nucleic acid delivery in vitro and in view. The positively charged liposomes are believed to complex with negatively charged nucleic acids via electrostatic interactions to form lipid:nucleic acid complexes.

The lipid:nucleic acid complexes have several advantages as gene transfer vectors. Unlike viral vectors, the lipid:nucleic acid complexes can be used to transfer expression cassettes of essentially unlimited size. Since the complexes lack proteins, they can evoke fewer immunogenic and inflammatory responses. Moreover, they cannot replicate or recombine to form an infectious agent and have low integration frequency.

Amphiphilic cationic lipid:nucleic acid complexes can be used for in vivo transfection both in animals and in humans and can be prepared to have a long shelf-life.

In some embodiments, a Lipofectamine™ transfection reagent is used to transfect a nucleic acid molecule of the present disclosure into a cell. A Lipofectamine™ transfection reagent can contain cationic lipid molecules that are formulated with a neutral co-lipid (helper lipid). The DNA-containing liposomes (positively charged on their surface) can fuse with the negatively charged plasma membrane of living cells, due to the neutral co-lipid mediating fusion of the liposome with the cell membrane, allowing nucleic acid cargo molecules to cross into the cytoplasm for replication or expression. It will be appreciated that other types of transfection agents that utilize similar properties to a Lipofectamine™ reagent can be used to transfect the nucleic acid molecules of the present disclosure. In some embodiment, a dCas13d-gRNA all-in-one vector (e.g., the hU6-pregRNA_EF1a-dCasRx-2A-EGFP vector) can express both dCas13d and gRNA when transfected using a non-viral transfection method (e.g., Lipofectamine™ transfection).

In addition, vectors according to the present disclosure can be used in diagnostic and screening methods, whereby a 3'UTRCES system is transiently or stably expressed in a cell culture system, or alternatively, a transgenic animal model screening methods, whereby a the 3'UTRCES system is transiently or stably expressed in a cell culture system, or alternatively, a transgenic animal model.

The vectors of the present invention can also be used for various non-therapeutic purposes, including but not limited to use in protocols to assess gene targeting, clearance, transcription, translation, etc., as would be apparent to one skilled in the art. The vectors can also be used for the purpose of evaluating safety (spread, toxicity, immunogenicity, etc.). Such data, for example, are considered by the United States Food and Drug Administration as part of the regulatory approval process prior to evaluation of clinical efficacy.

Methods of Modifying the Length of a 3'UTR

Another aspect of the present disclosure provides a method of modifying the length of a 3' UTR of an mRNA transcript, the method comprising, consisting of, or consisting essentially of: introducing into a cancer cell a 3'UTRCES system of the disclosure, wherein the system causes modification of the length of the 3' UTR of the mRNA transcript relative to a cell that has not been transformed or transfected with the 3'UTRCES system.

In some embodiments, the modification of the 3' UTR causes the 3' UTR to increase, decrease, or stay about the same length.

Under the direction of gRNAs, the dCas13 protein can bind to cis elements upstream and/or downstream of the polyadenylation sites (PAS) and prevent binding of trans factors involved in cleavage and polyadenylation, thus preventing targeted PAS cleavage or polyadenylation and redirecting these processes to the alternative PAS. Cis elements are sequences contained in the 3' and 5' untranslated region, introns, or coding regions of mRNAs that can be selectively recognized by of one or more trans-acting factors to regulate posttranscriptional gene expression.

In some embodiments, the method comprise modifying the length of a 3' UTR of at least one gene (e.g., about 1, 2, 3, 4, 5, 10, or more) relative to a cell that has not been transformed or transfected with the system described herein. For example, the methods and systems can be used to modify the lengths of 3' UTRs of multiple genes simultaneously. As a non-limiting example, the system and methods described herein can be used to simultaneously lengthen the 3' UTR of a first mRNA transcript (e.g., by blocking a pPAS) and shorten the 3' UTR of a second mRNA transcript (e.g., by blocking a dPAS site).

In some embodiments, the systems and methods described herein can be used to lengthen the 3' UTR of CDC26, INPPL1, DLL1, HEATR3, SLC25A40, SPSB1, MRI1, MED18, GABPA, and/or TTC8 gene transcripts by blocking a pPAS site with a 3'UTRCES system of the disclosure. In other embodiments, the systems and methods described herein can be used to shorten the 3' UTR of DUSP4, TUBB2B, ELAV1, CHGA, MAP3K4, and/or FHIT gene transcripts by blocking a dPAS site with a 3'UTRCES system of the disclosure.

One or more vectors of a system described herein can further comprise a polynucleotide encoding for a marker protein such as an antibiotic resistance protein or a florescence protein.

Methods for transforming or transfecting a cell with an expression vector may differ depending upon the species of the desired cell. For example, yeast cells may be transformed by lithium acetate treatment (which may further include carrier DNA and PEG treatment) (the LiAc/SS carrier and DNA/PEG method) or electroporation. Mammalian cells can be transfected via liposome-mediated transfection, using non-liposomal transfection agents (e.g., polymers and lipids), or by electroporation. These methods are included for illustrative purposes and are in no way intended to be limiting or comprehensive. Routine experimentation through means well known in the art may be used to determine whether a particular expression vector or transformation method is suited for a given host cell. Furthermore, reagents and vectors suitable for many different host microorganisms are commercially available and/or well known in the art.

Methods of Treating Cancer

Another aspect of the present disclosure provides a method of treating or preventing the progression of cancer, the method comprising, consisting of, or consisting essentially of administering to a subject a therapeutically effective amount of a 3'UTRCES system of the disclosure.

In some embodiments, the cancer comprises bladder urothelial carcinoma (BLCA), head and neck squamous cell carcinoma, lung squamous cell carcinoma (LUSC), lung adenocarcinoma (LUAD), breast invasive carcinoma (BRCA), kidney renal clear cell carcinoma (KIRC), uterine corpus endometrioid carcinoma (UCEC), glioblastoma, or prostate cancer. In other embodiments, the cancer is prostate cancer.

In some embodiments, the prostate cancer is androgen-dependent prostate cancer (ADPC), CRPC, or NEPC.

In some embodiments, the 3'UTRCES system of the present disclosure comprise, consist of, or consist essentially of one or mom vectors (e.g., lentiviral vector or non-viral vector) and/or a pharmaceutically acceptable carrier and/or excipient, and, optionally, other medicinal agents, pharmaceutical agents, stabilizing agents, buffers, carriers, adjuvants, diluents, etc. For injection, the carrier will typically be a liquid. For other methods of administration, the carrier may be either solid or liquid. For inhalation administration, the carrier will be respirable, and optionally can be in solid or liquid particulate form.

By "pharmaceutically acceptable" it is meant a material that is not biologically or otherwise undesirable, i.e., the material can be administered to a subject along with the isolated nucleic acid or vector without causing any undesirable biological effects such as toxicity. Thus, such a pharmaceutical composition can be used, for example, in transfection of a cell ex vivo or in administering an isolated nucleic acid or vector directly to a subject.

Pharmaceutical compositions comprising the nucleic acid molecules encoding the components of the 3'UTRCES system may also comprise other ingredients such as diluents and adjuvants. Acceptable carriers, diluents and adjuvants are nontoxic to recipients and are preferably inert at the dosages and concentrations employed, and may include buffers such as phosphate, citrate, or other organic acids; antioxidants such as ascorbic acid; low molecular weight polypeptides; proteins, such as serum albumin, gelatin, or immunoglobulins; hydrophilic polymers such as polyvinylpyrrolidone; amino acids such as glycine, glutamine, asparagine, arginine or lysine; monosaccharides, disaccharides, and other carbohydrates including glucose, mannose, or dextrins; chelating agents such as EDTA; sugar alcohols such as mannitol or sorbitol; salt-forming counter ions such as sodium; and/or nonionic surfactants such as Tween, pluronics or polyethylene glycol (PEG).

The pharmaceutical carriers, diluents or excipients suitable for injectable use include sterile aqueous solutions or dispersions and sterile powders for the extemporaneous preparation of sterile injectable solutions or dispersions. In all cases the form must be sterile and must be fluid to the extent that easy syringability exists. It must be stable under the conditions of manufacture and storage and must be preserved against the contaminating actions of microorganisms such as bacteria and fungi. The carrier can be a solvent or dispersion medium containing, for example, water, ethanol, polyol (for example, glycerol, propylene glycol, liquid polyethylene glycol and the like), suitable mixtures thereof, and vegetable oils. The proper fluidity can be maintained, for example, by the use of a coating such as lecithin, by the maintenance of the required particle size in the case of a dispersion and by the use of surfactants. The prevention of the action of microorganisms can be brought about by various antibacterial and antifungal agents, for example, parabens, chlorobutanol, phenol, sorbic acid, thimerosal and the like. In many cases it will be preferable to include isotonic agents, for example, sugars or sodium chloride. Prolonged absorption of the injectable compositions can be brought about by use of agents delaying absorption, for example, aluminum monostearate and gelatin.

In some embodiments, sterile injectable solutions are prepared by incorporating the one or more vectors comprising the 3'UTRCES system (e.g., lentiviral vector, cationic transfection lipids, lipid nanoparticle) in the required amount in the appropriate solvent with various other ingredients enumerated above, as required, followed by filter sterilization. Generally, dispersions are prepared by incorporating the sterilized active ingredient into a sterile vehicle which contains the basic dispersion medium and the required other ingredients from those enumerated above. In the case of sterile powders for the preparation of sterile injectable solutions, the preferred methods of preparation are vacuum drying and the freeze-drying technique that yield a powder of the active ingredient plus any additional desired ingredient from the previously sterile-filtered solution thereof.

For purposes of intramuscular injection, solutions in an adjuvant such as sesame or peanut oil or in aqueous propylene glycol can be employed, as well as sterile aqueous solutions. Such aqueous solutions can be buffered, if desired, and the liquid diluent first rendered isotonic with saline or glucose. Solutions of viral vector as a free acid (DNA contains acidic phosphate groups) or a pharmacologically acceptable salt can be prepared in water suitably mixed with a surfactant such as hydroxypropylcellulose. A dispersion of recombinant viral vector can also be prepared in glycerol, liquid polyethylene glycols and mixtures thereof and in oils. Under ordinary conditions of storage and use, these preparations contain a preservative to prevent the growth of microorganisms. In this connection, the sterile aqueous media employed are all readily obtainable by standard techniques well-known to those skilled in the art.

Pharmaceutical compositions can be prepared as injectable formulations or as topical formulations to be delivered to the subject by transdermal transport. Numerous formulations for both intramuscular injection and transdermal transport have been previously developed and can be used in the practice of the invention. The recombinant viral vector can be used with any pharmaceutically acceptable carrier and/or excipient for ease of administration and handling.

Titers of recombinant viral vectors to be administered according to the methods of the present disclosure will vary depending, for example, on the particular recombinant viral vector, the mode of administration, the treatment goal, the individual, and the cell type(s) being targeted, and may be determined by methods standard in the art.

In the case of a viral vector, virus particles can be contacted with the cells at the appropriate multiplicity of infection according to standard transduction methods appropriate for the particular target cells. Titers of virus to administer can vary, depending upon the target cell type and the particular virus vector, and can be determined by those of skill in the art. Typically, at least about $10^3$ virus particles, at least about $10^5$ particles, at least about $10^7$ particles, at least about $10^9$ particles, at least about $10^{11}$ particles, or at least about $10^{12}$ particles are administered to the cell. In exemplary embodiments, about $10^7$ to about $10^{15}$ particles, about $10^7$ to about $10^{13}$ particles, about $10^8$ to about $10^{12}$ particles, about $10^{10}$ to about $10^{15}$ particles, about $10^{11}$ to about $10^{15}$ particles, about $10^{12}$ to about $10^{14}$ particles, or about $10^{12}$ to about $10^{13}$ particles are administered Dosages may also be expressed in units of viral genomes (vg).

The cell to be administered the vectors of the disclosure can be of any type, including but not limited to neuronal cells (including cells of the peripheral and central nervous systems), retinal cells, epithelial cells (including dermal, gut, respiratory, bladder, pulmonary, peritoneal and breast tissue epithelium), muscle (including cardiac, smooth muscle, including pulmonary smooth muscle cells, skeletal muscle, and diaphragm muscle), pancreatic cells (including islet cells), kidney cells, hepatic cells (including parenchyma), cells of the intestine, fibroblasts (e.g., skin fibroblasts such as human skin fibroblasts), fibroblast-derived cells, endothelial cells, intestinal cells, germ cells, lung cells (including bronchial cells and alveolar cells), prostate cells, stem cells, progenitor cells, dendritic cells, and the like. Moreover, the cells can be from any species of origin.

Methods of transducing a target cell with a vector according to the present disclosure are contemplated by the present disclosure.

The in vivo transduction methods comprise the step of administering an effective dose, or effective multiple doses, of a nucleic acid expression cassette or composition comprising a recombinant viral vector of the present disclosure to an animal (including a human being) in need thereof. If the dose is administered prior to development of a disorder/disease, the administration is prophylactic. If the dose is administered after the development of a disorder/disease, the administration is therapeutic. In embodiments of the present disclosure, an effective dose is a dose that alleviates (eliminates or reduces) at least one symptom associated with the disorder/disease state being treated, that slows or prevents progression to a disorder/disease state, that slows or prevents progression of a disorder/disease state, that diminishes the extent of disease, that results in remission (partial or total) of disease, and/or that prolongs survival. An example of a disease contemplated for prevention or treatment with methods of the present disclosure is prostate cancer (e.g. CRPC or NEPC)

Transduction with a recombinant viral vector may also be carried out in vitro. In one embodiment, desired target cells are removed from the subject, transduced with recombinant viral vector and reintroduced into the subject. Alternatively, syngeneic or xenogeneic target cells can be used where those cells will not generate an inappropriate immune response in the subject.

Suitable methods for the transduction of a recombinant viral vector or the reintroduction of transduced cells into a subject are known in the art. In one embodiment, cells can be transduced in vitro by combining the recombinant viral vector with target cells, e.g., in appropriate media, and screening for those cells harboring the DNA of interest using conventional techniques such as Southern blots and/or PCR, or by using selectable markers. A recombinant viral vector or transduced cells can then be formulated into pharmaceutical compositions, and the composition introduced into the subject by various techniques, such as by intramuscular, intravenous, subcutaneous and intraperitoneal injection.

The nucleic acid molecules, vectors, and compositions of the present disclosure may further be used in various methods.

As used herein, "treatment" or "treating" refers to the clinical intervention made in response to a disease, disorder or physiological condition manifested by a patient or to which a patient may be susceptible. The aim of treatment includes the alleviation or prevention of symptoms, slowing or stopping the progression or worsening of a disease, disorder, or condition and/or the remission of the disease, disorder or condition.

An "effective amount" or "therapeutically effective amount" as used herein means an amount which provides a therapeutic or prophylactic benefit. Effective amounts of the nucleic acid molecules and/or compositions and/or pharmaceutical compositions can be determined by a physician with consideration of individual differences in age, weight, and condition of the patient (subject).

An effective amount of a therapeutic agent is one that will decrease or ameliorate the symptoms normally by at least 10%, more normally by at least 20%, most normally by at least 30%, typically by at least 40%, more typically by at least 50%, most typically by at least 60%, often by at least 70%, more often by at least 80%, and most often by at least 90%, conventionally by at least 95%, more conventionally by at least 99%, and most conventionally by at least 99.9%.

The term "disease" as used herein includes, but is not limited to, any abnormal condition and/or disorder of a structure or a function that affects a part of an organism. It may be caused by an external factor, such as an infectious disease, or by internal dysfunctions, such as cancer, cancer metastasis, and the like.

The term "administration" or "administering" as it applies to a human, primate, mammal, mammalian subject, animal, veterinary subject, placebo subject, research subject, experimental subject, cell, tissue, organ, or biological fluid, refers without limitation to contact of an exogenous ligand, reagent, placebo, small molecule, pharmaceutical agent, therapeutic agent, diagnostic agent, or composition to the subject, cell, tissue, organ, or biological fluid, and the like. "Administration" can refer, e.g., to therapeutic, pharmacokinetic, diagnostic, research, placebo, and experimental methods. Treatment of a cell encompasses exposure of the cell to a reagent (e.g., a nucleic acid molecule), as well as contact of a reagent to a fluid, where the fluid is in contact with the cell. "Administering" also encompasses in vitro and ex vivo treatments, e.g., of a cell, by a reagent, diagnostic, binding composition, or by another cell.

Administration of an effective dose of the nucleic acid molecules, vectors, and pharmaceutical compositions may be by routes standard in the art including, but not limited to, intrathecal, intramuscular, parenteral, intravenous, oral, buccal, nasal, pulmonary, intracranial-intra-parenchymal, intraosseous, or intraocular.

Dosages will depend upon the mode of administration, the severity of the disease or condition to be treated, the individual subject's condition, the particular vector, and the gene to be delivered, and can be determined in a routine manner. In some embodiments, the isolated nucleic acid molecule or vector is administered to the subject in a therapeutically effective amount, as that term is defined above.

The dose of vector to be administered in methods disclosed herein will vary depending, for example, on the particular recombinant viral vector, the mode of administration, the treatment goal, the individual, and the cell type(s) being targeted, and may be determined by methods standard in the art. Titers of each recombinant viral vector (e.g., rAAV) administered may range from about $1\times10^6$, about $1\times10^7$, about $1\times10^8$, about $1\times10^9$, about $1\times10^{10}$, about $1\times10^{11}$, about $1\times10^{12}$, about $1\times10^{13}$, about $1\times10^{14}$, or to about $1\times10^{15}$ or more per ml. Dosages may also be expressed in units of viral genomes (vg) (i.e., $1\times10^7$ vg, $1\times10^8$ vg, $1\times10^9$ vg, $1\times10^{10}$ vg, $1\times10^{11}$ vg, $1\times10^{12}$ vg, $1\times10^{13}$ vg, $1\times10^{14}$ vg, $1\times10^{15}$ respectively). Dosages may also be expressed in units of viral genomes (vg) per kilogram (kg) of bodyweight (i.e., $1\times10^{10}$ vg/kg, $1\times10^{11}$ vg/kg, $1\times10^{12}$ vg/kg, $1\times10^{13}$ vg/kg, $1\times10^{14}$ vg/kg, $1\times10^{15}$ vg/kg respectively). Methods for titering viral vectors are described in Clark et al., *Hum. Gene Ther.*, 10:1031-1039 (1999).

In some embodiments, more than one administration (e.g., two, three, four or more administrations) may be employed to achieve the desired level of 3' UTR modification a period of various intervals, e.g., daily, weekly, monthly, or yearly.

Delivery to a target tissue can also be achieved by delivering a depot comprising the virus vector and/or capsid. In representative embodiments, a depot comprising the vector and/or capsid is implanted into skeletal, cardiac and/or diaphragm muscle tissue or the tissue can be contacted with a film or other matrix comprising the virus vector and/or capsid.

Combination therapies (e.g., chemotherapy or radiation therapy) are also contemplated by the present disclosure. Combination as used herein includes both simultaneous treatment and sequential treatments. Combinations of methods of the present disclosure with standard medical treatments are specifically contemplated, as are combinations with alternative vectors mentioned above, novel vectors that are engineered and generated to enhance the effect of therapy and novel therapies.

In some embodiments, the subject is administered an androgen receptor (AR) inhibitor along with the 3' UTRCES system of the present disclosure. In some embodiments, the method further comprises improving sensitivity to an androgen receptor (AR) inhibitor. Examples of androgen receptor (AR) inhibitors include, but are not limited to, enzalutamide, bicalutamide, abiraterone acetate, darolutamide, flutamide, nilutamide, darolutamide, and apalutamide.

The following Examples are provided by way of illustration and not by way of limitation.

EXAMPLES

Example 1: 3'UTR Length Change and Prostate Cancer Progression

It is known that 3'UTR is shortened in various cancer samples compared with paired normal tissues, including bladder urothelial carcinoma (BLCA), head and neck squamous cell carcinoma, lung squamous cell carcinoma (LUSC), lung adenocarcinoma (LUAD), breast invasive carcinoma (BRCA), kidney renal clear cell carcinoma (KIRC) and uterine corpus endometrioid carcinoma (UCEC) (see Xia et al. *Nat Commun* 5, 5274(2014)).

To examine whether 3' UTR length changes during prostate cancer progression from primary prostate cancer to castration-resistant prostate cancer (CRPC), RNA-seq data from The Cancer Genome Atlas (TCGA) primary prostate cancer dataset was re-analyzed and two CRPC patient cohorts (FIG. 1A) and RNA-seq data from NEPC and CRPC patient datasets (FIG. 1B) using a bioinformatics algorithm, DaPars, which was developed by the inventors and allows for de novo identification of dynamic alternative polyadenylation (APA) from RNA-seq data (Xia et al. *Nat Commun* 2014:5:5274).

Figure 1B:
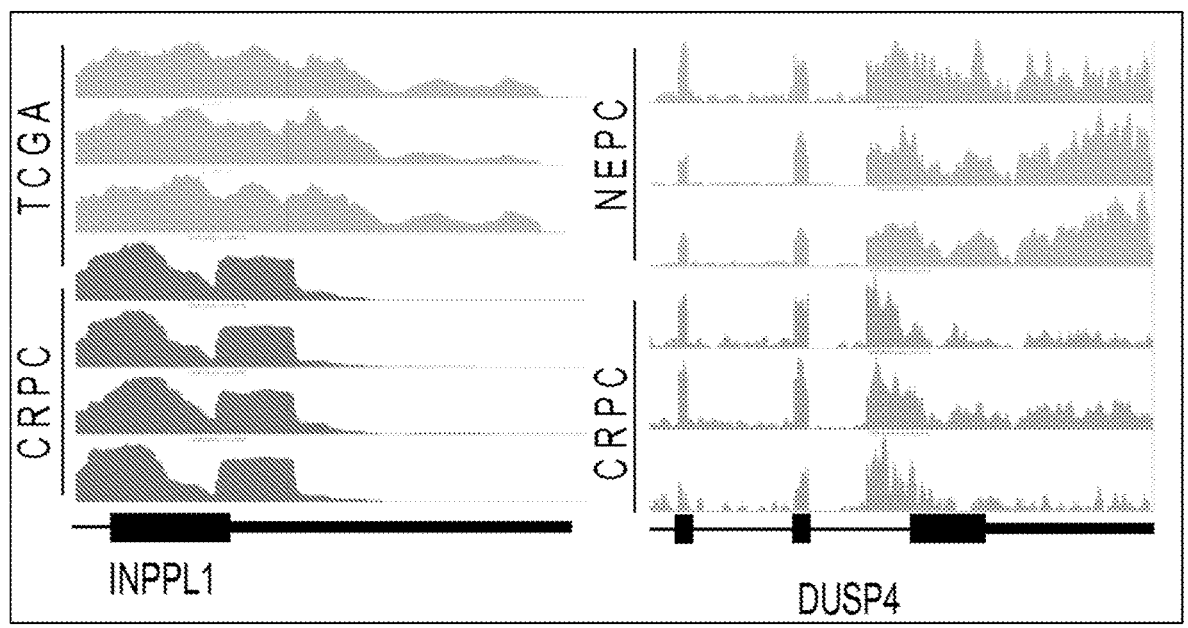

It was found that 3'UTR lengths are significantly shortened in lethal castration-resistant adenocarcinoma (CRPC) patients compared with primary prostate cancer patients, and that 3'UTR lengths are significantly lengthened in neuroendocrine prostate cancer (NEPC) compared with CRPC (FIG. 1A and FIG. 1B). Next 3' rapid amplification of cDNA ends (3' RACE) was conducted to determine whether the alternative polyadenylation sites (PAS) in clinical samples could be identified in prostate cancer cell models. This confirmed the existence of alternative PASs in CRPC and NEPC cell models.

Figure 2:
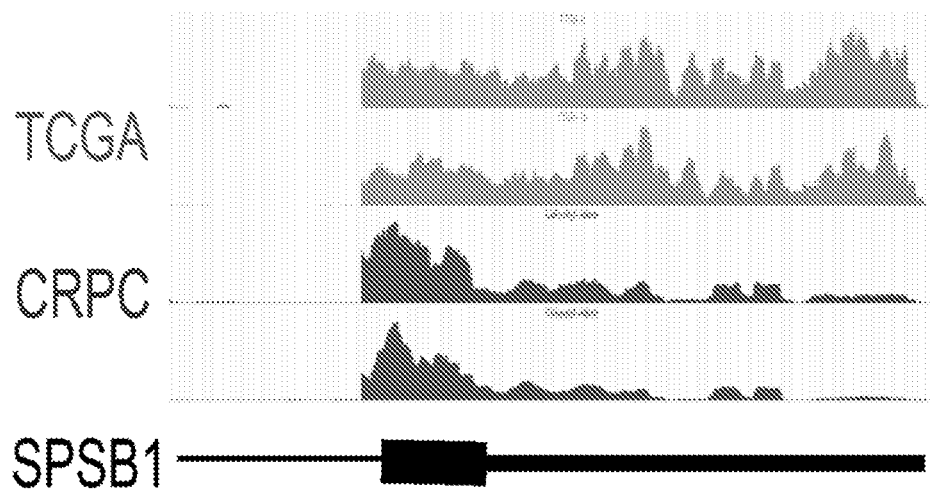
FIG. 2 show UCSC Genome Brower view of RNA-seq signals over the SPSB1 locus in CRPC and TCGA datasets.

Analysis revealed significant 3' UTR shortening in CRPC patient tissues compared with primary prostate cancer tissues (FIG. 1A and FIG. 1B, left panels). Two representative genes (INPPL1 and SPSB1) with shortened 3'UTR in CRPC versus TCGA are shown in FIG. 1B (left panel) and FIG. 2. Next 3' rapid amplification of cDNA ends (3' RACE) was conducted to determine whether the alternative polyadenylation sites (PAS) in clinical samples could be identified in CRPC cell models. This confirmed the existence of alternative PASs in CWR22RV1 (22RV1) and LNCaP-abl cells.

Figure 3:
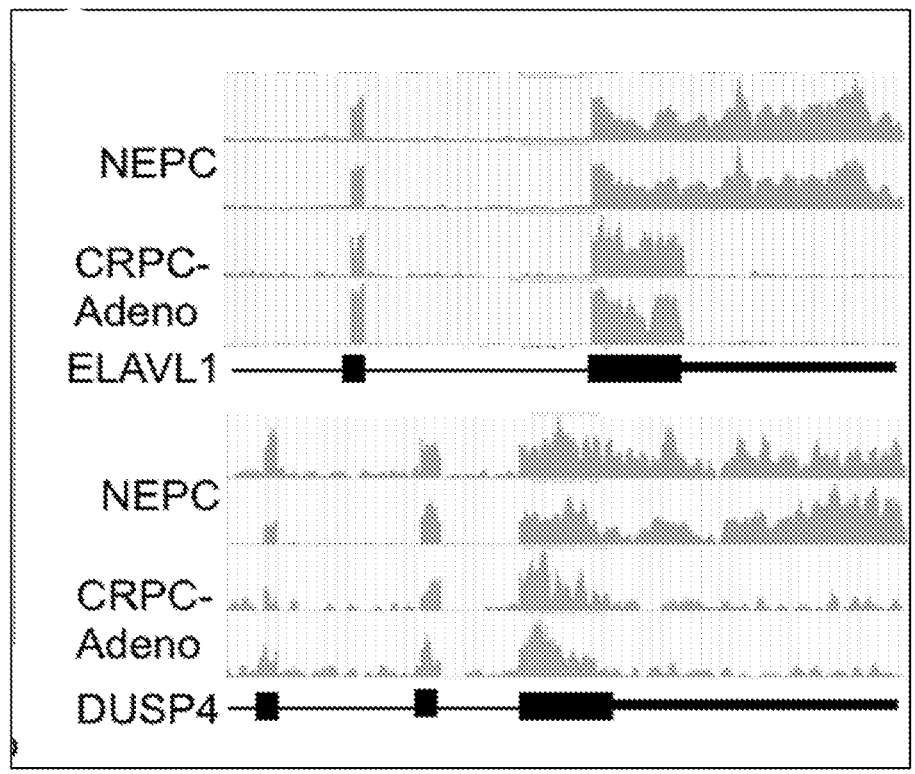
FIG. 3 UCSC Genome Browser view of RNA-seq signals over the ELA VU and DUSP4 loci in CRPC and NEPC datasets.

To examine whether 3'UTR length changes occur during prostate cancer progression from CRPC to NEPC, RNA-seq data from two cohorts with CRPC and NEPC patients was re-analyzed (Beltran et al. *Nature Medicine* 2016; 22:298-30; Robinson et al. *Cell* 2015; 161:1215-28). De novo identification of dynamic APA events in these RNA-seq datasets were performed using the Dynamic analyses of Alternative PolyAdenylation from RNA-seq (DaPars) algorithm (Xia et al. *Nature Commun* 2014; 5:5274). Significant (P=3.97E-24) 3'UTR lengthening in tissues from NEPC patients compared to CRPC patients was unexpectedly discovered (FIG. 1A, right panel). Two representative genes (ELAVL1 and DUSP4) with lengthened 3'UTR in NEPC versus CRPC are shown in FIG. 3. See also FIG. 1B. Next 3' rapid amplification of cDNA ends (3'RACE) was conducted followed by Sanger sequencing to determine whether the alternative polyadenylation sites (PAS) usage found in clinical samples could be identified in NEPC cell models. This confirmed the existence of alternative PAS in the NEPC lineage plasticity models LNCaP/AR shTP52/RB1 (Mu et al. *Science* 2017; 355:84-8) and C4-2/N-Myc (Lee et al. *Cancer Call* 2016; 29:536-47; Yin et al. *Molecular Cancer* 2019; 18:11)(data not shown).

Example 2: Genes Having 3'UTR Changes are Involved in Biological Processes

Figure 4A:
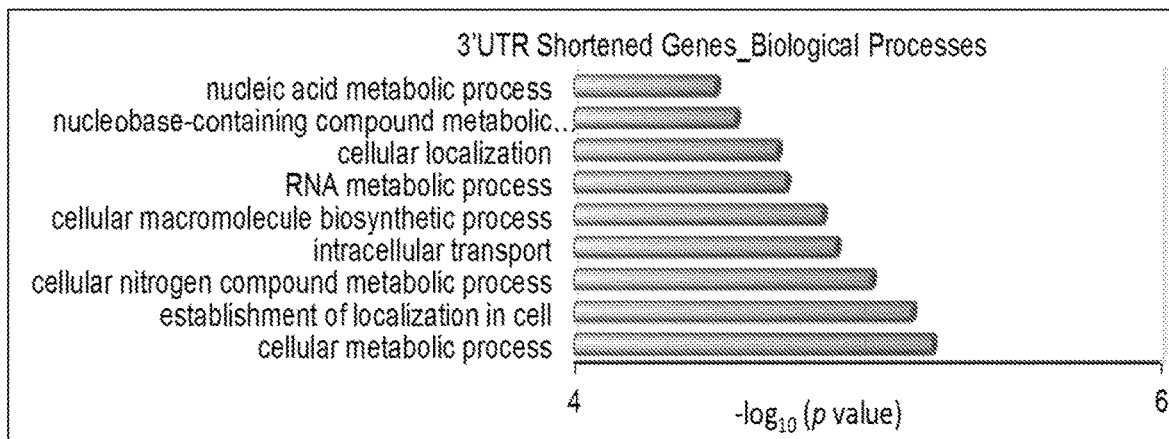
FIGS. 4A-4B show GO term biological process analysis of 3'UTR changed genes during prostate cancer progression.
Figure 4B:
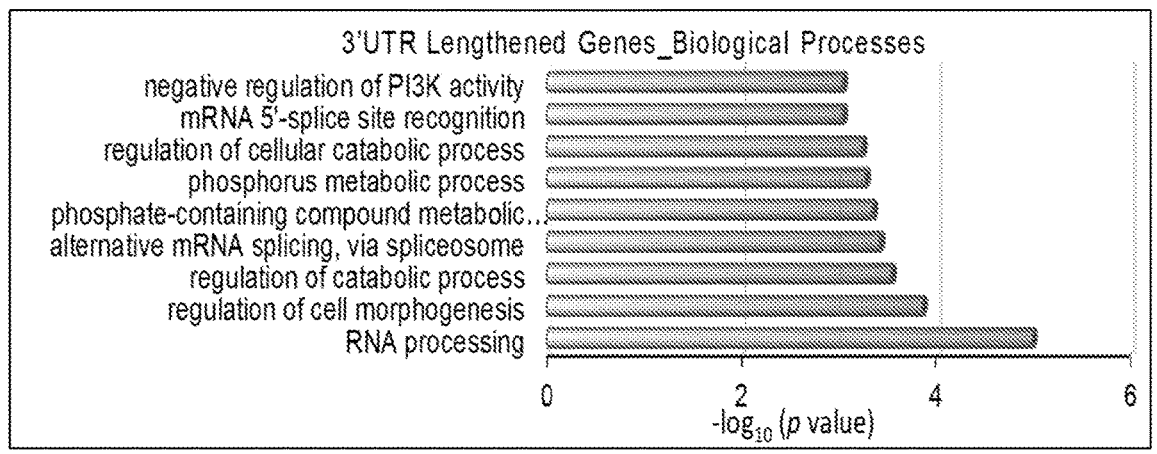

Gene Ontology (GO) term biological process analysis was performed and it was found that genes having 3'UTR length changes during prostate cancer progression from primary cancer to CRPC and from CRPC to NEPC were involved in various biological processes such as cell metabolism and mRNA processing (FIG. 4A-4B)

Example 3: 3' UTR Shortening Correlates with Patient Survival

Figure 5A:
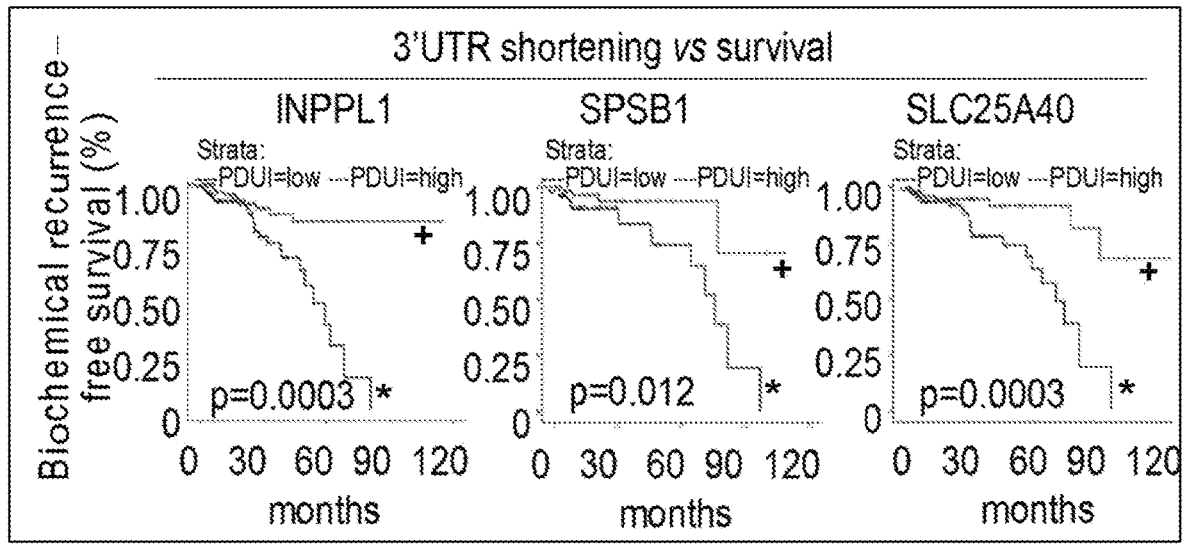
FIG. 5A are Kaplan-Meier survival plots for high-risk (*) and low-risk (+) groups separated by 3' UTR lengths.
Figure 5B:
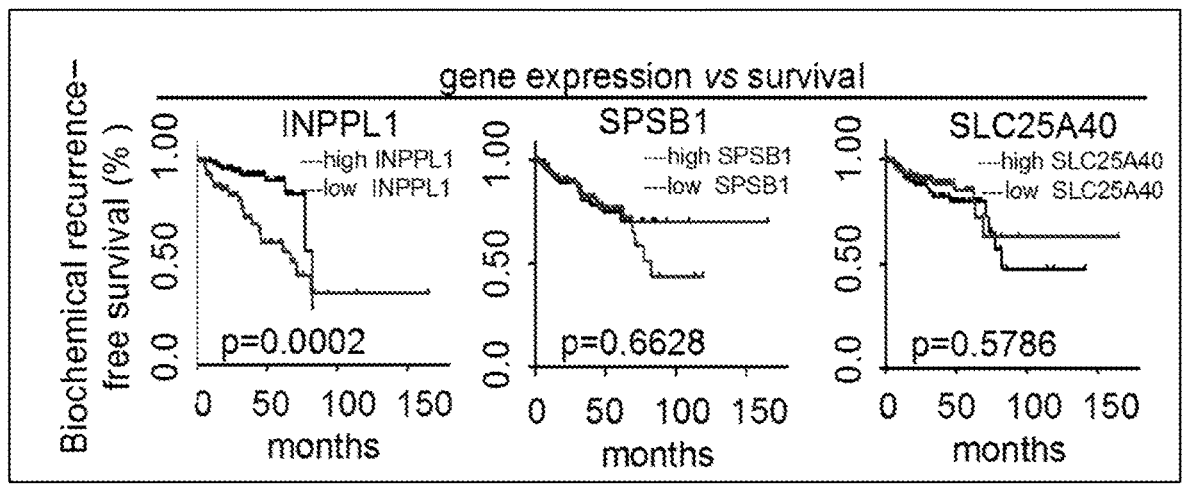
FIG. 5B are Kaplan-Meier curves comparing recurrence free survival of patients distinguished by gene expression values.

To ask whether 3' UTR changes correlate with patient survival, Kaplan-Meier survival analysis was performed using the TCGA data. This revealed that biochemical recurrence was significantly associated with 3'UTR shortening of 46 of the 370 (12.4%) genes exhibiting shortened 3' UTR in CRPC (p<0.05). Importantly, 3'UTR shortening in 44 out of these 46 genes (96%) was correlated with shorter time to biochemical recurrence (FIG. 5A and data not shown). Interestingly, gene expression changes of most of these 46 genes were not associated with survival (FIG. 5B and data not shown). Exemplary genes exhibiting shortened 3' UTR that correlated with survival in CRPC included CDC26, INPPL1, DLL, HEATR3, SLC25A40, SPSB1, MRI1, MED18, GABPA, and TTC8. These genes were identified as candidate genes involved in CRPC cell proliferation, cell invasion, and cell colony formation. Proximal poly-adenylation sites (PAS) of the candidate genes were identified by 3'RACE, as shown in Table 2.

TABLE 2

Proximal poly-adenylation sites (PAS) of the candidate genes were identified by 3'RACE

|  | LNCaP-abl cells | 22RV1 cells | C4-2B cells |
| --- | --- | --- | --- |
| Cell proliferation | HEATR3 | SPSB1 | HEATR3 |
|  | SPSB1 | INPPL1 | INPPL1 |
|  | INPPL1 | SLC25A40 | SPSB1 |
|  | MRI1/CDC26 | CDC26 | CDC26 |
| Colony formation | DLL1 | HEATR3 | MRI1 |
|  | INPPL1 | SPSB1 | DLL1 |
|  |  | CDC26 | INPPL1 |
| Invasion/migration | MRI1 | DLL1 | HEATR3 |
|  | DLL1 | CDC26 | CDC26 |
|  | INPPL1/CDC26 |  |  |

Therefore, 3' UTR alterations can predict prostate cancer biochemical recurrence independently of gene expression.

Figure 6A:
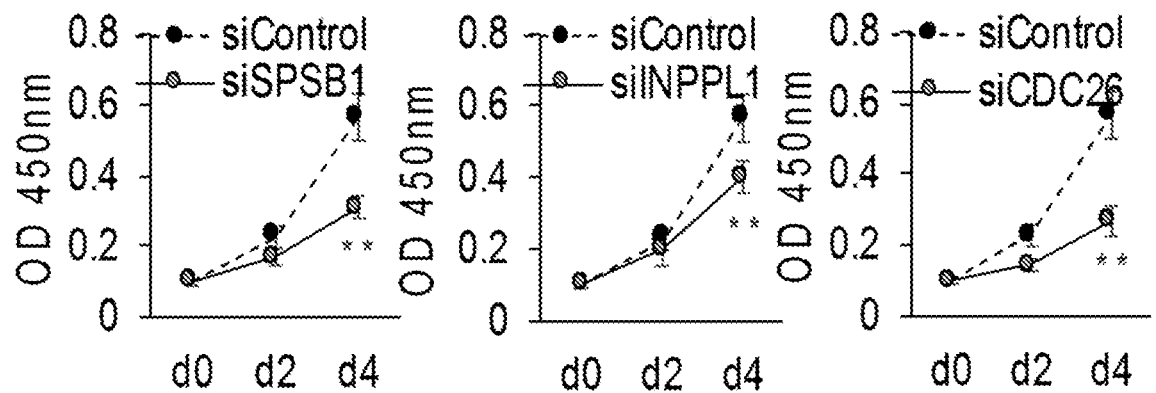
FIGS. 6A-6B show functional characterization of genes with shortened 3'UTR in CRPC cells.
Figure 6B:
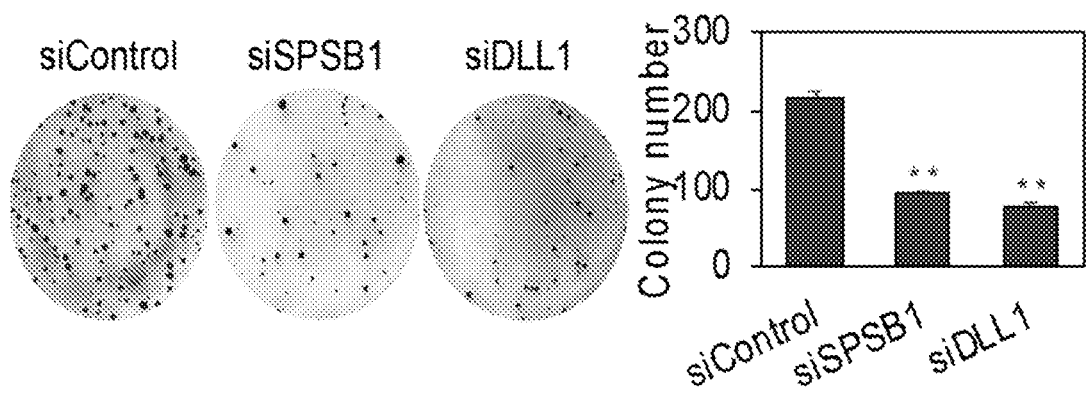

Example 4: Functional Characteristics and Clinical Relevance of Genes with Shortened 3'UTR The biological functions of the newly discovered genes with shortened 3' UTR were studied in three different CRPC cell models: LNCaP-abl, 22RV1 and C4-2B. These CRPC cell models mimic the clinical properties of different CRPC patients. First, siRNA-based knockdown was performed on 10 genes selected based on 3' UTR length change magnitude and survival analysis, followed by cell proliferation assays, cell invasion assays, and/or colony formation assays. Silencing three of these ten genes significantly inhibited cell proliferation in all three tested CRPC cell lines (FIG. 6A). Of note, SPSB1. INPPL1, and CDC26 have not been defined as an oncogene (OG) or tumor suppressor gene (TSG) based on mutation analysis in COSMIC (the Catalogue Of Somatic Mutations In Cancer (see Sondka. Z. et al., *Nat Rev Cancer* 18, 696-705: Tate. J. G. et al. *Nucleic* Acids Res 47, D941-D947). Both biological function and 3'UTR regulation of these three genes have not been studied in CRPC. In addition to these 3 genes playing a general role in promoting cell proliferation, additional genes were identified that enhance proliferation in a cell type-specific manner (data not shown). Knockdown of some genes with shortened 3' UTR in CRPC also decreased cell invasion (data not shown) and colony formation (FIG. 6B). Based on these functional studies, further studies are planned for 7 genes (CDC26, DLL1, INPPL1, SPSB1, MRI1, HEATR3 and SLC25A40) that increase cell proliferation, invasion or survival in CRPC cells.

In Vitro Experiments

CRISPR/Cas9 technology will be used to confirm the functional significance of 7 selected genes in CRPC cells (LNCaP-abl, 22RV1 and C4-2B) in vitro. 22RV1 cells were obtained from the American Type Culture Collection (ATCC) and have been authenticated prior to commencing the preliminary studies and proposed studies by short tandem repeat (STR) profiling and karyotyping. LNCaP-abl cells and C4-2B cell lines were authenticated as described previously (Culig et al., *Br J Cancer*. (1999) 81(2):242-51; Liu et al., *Clin Cancer Res*. 2014; 20(12):3198-210). The cell lines are passaged for less than 6 months after resuscitation. Relevant functional and molecular phenotyping are conducted throughout the investigations. The cell lines are routinely tested to ensure they are free of *mycoplasma* contamination (*Mycoplasma* Detection Kit, Sigma-Aldrich, St. Louis, MO).

In preliminary studies using siRNA-mediated gene silencing, 7 candidate genes that promote CRPC cell growth, invasion and/or survival were identified. Although ON-TARGETplus™ siRNA pools (mixtures of four siRNAs targeting different regions of the candidate gene, Dharmacon) designed to minimize siRNA off-target effects were used, the off-target effects associated with RNAi strategies may still be a concern in view of the key roles of RNAi in endogenous processes (Birmingham et al., *Nat Methods*. 2006; 3(3):199-204). Thus, further validation of these results will be performed using CRISPR/Cas9 knockdown of these 7 genes in the above 3 CRPC cell lines. For each candidate gene, 3 gRNAs are designed and cloned into the CRISPR-V2 plasmid (Addgene #49535), and their knockdown efficiency will be determined by western blotting 48 hours after transfection. Cell growth, invasion and survival effects are determined using WST-1, direct cell counting, cell invasion, and colony formation assays.

In Vivo Experiments

In vivo studies are employed to further examine the functional significance of 3'UTR shortened genes on tumor growth. Two candidate genes with the most effect on CRPC cell proliferation will be selected for in vitro for In vivo xenograft experiments. LNCaP-abl and 22RV1 xenografts will be conducted as described in previous studies (Wang et al., *Cancer Res.* 2011; 71(14):4866-76; Chen et al., *Proc Natl Acad Sci USA.* 2018; 115(26):6810-5). Briefly, shRNA-encoding genes are cloned into the pLKO.1-TRC Cloning Vector (Addgene #10878), and cells are infected with lentivirus encoding specific shRNA against target genes or control shRNA. Stable cell lines are established by antibiotic selection. Male, 5-6-week-old, Balb/c athymic nude mice from Charles River Laboratory are acclimated for 1 week in a pathogen-free enclosure before the start of the study. 100-μL cell suspensions ($1 \times 10^6$ 22RV1 or $2 \times 10^6$ LNCaP-abl cells) are inoculated subcutaneously into castrated mice.

Statistics are used to perform power and sample size calculations and statistical analysis. The in vitro experiments are performed at least in triplicate. Between-group significance is assessed using two-factor ANOVA. For in vivo xenograft experiments, sample sizes are based upon previous experience and power calculations for detecting biologically relevant changes in tumor mass. A sample size of n=10/group could be necessary to detect a 35% treatment effect on tumor mass (primary outcome) assuming up to 15% deviation, with a p<0.05 and β=0.8. To ensure 10 evaluable mice per group, twelve mice are employed (n=12/group) to account for an estimated 90% engraftment rate or rare complications of surgical procedures.

Mice are monitored and tumor size is quantified 3 times weekly. At the time point at which the average tumor diameter reaches 1 cm for tumors expressing shRNA control, mice are sacrificed. Tumor weight is measured, and histopathologic analysis performed as previously described (Wang et al., *Cancer Res.* 2011; 71(14):4866-76; Chen et al., *Proc Natl Acad Sci USA.* 2018; 115(26):6810-5).

Immunohistochemistry Analysis of Genes with Shortened 3' UT During Prostate Cancer Progression To examine the protein expression of the above two candidates with the strongest functional significance, IHC will be performed with tumor microarrays (TMAs) containing 100 normal prostates (from patients whose prostate was removed due to benign prostatic hyperplasia [BPH] or bladder cancer), 100 primary prostate cancer (PC) and 100 CRPC specimens using specific antibodies. Initially, staining procedures (antibody dilution, secondary antibodies, and detection methods) are defined using paraffin embedded cell blocks from positive and negative control cells and tested on anonymous human PC and normal prostate. Target gene staining across PC samples is also assessed.

Results

Candidate genes are knocked down after cells are transfected with CRISPR/Cas9 and cells show the same outcomes as preliminary siRNA-based functional studies. Candidate genes picked out from in vitro assays have strong tumor repression effects after knockdown in xenograft models. Although 3'UTR APA impacts various aspects of mRNA and protein of 3' UTR controlled genes (Tian et al., *Nat Rev Mol Cell Biol.* 2017; 18(1):18-30), in most cases 3' UTR APA will ultimately influence protein expression of target genes. In addition, preliminary studies have found that 3' UTR shortening is associated with worse clinical outcomes in primary PC patients (FIG. 5A and FIG. 5B). Thus protein expression of the target genes will be higher in CRPC patients compared with primary PC patients.

Figure 7A:
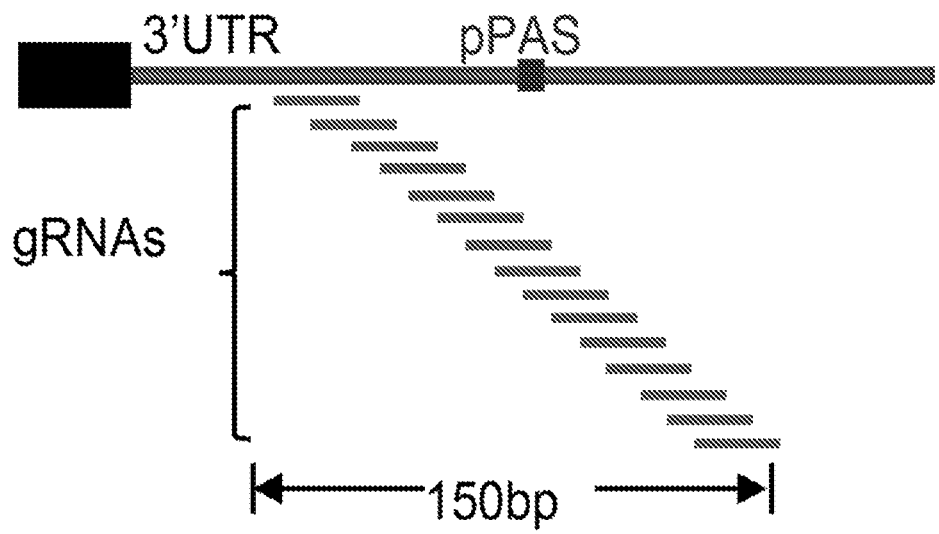
FIGS. 7A-7F show that manipulation of 3'UTR length by 3'UTRCES.
Figure 7B:
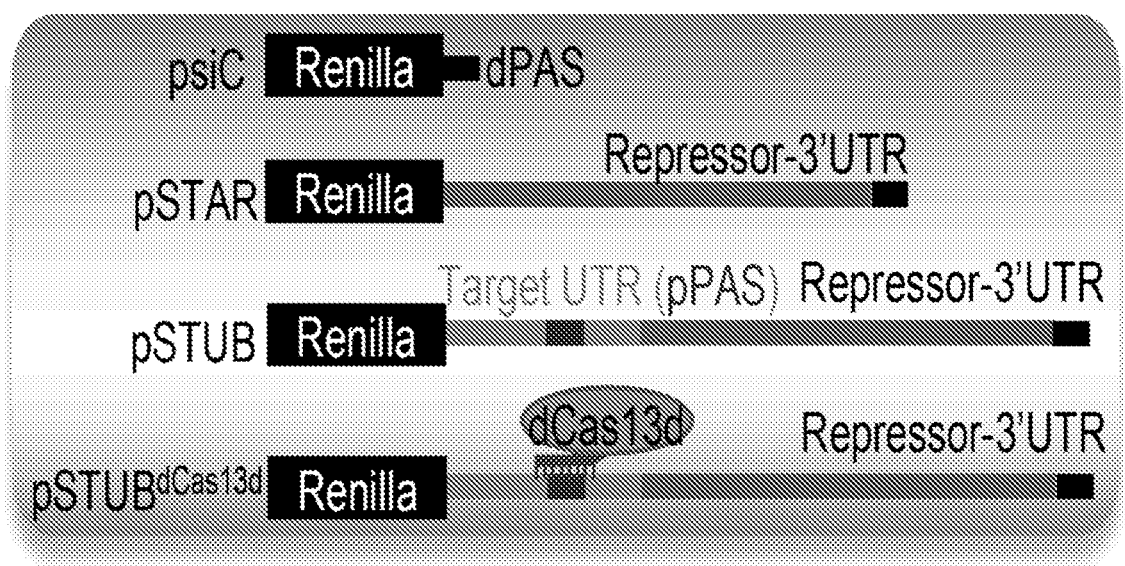

Example 5: The Molecular and Biological Impact of Engineering 3' UTR Length by CRISPR-dCas13d in CRPC While manipulating expression of polyadenylation machinery factors (e.g. CFIM25) can globally regulate 3' UTR length (Masamha et al., *Nature.* 2014; 510(7505):412-6; Brumbaugh et al., *Cell.* 2018; 172(1-2):106-20 e21), current technologies are not able to directly manipulate the length of a desired 3' UTR. To investigate whether 3' UTR shortening affects expression of mRNAs and proteins of 3' UTR controlled genes as well as CRPC cell phenotypes, a 3'UTR CRISPR-dCas13d Engineering System (3'UTRCES) was developed. Basically, 3' UTRCES manipulates the length of 3' UTR by using gRNA to guide catalytically dead Cas13d (dCas13d) (Konermann et al., *Cell.* 2018; 173(3):665-76) to cis elements upstream and/or downstream of the desired PAS, thus preventing binding of trans factors involved in cleavage and poly-adenylation and redirecting these processes to the alternative PAS. The first step in engineering 3' UTR length is to identify usable dCas13d blocking sites by the newly developed pSTUB system (a plasmid system to identify usable dCas13d blocking sites) (FIG. 7A and FIG. 7B), which is based on the pSTAR system (Jenal et al., *Cell.* 2012; 149(3):538-53). The pSTAR system consists of the psiCHECK2 (psiC) dual luciferase vectors, containing the wild-type (WT) or mutant proximal CCND2 PAS ($D2^{WT}$ or $D2^{mut}$) upstream of the repressor-3'UTR fragment and was used to screen trans factors that regulate the usage of APA with RNAi screen. The purpose of the pSTUB system is to identify the best gRNAs to guide dCas13d blocking of the candidate gene PAS usage, which is composed by two parts: 1) the pSTUB: this part is developed from the psiCHECK2. The repressor-3'UTR sequence and target gene proximal PAS as well as its upstream/downstream cis elements were inserted upstream of the dPAS in psiCHECK2; 2) the $pSTUB^{dCas13d}$; this part includes the dCas13d and gRNAs (FIG. 7B).

The MLL-3'UTR repressor and the candidate 3'UTR sequences were amplified from human mRNA reversed first strand DNA and were inserted into psiCHECK2 (the backbone and PCR amplified fragments were digested with XhoI/SalI and NotI restriction sites). The candidate gene 3'UTR sequences were inserted upstream of the MLL-3'UTR repressor. The 3'UTR repressor and candidate sequences are shown in Table 3.

TABLE 3

3'UTR repressor and candidate sequences used in the PSTUB system

| | Sequence |
|---|---|
| MLL-3'UTR repressor | CTGTTAGAAAGTGGGAATGGGGTCCCTAGCAGACTTGCCTGGAAGGA GCCTATTATAGAGGGTTGGTTATGTTGGGAGATTGGGCCTGAATTTC TCCACAGAAATAAGTTGCCATCCTCAGGTTGGCCCTTTCCCAAGCAC |

TABLE 3-continued

3'UTR repressor and candidate sequences used in the PSTUB system

| | Sequence |
|---|---|
| | TGTAAGTGAGTGGGTCAGGCAAAGCCCCAAATGGAGGGTTGGTTAGA<br>TTCCTGACAGTTTGCCAGCCAGGCCCCACCTACAGCGTCTGTCGAAC<br>AAACAGAGGTCTGGTGGTTTTCCCTACTATCCTCCCACTCGAGAGTT<br>CACTTCTGGTTGGGAGACAGGATTCCTAGCACCTCCGGTGTCAAAAG<br>GCTCTCATGGGGTTGTGCCAATTAATTACCAAACATTGAGCCTGCAG<br>GCTTTGAGTGGGAGTGTTGCCCCCAGGAGCCTTATCTCAGCCAATTA<br>CCTTTCTTGACAGTAGGAGCGGCTTCCCTCTCCCATTCCCTCTTCAC<br>TCCCTTTTCTTCCTTTCCCCTGTCTTCATGCCACTGCTTTCCCATGC<br>TTCTTTCGGGTTGTAGGGGAGACTGACTGCCTGCTCAAGGACACTCC<br>CTGCTGGGCATAGGATGTGCCTGCAAAAAGTTCCCTGAGCCTGTAAG<br>CACTCCAGGTGGGGAAGTGGACAGGAGCCATTGGTCATAACCAGACA<br>GAATTTGGAAACATTTTCATAAAGCTCCATGGAGAGTTTTAAAGAAA<br>CATATGTAGCATGATTTTGTAGGAGAGGAAAAAGATTATTTAAATAG<br>GATTTAAATCATGCAACAACGAGAGTATCACAGCCAGGATGACCCTT<br>GGGTCCCATTCCTAAGACATGGTTACTTTATTTTCCCCTTGTTAAGA<br>CATAGGAAGACTTAATTTTTAAACGGTCAGTGTCCAGTTGAAGGCAG<br>AACACTA (SEQ ID NO: 10) |
| SPSB1 3'UTR candidate | ACCGGCATCCGTAGCCATGGACAGAGGTCCCTGGTCTTCCCTCATCC<br>TCCGTGGCTGCCTCCATGGGACAAGGACCGATTCCAACACAGGCTCC<br>TCTTTCCCCCTTCCCGACATCAGCAGAAGGCAGCATCCCTGCATGCC<br>GTCCGTATACAACCCCTCTTTGAAAAAAGACACAGAGAATAAACTCC<br>TACGAAAGCCCTACATTGAGCTCCAATCTGCTCGGGGTGGGACGGGT<br>GCTTCCCACACCTCTGGGAGAAGGCTGCAGCCACCTGGGGGTCCCAG<br>GGTGGTGGGGGTGGCAGG (SEQ ID NO: 11) |
| INPPL1 3'UTR candidate | GAGCTCCGCTAAGACCTCCCCACCCCCGCTGGGGGTGGGGGCGGGTG<br>TCCGTCCGGAAATGAAGGAATAGCCCGAGGACCGGGCTGGGGTTTAT<br>TTAAACTGTTCTGTGTGGGTCTGGGGAGGGAGAGCACCTTAATATTA<br>TTGGGGTTGGTTGGGGTGGGGCAGGATCTCAGCCATAAAGTGCCAGT<br>TTGCTTAGTTCTCACTGTCTCCTGGTCTGTGCTGCCCTGCTCTGGGG<br>ATGCACGGCGGCAGGGTGGGGGAGGGAGGTTCCTCGCAGGTCTCAGC<br>CCGGGACAGGGTCTTGCA (SEQ ID NO: 12) |

Figure 7C:
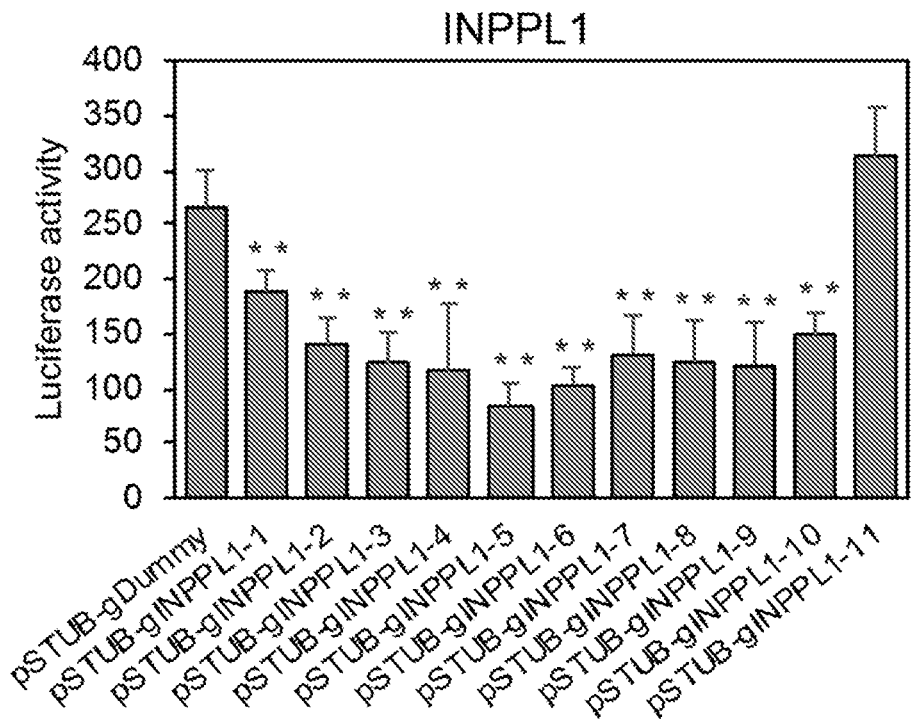
Figure 7D:
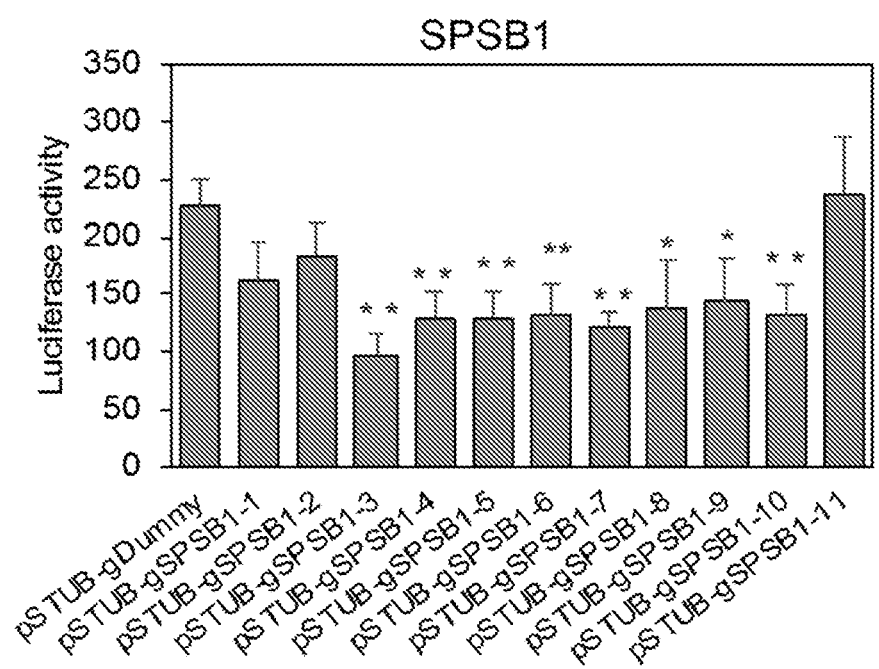
Figure 7E:
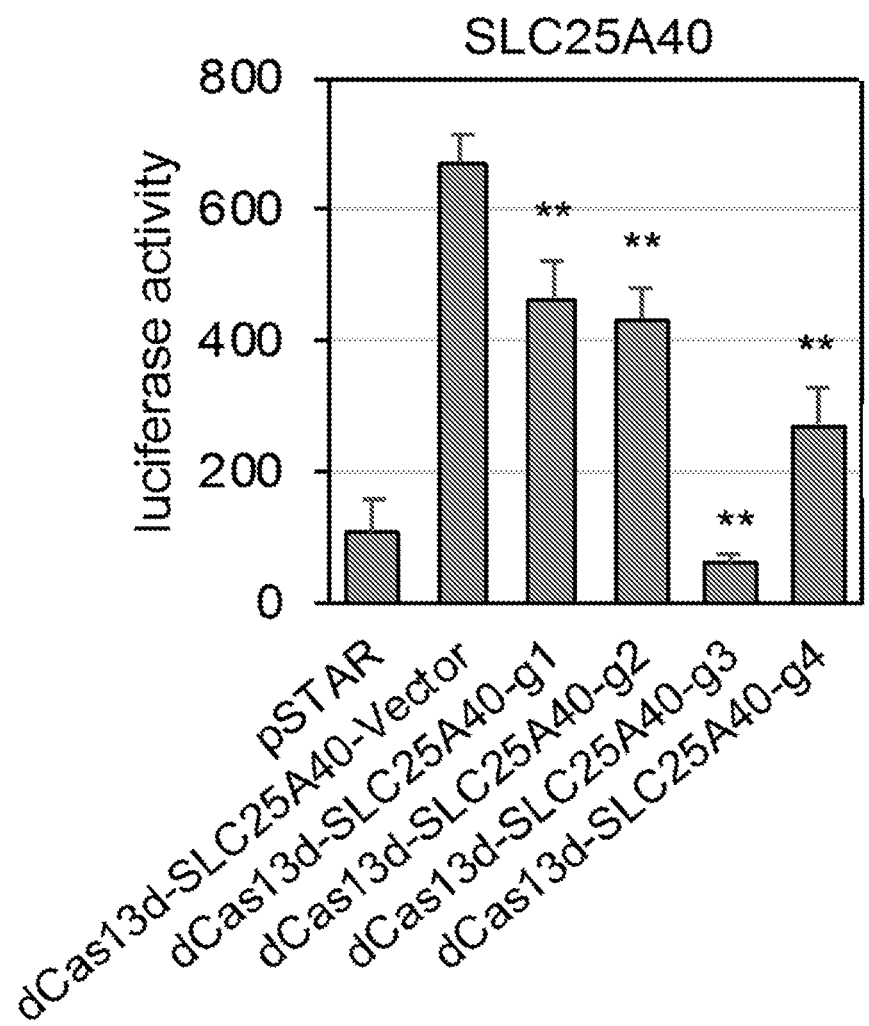

Using pSTUB, it was discovered that gRNA-guided dCas13d blocking of proximal PAS sites in INPPL1, SPSB1 and SLC25A40 alleviated 3' UTR-mediated luciferase repression (FIG. 7C, FIG. 71D, FIG. 7E, respectively). pSTAR used in FIG. 7E was used as a negative control. As the pSTAR only contains a Repressor-3' UTR and does not contain the targeted UTR, the luciferase activity should be low. The identified optimal gRNAs are subcloned into a constructed dCas13d-gRNA all-in-one vector (hU6-pregRNA_EF1a-dCasRx-2A-EGFP) or separate lentivirus dCas13d and gRNA vectors (FIG. 14A) to measure endogenous gene 3' UTR length changes and CRPC cell phenotypes after transfection/infection. The dCas13d-gRNA all-in-one vector can express both dCas13d and gRNA when transfected using a non-viral transfection method (e.g. Lipofectamine™ transfection).

Figure 7F:
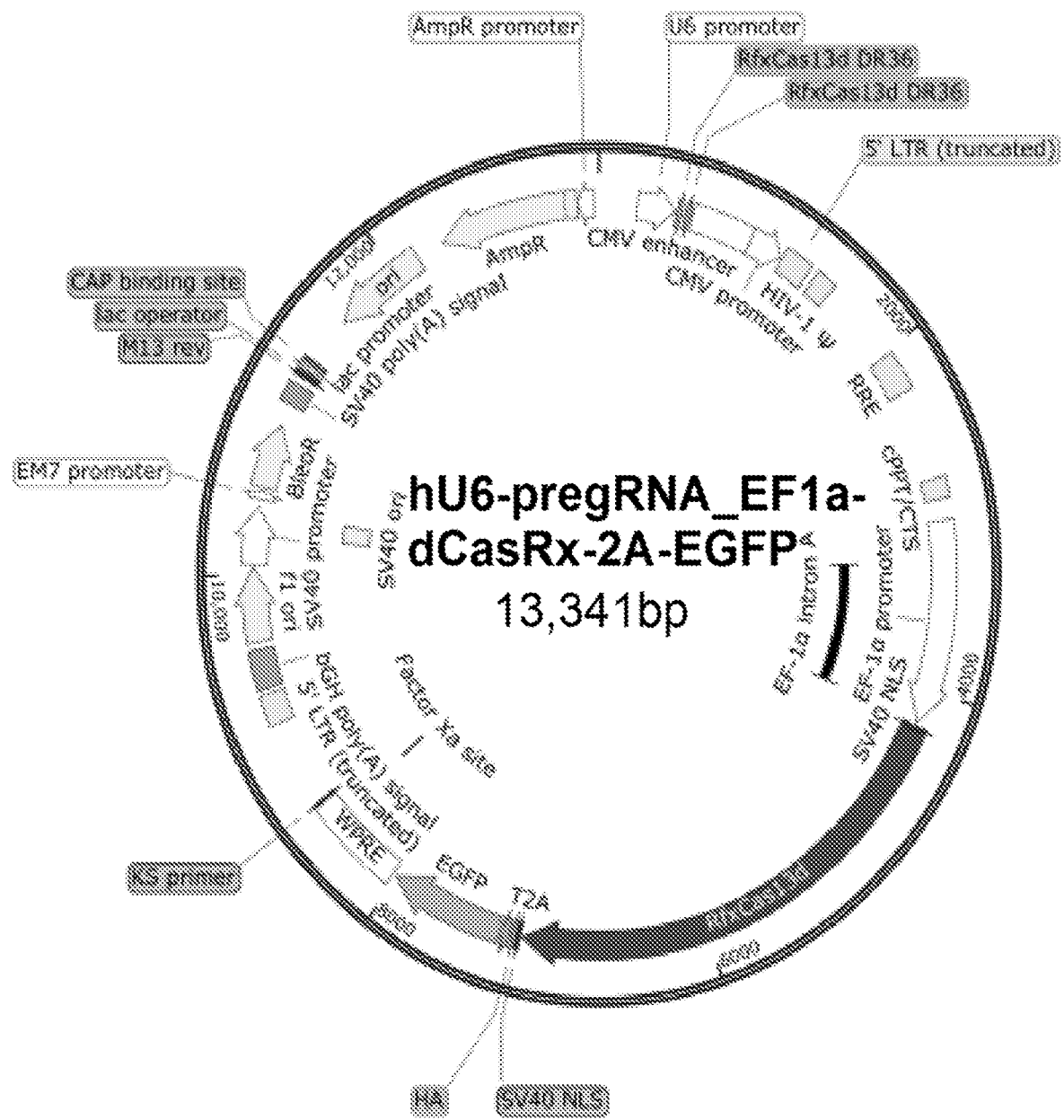

Determination of the Molecular Impact of 3' UTR Engineering on Target Gene Function The pSTUB system was developed to identify the best gRNAs for 3'UTR length manipulation. In preliminary studies, gRNAs for blocking the pPAS of SPSB1 and SLC25A40 were identified (FIGS. 7A-7C). Next, the pPAS of two target genes with the strongest functional significance in vitro is cloned into pSTUB. For each gene, 11 gRNAs are designed, and pSTUB, dCas13d and the gRNA are co-transfected into 22RV1, LNCaP-abl and C4-2B cells using Lipofectamine™ 3000 (Invitrogen, Carlsbad, CA). gRNAs predicted to not recognize any genomic regions are transfected as controls. Luciferase activity will be measured by microplate reader (SpectraMax® M3, Molecular Devices, Inc., San Jose, CA). For manipulation of 3'UTR length in CRPC cells, control gRNAs and 2-3 target gRNAs with the most manipulation efficiency are picked out from the pSTUB screening and cloned into an all-in-one vector (FIG. 7F) or separate lentivirus dCas13d and gRNA vectors (FIG. 14 A). CRPC cell lines are transfected with control or gene specific vectors. The lengthened and shortened isoforms of target genes are detected by 3' End qRT-PCR 48 hours after cell infection, as previously described (Jenal et al. Cell. 2012; 149(3):538-53). To determine whether 3'UTRCES has off-target effects, RNA-seq is conducted using lentivirus infected 22RV1, LNCaP-abl and C4-2B cells. 3' UTR usage is analyzed by DaPars (Xia et al. Nat Commun. 2014; 5:5274), and differential gene expression is determined by Partek Genomics Suite as described previously (Chen et al. Nat Commun. 2015; 6:8323).

To determine the impact of 3' UTR manipulation on the molecular function of its corresponding genes, the following analyses are performed using lentiviral infected CRPC cells: (a) To determine whether 3' UTR manipulation affects mRNA stability, mRNA half-life is measured. Briefly, the transcription inhibitor actinomycin D (ActD) is used to block the synthesis of new RNA, and residual mRNA is measured by real time PCR (Yuan et al. Aging Cell. 2017; 16(4):726-37); (b) To determine if 3' UTR length changes affect mRNA translation, short or long 3' UTR of candidate genes are cloned into IRES reporters separately and transfected into CRPC cells. After 24 hours, cells are assayed to measure Firefly luciferase (F-luc) and Renilla luciferase (R-luc) activity as previously described (Wang et al. Cell. 2015; 161(6):1388-99). In addition, the effect of 3' UTR manipulation on protein expression is determined by western blot analysis; (c) To assess if 3' UTR length changes impact mRNA nuclear export and localization, cellular fractions are obtained, and target gene mRNA distribution ratio between cytoplasm and nucleus is determined by qRT-PCR; (d) To determine if 3' UTR manipulation influences protein localization, cell immunofluorescence is performed as described previously (Yuan et al. *Cell Death Dis.* 2018; 9(5):518).

Determination of the Biological Impact of 3' UTR Engineering on Target Gene Function To determine the effect of dCas13d targeting to the pPAS of candidate gene 3' UTR on CRPC growth in vitro, each target gene, control gRNA and 2-3 gRNAs with the most significant manipulation efficiency are subcloned into the all-in-one vector (FIG. 7F) or separate lentivirus dCas13d and gRNA vectors (FIG. 14 A). CRPC cells are transfected with the all-in-one vector or infected with lentivirus encoding control or pPAS-specific vector, and cell growth, invasion and colony formation assays are performed as described above. The in vitro studies are then extended to in vivo xenograft models. Lentivirus infected LNCaP-abl and 22RV1 cells are inoculated subcutaneously into male, 5-6-week-old, Balb/c athymic nude castrated mice as described above. Tumor sizes and weights are measured. qRT-PCR is performed to measure the expression of total mRNA and mRNA isoforms with different 3' UTR lengths.

Results

The gRNA with the best engineering efficiency in the pSTUB system will lengthen endogenous 3' UTR with the highest efficiency. Considering the differences between the plasmid system and the endogenous gene, all functional gRNAs are selected for each 3' UTR from pSTUB. As 3' UTR APA may affect mRNA stability, translation, or protein localization (Tian et al., *Nat Rev Mol Cell Biol.* 2017; 18(1):18-30), the impact of 3'UTRCES on all of these aspects is assessed, 3' UTR manipulation will affect one or more molecular processes, contributing to CRPC cell phenotypic changes. For molecular and cell phenotype assays, if differences are detected between control and 3'UTRCES manipulated cells, then the challenges of lentiviral vector delivery can be addressed by optimizing the doses of lentivirus used to transduce the CRPC cell lines. The EGFP expression from dCasRx vector and the mcherry expression from gRNA vector (FIG. 14A) can be used to isolate GFP and mcherry positive cells by FACS before performing downstream functional analysis. Finally, RNA-seq detects the presence or absence of significant off-target effects after 3'UTRCES is applied to manipulate a target gene. These effects are minimal, as previous studies have found that Cas13d guide RNAs exhibit few off-target effects (Konermann et al. *Cell.* 2018; 173(3):665-76).

Example 6: Analysis of Genes Exhibiting Lengthened 3'UTR in NEPC Vs. CRPC

Nine genes were selected out of the 163 total genes exhibiting lengthened 3'UTR in NEPC vs. CRPC, based on the following two criteria: 1) these 9 genes have the highest fold changes in Percentage of Distal polyA site Usage Index (PDUI) in NEPC compared with CRPC; 2) these genes show consistently lengthened 3'UTR among all 15 NEPC patient samples (Beltran et al. *Nature Medicine* 2016; 22:298-305). RT-PCR analysis was performed to examine total mRNA expression and long isoforms expression of the 9 genes with lengthened 3'UTR in NEPC lineage plasticity models compared with their paired CRPC counterparts (LNCaP/AR shTP53/RB1 versus LNCaP/AR shNT, and C4-21N-Myc versus C4-2/Vector, respectively).

Figure 8A:
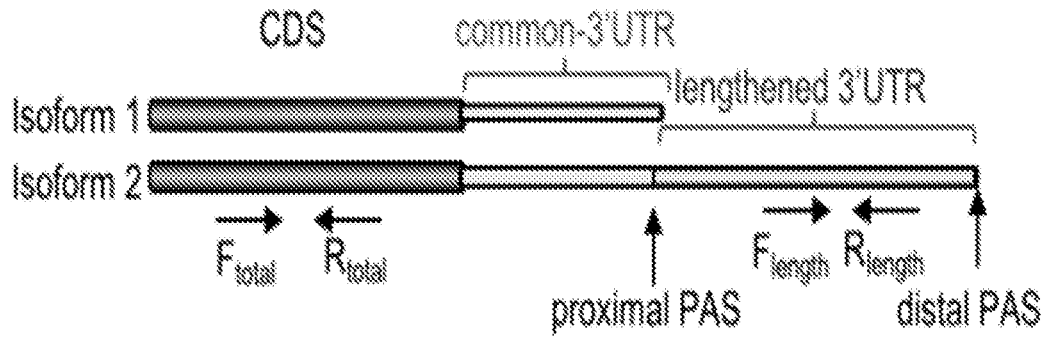
FIGS. 8A-8D show that 3'UTR is lengthened in the LNCaP/AR shTP53/RB1 NEPC lineage plasticity model compared with its paired CRPC model LNCaP/AR shNT.
Figure 8B:
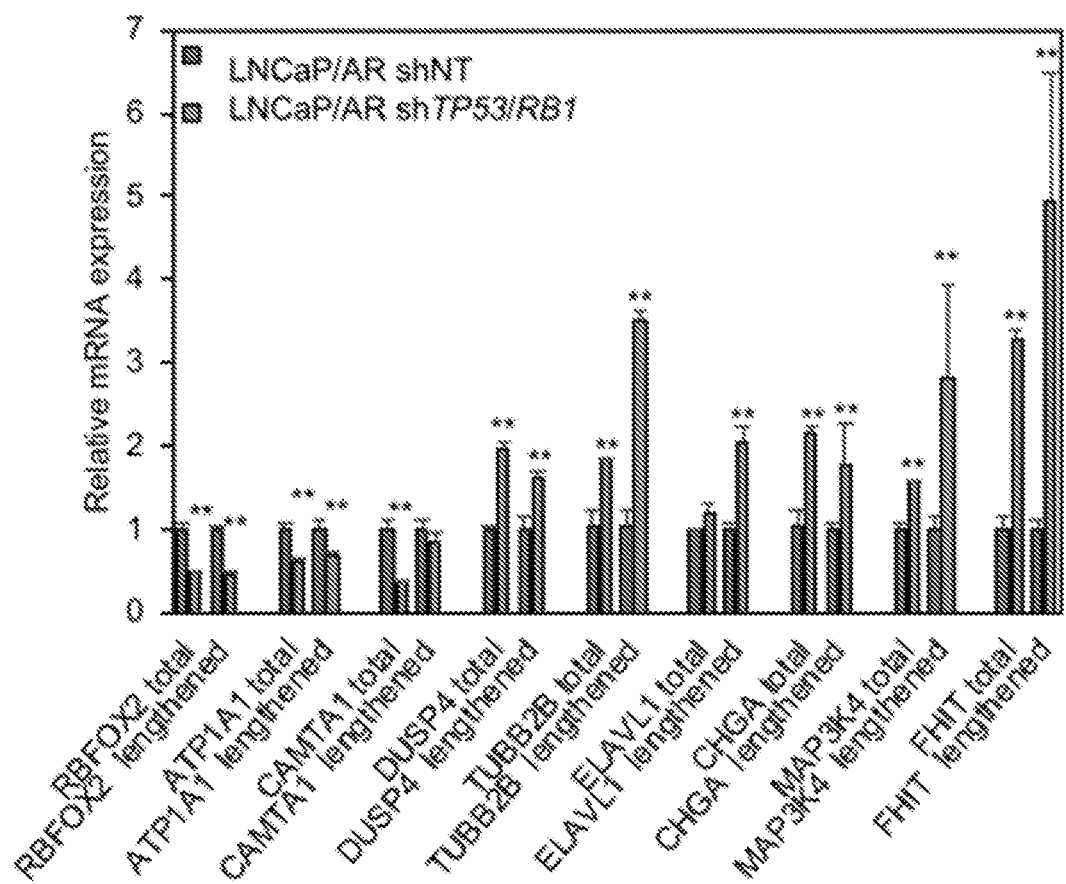
Figure 8C:
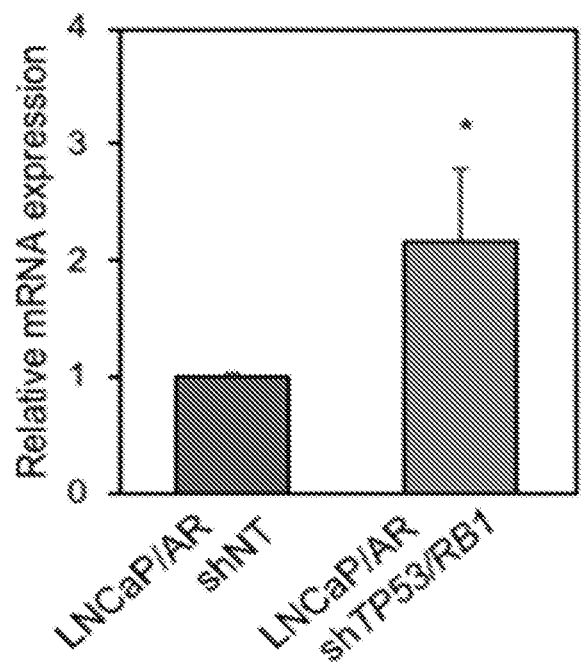
Figure 8D:
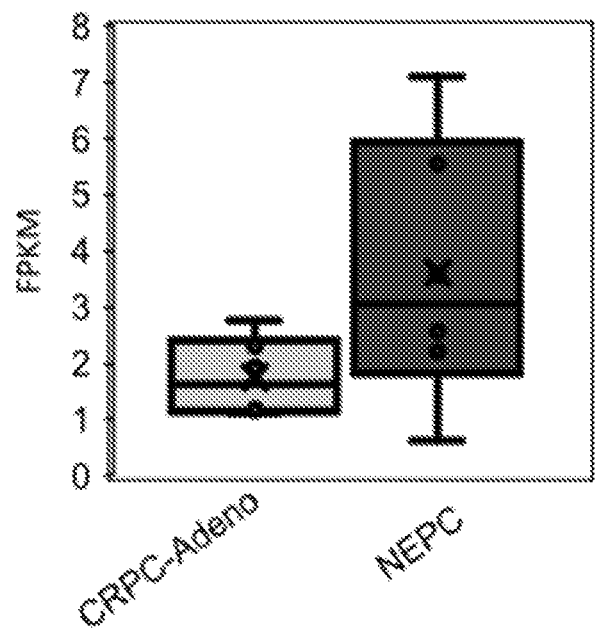

This analysis confirmed the preferential expression of the long isoforms of 6 genes, DUSP4, TUBB2B, ELAV1, CHGA, MAP3K4, and FHIT in the NEPC lineage plasticity model compared with the CRPC model (FIG. 8A and FIG. 8B, and data not shown). Surprisingly, while many models suggest that genes with longer 3'UTR tend to be downregulated in primary tumors compared with normal tissues (Xia et al. *Nature Commun* 2014; 5:5274), it was found that total mRNA expression of the above 6 genes with longer 3'UTR is upregulated in NEPC lineage plasticity models versus paired CRPC models (FIG. 8C). The total mRNA expression of these 6 genes also tends to be upregulated in NEPC patients versus CRPC patients (FIG. 8D).

Example 7: Genes that Exhibit 3'UTR Lengthening Regulate Invasion and Proliferation of NEPC Lineage Plasticity Cells Functional studies were performed on two genes with newly discovered 3'UTR lengthening in NEPC patients, DUSP4 and FHIT, in LNCaP/AR shTP53/RB1 and C4-2/N-Myc cells. DUSP4 is a mitogen-activated protein kinase (MAPK) phosphatase that negatively regulates MAPK activity (Keyse et al., Cancer Metastasis Rev 2008; 27:253-61). FHIT is a P1-P3-bis (5'-adenosyl) triphosphate hydrolase involved in purine metabolism and is believed to act as a tumor suppressor and genome "caretaker" (Waters et al. *CMLS* 2014; 71:4577-87). Of note, DUSP4 has not been defined as an oncogene (OG) or tumor suppressor gene (TSG) based on mutation analysis in COSMIC. Additionally, neither the biological function nor 3'UTR regulation of DUSP4 and FHIT have been studied in NEPC and CRPC. Expression of these genes was knocked-down by siRNA (Dharmacon siRNA On-Target pool), followed by cell invasion assays and cell proliferation assays. Silencing of DUSP4 and FIT significantly inhibited cell invasion and/or proliferation, growth, and survival of LNCaP/AR shTP53/RB1 and C4-2/N-Myc cells (FIG. 9A-FIG. 9D). DUSP4 knockdown also significantly decreased cell proliferation of the NCI-H660 NEPC cell model (Aparicio, A. et al. *Prostate* 2011; 71:846-856) (data not shown). These results indicate that DUSP4 and FHIT play an oncogenic role in NEPC.

Example 8: Impact of 3'UTR Lengthening on of NEPC Lineage Plasticity Cells

To determine the extent to which 3'UTR lengthening affects expression of mRNAs and proteins and cell phenotypes of NEPC lineage plasticity cells, a 3'UTR CRISPR-dCas13d Engineering System (3'UTRCES) was developed to manipulate 3'UTR length. This system uses gRNA to guide catalytically dead Cas13d (dCas13d) to cis elements upstream and/or downstream of the predominant PAS, preventing binding of trans factors involved in cleavage and polyadenylation. The first step to engineer 3'UTR length is to implement the newly-developed plasmid system to identify usable dCas13d blocking sites (pSTUB, FIG. 10A and FIG. 10B), which is based on the previously reported pSTAR system (Jenal et al., *Cell* 2012; 149:538-53). It was discovered that gRNA-guided dCas13d blocking of the subcloned distal PAS (dPAS) site from the DUSP4 gene inhibited luciferase expression from pSTUB (FIG. 10C), demonstrating the feasibility of utilizing this dCas13d-based strategy to control PAS usage and mRNA production in live cells. The optimal gRNAs identified by this system are subcloned into the newly constructed dCas13d-gRNA all-in-one vector (hU6-pregRNA_EF1a-dCasRx-2A-EGFP) (FIG. 7F) or separate lentivirus dCas13d and gRNA vectors (FIG. 14 A). This will enable upcoming studies to engineer 3'UTR length changes in endogenous transcripts and to measure NEPC cell phenotypes after transfection/infection.

Example 9: The Biological Function, Molecular Regulation and Clinical Relevance of Genes with Lengthened 3'UTR in NEPC It was discovered that siRNA-mediated knockdown of the DUSP4 and FHIT genes with lengthened 3'UTR represses cell proliferation and/or invasion of LNCaP/AR shTP53/RB1 and C4-2/N-Myc cells. Building on this, the functional significance of all six genes (DUSP4, TUBB2B, ELAVL1, CHGA, MAP3K4, and FHIT) is assessed in the above two NEPC lineage plasticity models and two NEPC cell lines, NCI-H660 and MSKCC-EF1. The NCI-H660 cell is a bona fide patient-derived NEPC cell line harboring the hallmark TP53 mutation and RB1 deletion (Aparicio et al. *The Prostate* 2011; 71:846-56), while the MSKCC-EF1 (Park et al. *Science* 2018; 362:91-5) is also an NEPC cell line but derived from the MSK-PCa4 organoid (Gao et al. *Cell* 2014; 159:176-87). Previous studies also demonstrated that silencing of DUSP4 and FHIT significantly decreased NCI-H660 cell proliferation. Three genes that have the most significant in vitro cellular impact are selected and studied in in vivo xenograft models. Previous studies have found that silencing of some genes in NEPC lineage plasticity models can restore sensitivity to the AR antagonist enzalutamide (Mu et al. *Science* 2017; 355:84-8; Yin et al. *Molecular Cancer* 2019; 18:11). If silencing genes associated with 3'UTR lengthening restores sensitivity to the AR antagonist enzalutamide in NEPC lineage plasticity models in vitro, then mouse xenograft models are performed. To identify key cis-regulatory elements within the lengthened portion of the 3'UTR that might regulate the abundance of the encoded protein, a reporter gene-based truncation strategy is used as described previously (Chen et al. *Genome Research* 2018, 28:285-294). Finally, the clinical relevance of 3'UTR lengthening is determined by examining the protein expression levels of 3'UTR-controlled genes during prostate cancer progression to NEPC.

Cell Line Source and Authentication

LNCaP/AR shTP53/RB1 and its paired LNCaP/AR shNT, and C4-2/N-Myc and its paired C4-2/Vector were authenticated as described previously (Mu et al. *Science* 2017; 355:84-8; Yin et al, *Molecular Cancer* 2019; 18:11). MSKCC-EF1 is obtained and authenticated as described (Park et al. *Science* 2018; 362:91-5; Gao et al. *Cell* 2014; 159:176-87). NCI-H660 was obtained from the American Type Culture Collection (ATCC) and have been authenticated by short tandem repeat (STR) profiling and karyotyping. All the cell lines are passaged for less than 6 months after resuscitation. The cell lines are routinely tested to ensure they are free of *mycoplasma* contamination (Venor™ GeM *Mycoplasma* Detection Kit, Sigma-Aldrich, St. Louis, MO).

Examination of the Functional Significance of 3'UTR Lengthened Genes In Vitro

Cell proliferation and invasion are measured after knocking down of each of the six candidate genes in LNCaP/AR shTP33/RB1, CA-2/N-Myc, NCI-H660 and MSKCC-EF1 cells. Briefly, cells are transfected with two independent siRNAs for each gene. Cell proliferation is measured using the WST-1 cell proliferation assay (Roche, Basel, Switzerland), BrdU incorporation assay (Cell Signaling Technology. Danvers, MA) and direct cell counting, and cell invasiveness will be determined using a Matrigel® invasion assay (Becton Dickinson, Franklin Lakes, NJ) as previously described (Wang et al. *Cell* 2009; 138:245-56; Wang et al. *Cancer Research* 2011; 71:4866-76). Cell proliferation of NEPC cell lines transfected with siRNAs targeting candidate genes is measured in the presence and absence of 10 µM enzalutamide, as described previously (Mu et al. *Science* 2017; 355:84-8; Yin et al., *Molecular Cancer* 2019; 18:11).

Examination of the Role of 3'UTR Lengthened Genes in NEPC Growth In Vivo

Three candidate genes that have the most significant impact on in vitro proliferation are selected and studied in in vivo xenograft models of one NEPC lineage plasticity model (LNCaP/AR shTP53/RB1) and one NEPC model (NCI-H660). LNCaP/AR shTP53/RB1 and NCI-H660 xenografts are conducted as described in previous studies (Mu et al. *Science* 2017; 355:84-8; Wang et al. *Cancer Research* 2011; 71:4866-76; Beltran et al. *Cancer Discovery* 2011; 1:487-95; Chen et al. *PNAS* 2018; 115:6810-5). As prostate cancer only occurs in men, only male mice are used. Briefly, male, 5-6-week-old, Balb/c athymic nude mice from Charles River Laboratories are acclimated for 1 week in a pathogen-free enclosure before the start of the study. shRNA-encoding genes are cloned into the pLKO.1-TRC Cloning Vector (Addgene #10878), and cells are infected with lentivirus encoding specific shRNA against target genes or control shRNA. At 48 hours post-infection, 100-µl cell suspensions ($2 \times 10^6$ LNCaP/AR shTP53/RB1 or $1 \times 10^6$ NCI-H660 cells) is inoculated subcutaneously into castrated mice.

A biostatistician performs power and sample size calculations and statistical analysis. The in vitro experiments are performed at least in triplicate. Between-group significance is assessed using ANOVA. Sample sizes for in vivo xenograft experiments are based upon previous experience and power calculations for detecting biologically relevant changes in tumor mass (Wang et al. *Cancer Research* 2011; 71:4866-76; Chen et al. *PNAS* 2018; 115:6810-5). A sample size of n=10/group is necessary to detect a 35% treatment effect on tumor mass (primary outcome) assuming up to 15% deviation, with a $p<0.05$ and $\beta=0.8$. To ensure 10 evaluable mice per group, twelve mice are used (n=12/group) to account for an estimated 90% engraftment rate or rare complications of surgical procedures. These sample sizes are used in an exploratory experiment to verify our assumptions and estimates of variability. If necessary, the samples sizes of subsequent experiments are adjusted based on the results.

Mice are monitored and tumor size quantified 3 times weekly. At the time point at which the average tumor diameter reaches 1 cm for tumors expressing shRNA control, mice are sacrificed. Tumors are excised, measured with callipers for final tumor volume, and weighed to calculate the tumor mass. Tissues are formalin fixed and paraffin embedded (FFPE) with sections stained by H&E for visual descriptive evaluation and by IHC techniques for Ki67 (proliferation index) and ApopTag (apoptosis index) (Wang et al. *Cancer Research* 2011; 71:4866-76; Chen et al. *PNAS* 2018; 115:6810-5; Liao et al. *The Prostate* 2006; 66:945-53; Liao et al. *The Prostate* 2005; 64:186-99). Indices of proliferation and apoptosis are utilized as secondary biomarkers of castration-resistant growth. Data for tumor mass (primary outcome), tumor size, tumor growth rate, proliferative index, and apoptotic index is evaluated by ANOVA. If the candidate genes can restore sensitivity of LNCaP/AR shTP53/RB1 to enzalutamide in vitro, then one gene with the most potent effect in vitro is selected and studied using xenograft studies in mice treated with 10 mg/kg enzalutamide orally one day after grafting, as described previously (Mu et al. *Science* 2017; 355:84-8).

Identification of Key Cis-Regulatory Elements in the Lengthened 3'UTR.

3'UTR is generally shortened in transcripts from cancer cells vs. normal/non-cancer cells, resulting in activation of target proto-oncogenes through escape of microRNA (miRNA)-mediated repression. Surprisingly, we found that 3'UTR is significantly lengthened during prostate cancer progression from CRPC to NEPC (FIG. 1A and FIG. 1B). Given that distinct cis-elements in long 3'UTR isoforms can recruit specific RNA binding proteins (RBPs) regulating 3'UTR target genes (Mayr C. *Annu Rev Genet* 2017, 51:171-94), molecular regulation of genes with lengthened 3'UTR is studied by mapping the key cis-regulatory elements in the longer 3'UTR of candidate genes.

As the two genes with lengthened 3'UTR (DUSP4 and FHIT) play oncogenic roles in vitro (FIG. 9A-FIG. 9E) and oncogenes are often overexpressed in cancer, it's possible that the cis-elements in the long 3'UTR promote translation of genes with long 3'UTRs through recruiting specific RBPs. The full-length 3'UTR (including the distal PAS) with mutated proximal PAS, gradually truncated 3'UTR fragments from the full-length 3'UTR, or the short isoform of 3'UTR (with proximal PAS only) are subcloned into the Dual-Luciferase® Reporter (DLR™) Assay System (Promega, Madison, WI). These plasmids are used to assess the impact of 3'UTR length on luciferase production. A previous study using a similar reporter gene-based truncation strategy has identified a cis-regulatory element in the 3'UTR of the long isoform of the Rras2 transcript that regulates cellular senescence (Chen et al. *Genome Research* 2018, 28:285-294). After the key cis-regulatory elements are identified, RBPmap (Paz et al. *Nucleic Acids Research* 2014; 42:W361-7) is searched for potential RBPs that recognize these elements and regulate the luciferase activity. To test if the candidate RBPs are functional, the luciferase activity of long and short isoform 3'UTR from the candidate transcripts is measured after siRNA-based knocking down of the RBPs. Finally, to examine whether the candidate RBPs directly bind to the identified cis-regulatory elements, RNA immunoprecipitation is performed followed by quantitative RT-PCR assays (Zhao et al. *Science* 2008; 322:750-6).

Figure 11:
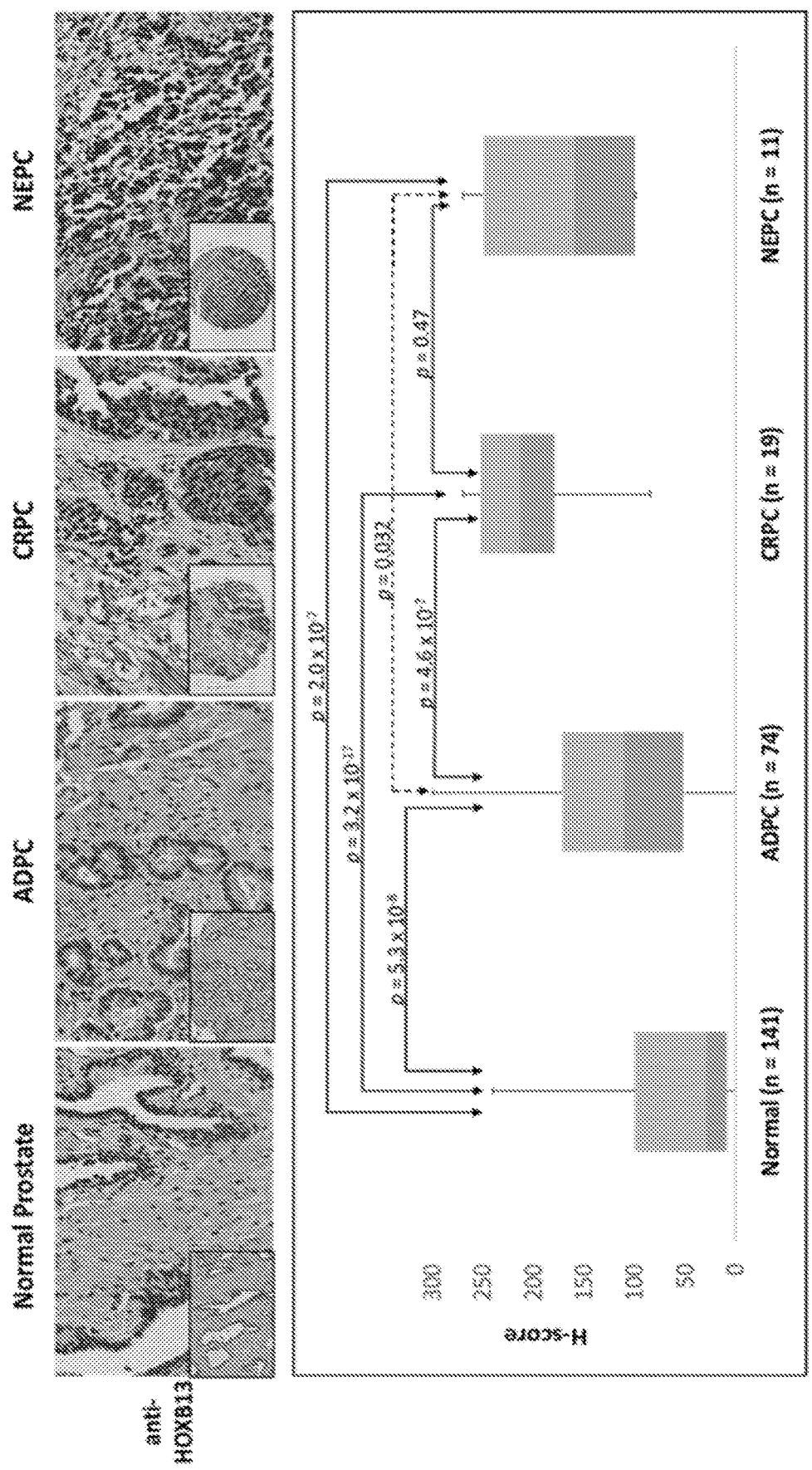
FIG. 11 shows IHC analysis of protein expression during prostate cancer progression. Upper panel. Representative HoxB13 immunoreactivity in human normal prostate, ADPC, and CRPC and NEPC tissues. Lower panel. A box plot compares H-scores of HoxB13 nuclear staining. The data were analyzed by ANOVA followed by post-hoc t-tests.

Immunohistochemistry (IHC) Analysis of Protein Products of Genes with Lengthened 3'UTR During Prostate Cancer Progression to NEPC To examine the protein expression of the above three candidate genes with the strongest functional significance, IHC is performed with tumor microarrays (TMAs) containing 150 normal prostate (from patients whose prostate was removed due to benign prostatic hyperplasia [BPH] or bladder cancer), 150 ADPC, 50 CRPC, and 50 NEPC specimens using specific antibodies. Initially, optimal staining procedures (antibody dilution, secondary antibodies and detection methods) are defined using paraffin embedded cell blocks from positive and negative control cells and are tested on anonymous human prostate cancer and normal prostate samples. Slides are digitally scanned using a whole slide scanner (Leica, Buffalo Grove, IL). H-scores are assigned by two urological pathologists. These scores range from 0 to 300 and are calculated as the product of the Intensity Score for the epithelial region of maximum staining intensity of candidate protein in each sample (assigned on a scale from 0 to 3) and multiplied by the percentage of epithelial cells in that sample showing maximum staining intensity (0%-00%). In a proof-of-principle experiment to examine expression of a protein during prostate cancer progression to NEPC, it was discovered that HoxB13 expression increases from ADPC to CRPC and from ADPC to NEPC, but shows no difference between CRPC and NEPC (FIG. 11).

Results

Silencing of all or a subset of the six candidate genes decreases cell proliferation/invasion of NEPC plasticity models and NEPC models. The small group of candidate genes picked out from the in vitro assays exhibit strong tumor repression effects after knockdown in xenograft models. Some of the functional genes may be required for lineage plasticity (i.e. silencing of these genes can restore sensitivity to enzalutamide (Mu et al. *Science* 2017; 355: 84-8)), while others may be required for NEPC growth, but not for lineage plasticity. Distinct cis-regulatory elements in the 3'UTR of the long isoform can promote target gene protein production, which may be caused by increasing mRNA stability and/or mRNA translation (Tian et al. *Nat Rev Mol Cell Biol* 2017; 18:18-30). However, as 3'UTR APA may also affect protein localization, it is possible that there is no difference in luciferase production between long 3'UTR and short 3'UTR. If that is the case, protein localization is compared between candidate genes with long and short 3'UTR. Briefly, N-terminal GFP fusion target genes containing full-length or shortened 3'UTR are transfected into NEPC models, and fluorescence confocal microscopy is used to visualize the GFP localization in transfected cells as described previously (Berkovits et al. *Nature* 2015; 522: 363-7). Similarly, for IHC experiments, candidate gene protein expression will increase from CRPC to NEPC patient samples, immunofluorescent detection is used as a backup strategy to determine target protein localization in patient tissues (Zhou et al. *Oncogene* 2017; 36:3312-21).

Figure 9A:
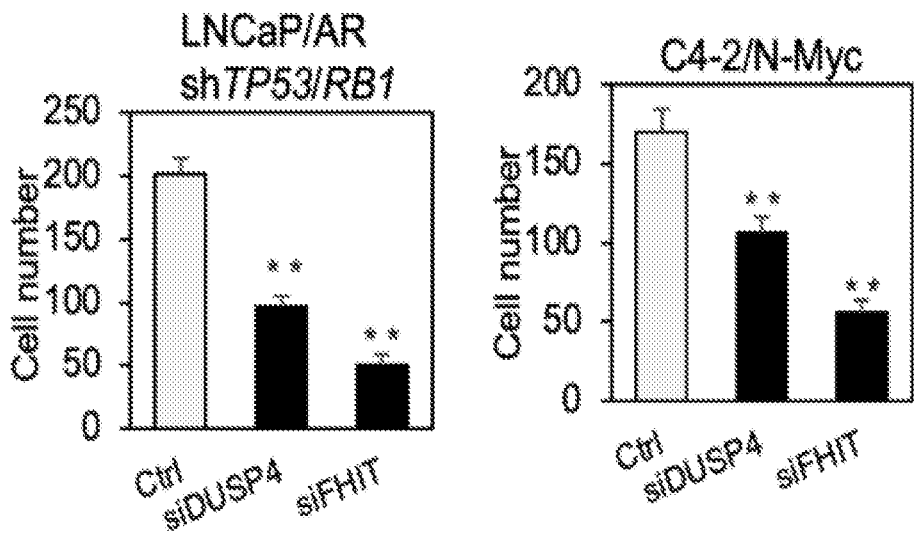
FIGS. 9A-9D show that genes that exhibit 3'UTR lengthening regulate invasion and proliferation of NEPC lineage plasticity cells.
Figure 9B:
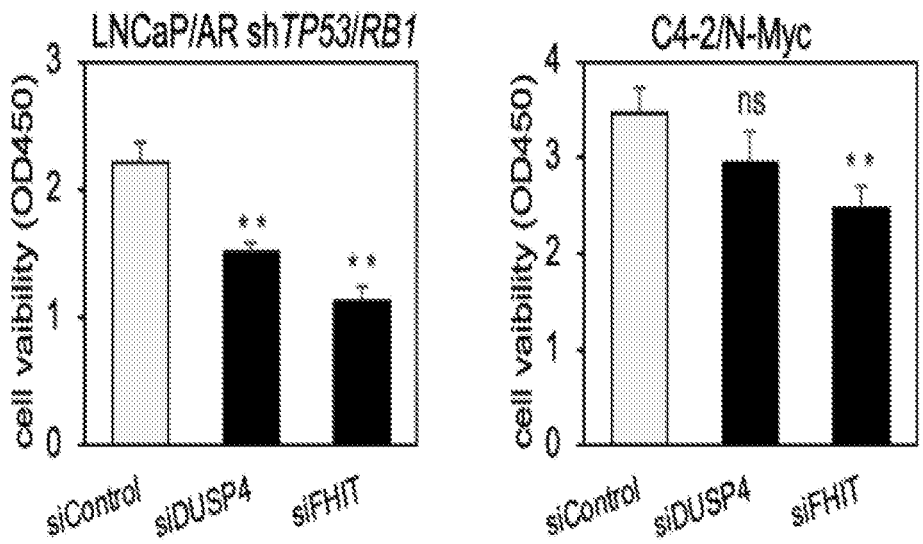
Figure 9C:
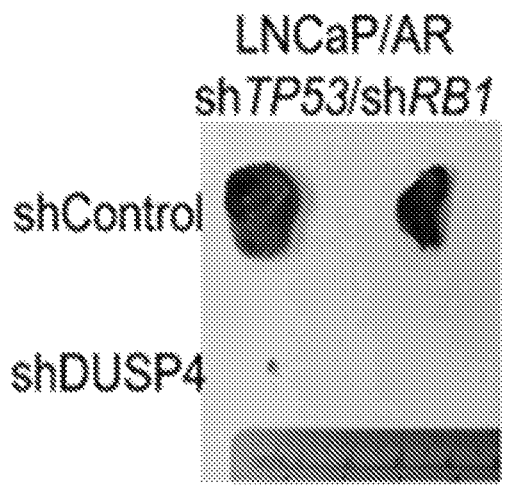
Figure 9D:
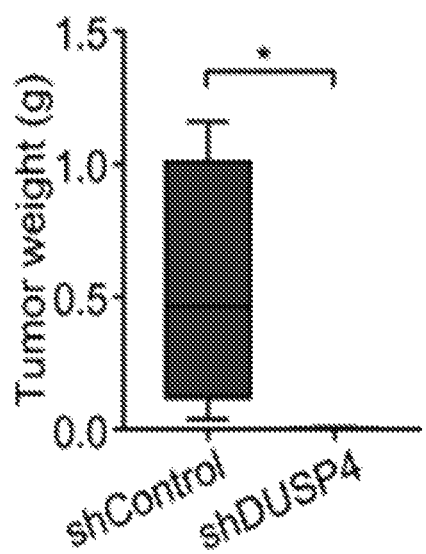
Figure 10A:
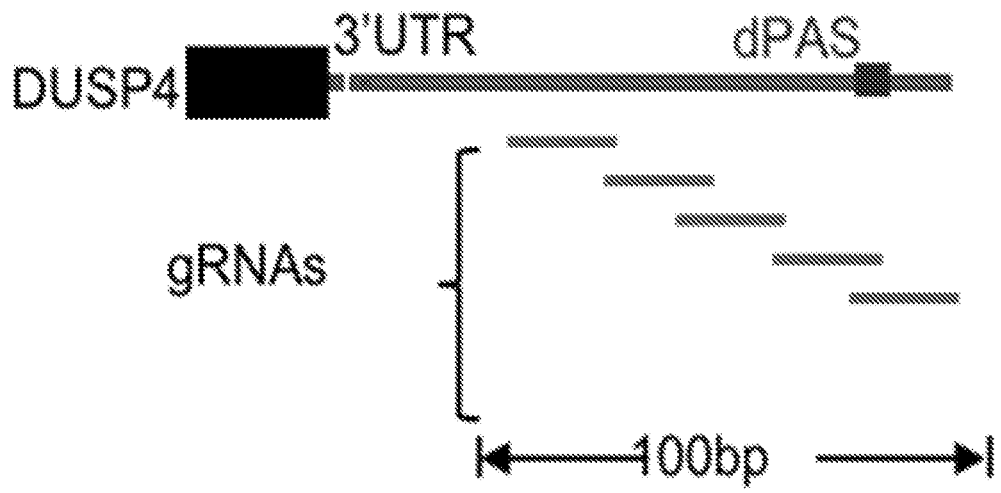
FIGS. 10A-10C show manipulation of 3'UTR lengths by 3'UTRCES.
Figure 10B:
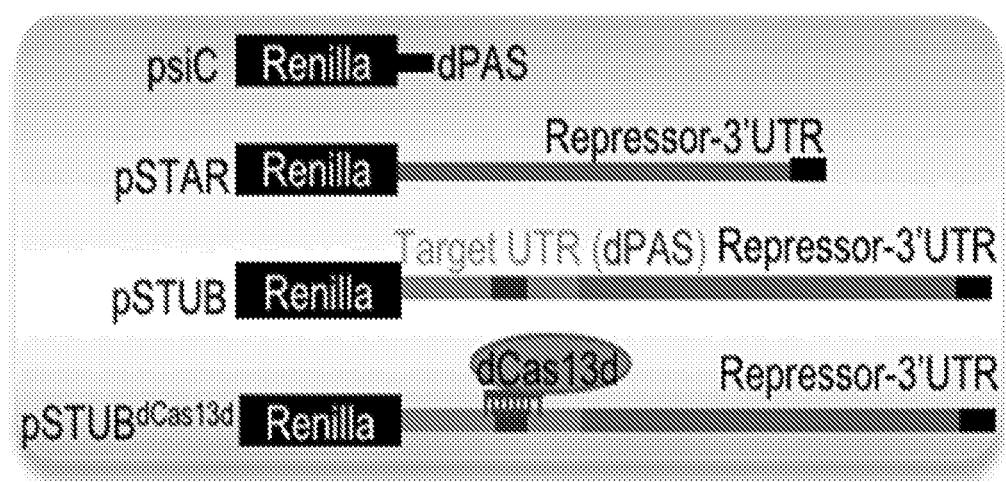
Figure 10C:
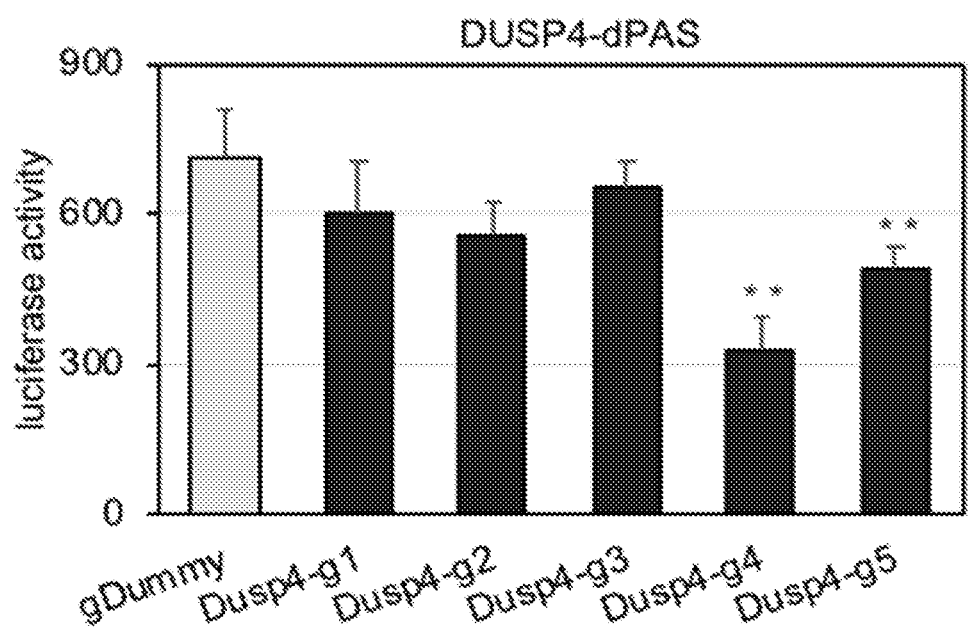

Example 10: Molecular and Biological Impact of Engineering 3'UTR Length by 3'UTRCES in NEPC Since genes with lengthened 3'UTR can promote NEPC lineage plasticity cell growth and invasion (FIGS. 9A-9E), it's possible that reversing the lengthened 3'UTR can impact target gene function and thus decrease NEPC progression. While manipulated expression of polyadenylation machinery factors (e.g. CF1M25) can globally regulate 3'UTR length (Masamha et al. *Nature* 2014; 510:412-6; Brumbaugh et al. *Cell* 2018; 172:106-20 e21), current technologies are not able to directly modify the length of a desired 3'UTR. A strategy to block the binding of APA regulatory factors to the distal PAS (dPAS) of a specific mRNA can be used to promote the usage of the proximal PAS (pPAS). This can be accomplished through Cas13d, which belongs to the CRISPR type VI family and can specifically target RNA with guidance from gRNA (Konermann et al. *Cell* 2018; 173:665-76 e14). It was demonstrated that dCas13d can block dPAS usage of the DUSP4 gene (FIGS. 10A-10C). Here, 3'UTRCES are employed to manipulate the 3'UTR length of candidate genes. The molecular impact of 3'UTR engineering on target gene function are determined by a series of experiments including RT-PCR, RNA-seq, mRNA stability assays, western blots, etc. The biological impact of 3'UTR manipulation is determined by cell growth and survival assays in vitro and/or in vivo.

Determination of the Molecular Impact of 3'UTR Engineering on Target Gene Function.

The pSTUB system was developed to identify the optimal gRNAs for 3'UTR length manipulation. Preliminary studies have identified gRNAs for blocking the dPAS of DUSP4 (FIGS. 10A-10C). The dPAS of three target genes with the strongest functional significance in vitro are cloned into pSTUB. For each gene, at least 5 gRNAs are designed, and pSTUB, dCas13d and the gRNA are co-transfected into NEPC plasticity models and NEPC models using Lipofectamine® 3000 (Invitrogen, Carlsbad, CA). gRNAs predicted to not to recognize any genomic regions are transfected as controls. Luciferase activity will be measured by microplate reader (SpectraMax™ M3, Molecular Devices, Inc., San Jose, CA). For manipulation of 3'UTR length in NEPC cells, control gRNAs and 2-3 target gRNAs with the most manipulation efficiency are picked out from our pSTUB screening and cloned into the all-in-one vector (FIG. 7F) or separate lentivirus dCas13d and gRNA vectors (FIG. 14 A). Lentivirus encoded control or gene specific dPAS are applied to infect NEPC cell lines. The long isoforms, short isoforms and total mRNA of target genes are detected by 3' End qRT-PCR 48 hours after cell infection as described previously (Jenal et al. Cell 2012; 149:538-53). As a proof-of-concept, 3'UTRCES were used to manipulate the 3'UTR length of the endogenously expressed DUSP4 gene in two NEPC plasticity models. It was found that dCas13d blocking of the DUSP4 dPAS significantly decreased the ratio of long isoform mRNA/total mRNA of DUSP4 (FIG. 12A-FIG. 12C).

To determine whether 3'UTRCES has off-target effects, RNA-seq is conducted as previously described (Chen et al., *Nature Communications* 2015; 6:8323) using lentivirus infected NEPC cells. RNA is extracted using the RNeasy® Mini Kit (Qiagen, Hilden, Germany). cDNA libraries are constructed using the Illumina TruSeq® RNA Sample Prep Kit. 50 bp reads are generated on the NovaSeq™ 6000 platform. Two biological replicates for each sample are prepared. Read alignment will is conducted using TopHat 2.0.13. 3'UTR usage is analyzed by DaPars (Xia et al. *Nature Communications* 2014; 5:5274), and differential gene expression is determined by Partek Genomics Suite as described previously (Chen et al. *Nature Communications* 2015; 6:8323). To determine the impact of 3'UTR manipulation on the molecular function of its corresponding genes, the following analyses are performed using lentiviral infected NEPC cells: (a) To determine whether 3'UTR manipulation affects mRNA stability, mRNA half-life is measured by blocking new RNA synthesis using the transcription inhibitor actinomycin D and measuring residual mRNA at different time points by real time PCR; (b) To determine if 3'UTR length changes affect mRNA translation, short or long 3'UTR of candidate genes are cloned into the Dual-Luciferase® Reporter (DLR™) Assay System (Promega, Madison, WI) separately and transfected into NEPC cells. Luciferase activity will be determined as described above. In addition, the effect of 3'UTR manipulation on expression of endogenous proteins is determined by western blot analysis; (c) To assess the impact of 3'UTR length changes on mRNA nuclear export and localization, cellular fractions are obtained (Yuan et al. *Aging Cell* 2017; 16:726-37), and target gene mRNA distribution ratio between cytoplasm and nucleus is determined by qRT-PCR; (d) To determine if 3'UTR manipulation influences protein localization, cell immunofluorescence is performed as described previously (Yuan et al. *Cell Death & Disease* 2018; 9:518).

Determination of the Biological Impact of 3'UTR Engineering on Target Gene Function.

Figure 13:
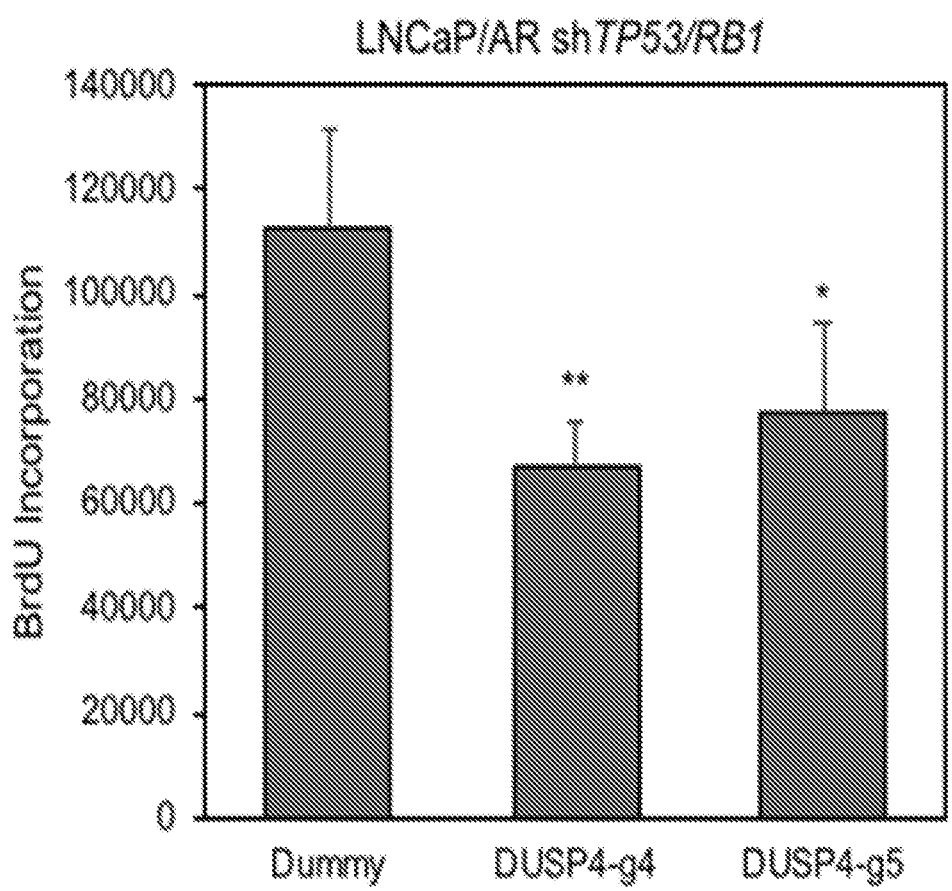
FIG. 13 is a graph showing manipulation of 3'UTR length of the endogenous expressed DUSP4 impairs NEPC cell growth. LNCaP/AR shTP33/RB1 cells were transfected with dCas13d-gRNA all-in-one vector (FIG. 7F) bearing Dummy, DUSP4-g4 or DUSP4-g5 gRNA, and cell proliferation was determined by BrdU incorporation assays at day 5 post-transfection**, P<0.01, *, P<0.05.

The effects of dCas13d blocking of the dPAS within candidate gene 3'UTR on NEPC growth are first determined in vitro. For each target gene, control gRNA and 2-3 gRNAs with the most significant manipulation efficiency are subcloned into the all-in-one vector (FIG. 7F) or separate lentivirus dCas13d and gRNA vectors (FIG. 14 A). NEPC cells are transfected/infected with control or dPAS-specific vector, and cell proliferation and invasion assays are performed as described above. The effect of dCas13d blocking of the dPAS of the DUSP4 3'UTR and found that LNCaP/AR shTP53/RB1 cell proliferation significantly decreased (FIG. 13). This is consistent with the observation that DUSP4 silencing by siRNA decreases cell proliferation (FIG. 9B).

The in vitro studies are then extended to in vivo xenograft models. Lentivirus containing dCas13d and gRNA vectors infected LNCaP/AR shTP53/RB1 and NCI-H660 cells are inoculated subcutaneously into male, 5-6-week-old, Balb/c athymic nude castrated mice as described above. Tumor sizes and weights are measured, and histopathologic analysis is performed as described above. qRT-PCR is performed to measure the expression of total mRNA and mRNA isoforms with different 3'UTR lengths.

Results

The gRNA with the best engineering efficiency in the pSTUB system will shorten endogenous 3'UTR with the highest efficiency. To account for possible differences between the plasmid system and the endogenous gene, all functional gRNAs are selected for each 3'UTR from pSTUB. As 3'UTR APA may affect mRNA stability, translation, translation or protein localization (Tian et al. *Nat Rev Mol Cell Biol* 2017; 18:18-30), the impact of 3'UTRCES on all of these aspects is assessed. 3'UTR manipulation will affect one or more molecular processes, and will contribute to NEPC cell phenotypic changes. For molecular and cell phenotype assays, if differences between control and 3'UTRCES manipulated cells are not detected, the challenges of lentiviral vector delivery are addressed by optimizing lentivirus doses used to transduce the NEPC cell lines. The EGFP expression from dCasRx vector and the mcherry expression from gRNA vector (FIG. 14A) can be used to isolate GFP and mcherry positive cells by FACS before performing downstream functional analysis. Finally, RNA-seq will detect the presence or absence of significant off-target effects after 3'UTRCES manipulation of a target gene. These effects will be minimal, as previous studies have found that Cas13d guide RNAs exhibit few off-target effects (Konermann et al. *Cell* 2018; 173:665-76 e14).

Figure 14A:
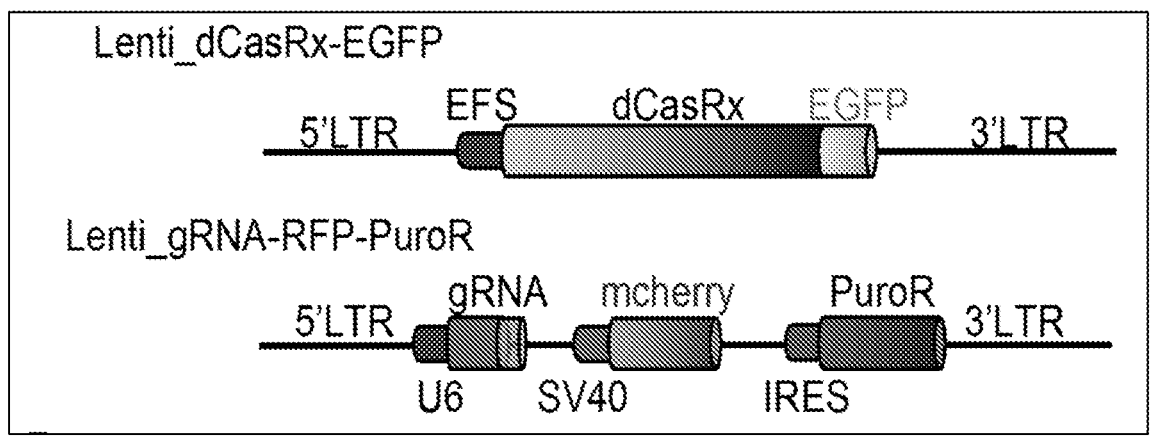
FIGS. 14A-14B show the design of the Lenti-gRNA-RFP-PuroR vector.
Figure 14B:
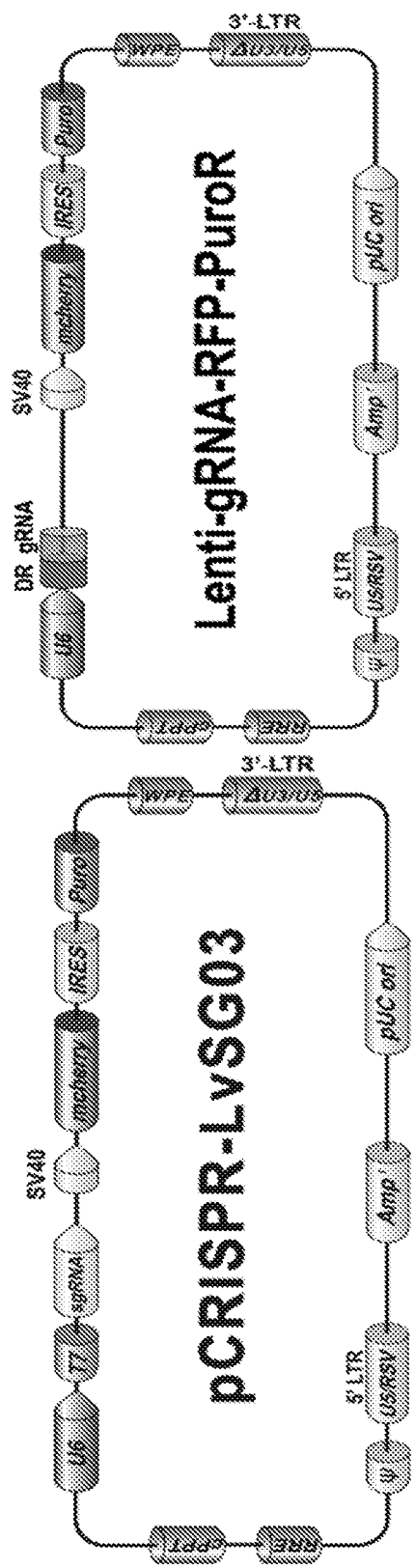

Example 11: Manipulation of 3'UTR Lengths of the Endogenously Expressed INPPL1 and SPSB1 Genes To examine the effect of 3'UTRCES on 3'UTR length changes of endogenous genes and CRPC cell phenotypes, gRNAs were inserted into the constructed Lenti-gRNA-RFP-PuroR vector bearing both mCherry and PuroR which can be used to generate stable cell lines (FIG. 14A and FIG. 14B).

The Lenti-gRNA-RFP-PuroR vector was generated based the pCRISPR-LvSG03 (GeneCopoeia, Inc.) by deleting T7 promoter, followed by inserting dCasRx DR and gRNA downstream of U6 promoter.

Figure 15A:
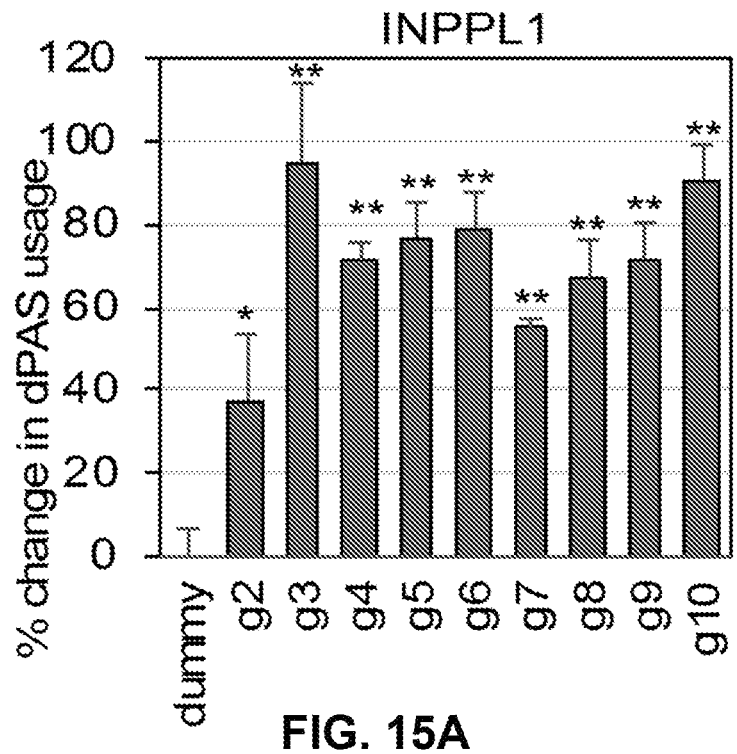
FIGS. 15A-15B are graphs showing manipulation of 3'UTR lengths of the endogenously expressed INPPL1 and SPSB1 genes in 22RV1 (CRPC) cells.
Figure 15B:
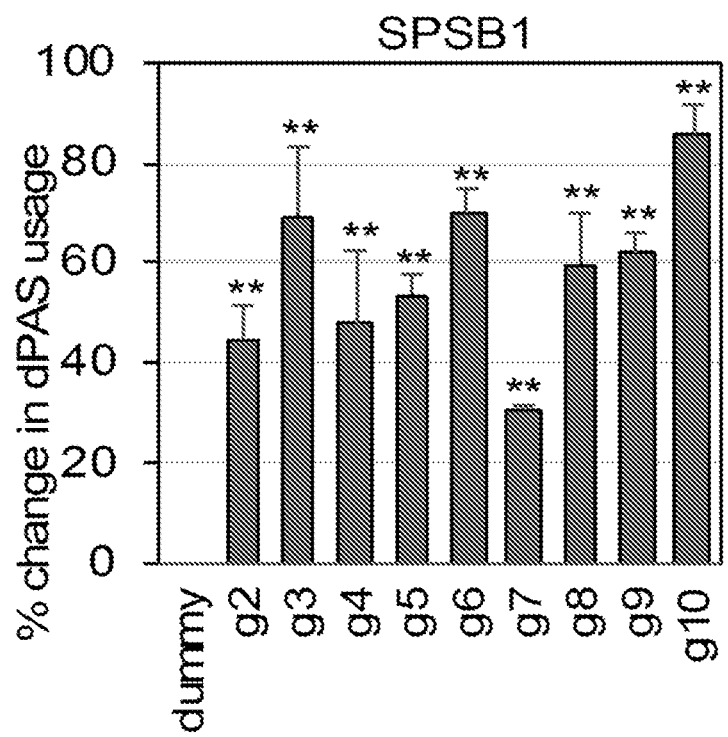

Based on the pSTUB results, g2-g10 of INPPL1 and SPSB1 were inserted into the Lenti-gRNA-RFP-PuroR vector, generated gRNA and dCas13d (dCasRx) lentivirus particles, and infected 22RV1 CRPC cells, which was confirmed by immunofluorescence of dCasRx (GFP) and gRNA (RFP) in 22RV1 after cells were infected with lentivirus particles. While all gRNA-guided dCas13d blocking of the pPASs significantly increased the usages of the dPAS of the INPPL1 and SPSB1 genes, g3, g6, and g10 infection generated the best blocking results with the best reproducibility (FIG. 15A and FIG. 15B). Similarly, it was found that dCas13d blocking of the DUSP4 dPAS significantly decreased the ratio of long isoform mRNA/total mRNA of DUSP4 (FIG. 12B and FIG. 12C).

Figure 16A:
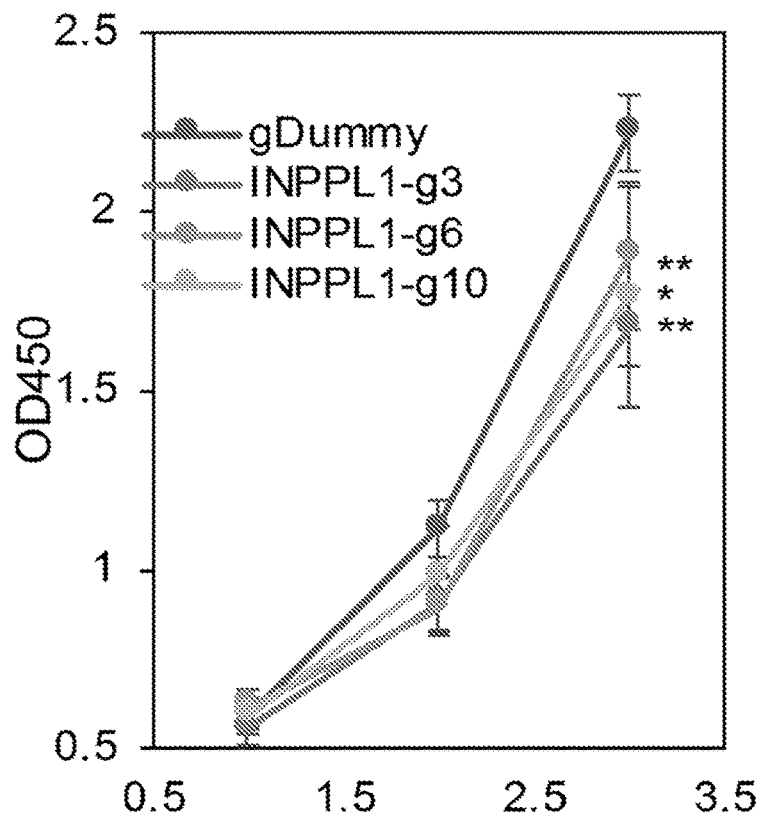
FIGS. 16A-16B show that blocking INPPL1 and SPSB1 proximal PASs by 3'UTECES inhibits 22RV1 CRPC cells growth.
Figure 16B:
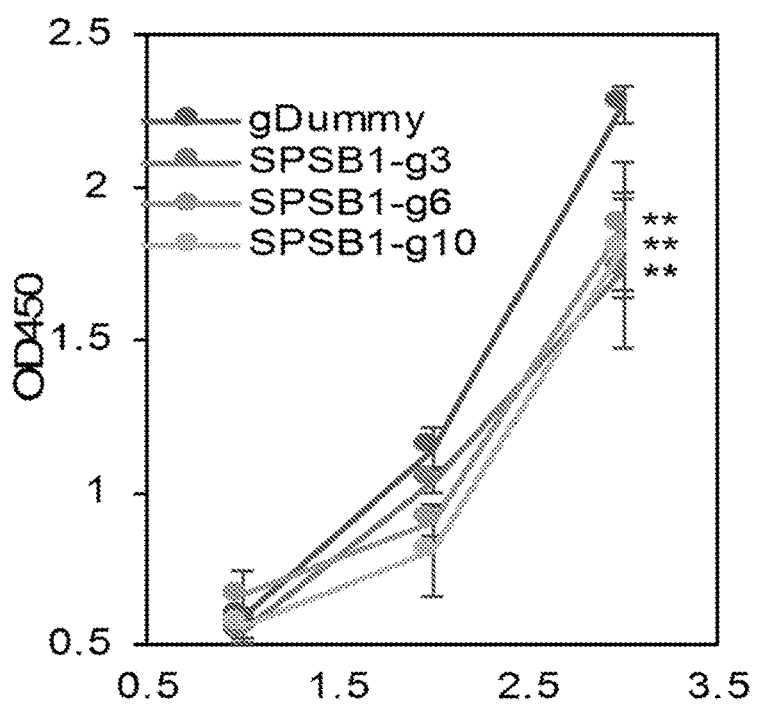

The effects of 3'UTRCES manipulation of INPPL1 and SPSB1 3'UTRs on CRPC growth was determined in vitro. Preliminary studies showed that infection of 22RV1 cells of dCasRx along with g3, g6 or g10 significantly decreased 22RV1 cell proliferation (FIG. 16A and FIG. 16B). The forward and reverse primers for the g3, g6 and g10 gRNAs for INPPL1 and SPSB1 3'UTRCES are shown in Table 4. Exemplary gRNA sequences for targeting INPPL1 and SPSB1 are shown in Table 5.

TABLE 4

Oligonucleotides that were used to create gRNAs for IXPPL1 and SPSB1 3'UTRCES

| Primer | Direction | 5'-3' Sequence |
|---|---|---|
| INPPL1_g1 | forward | ccccaataatattaaggtgctc (SEQ ID NO: 13) |
| INPPL1_g1 | reverse | gagcaccttaatattattgggg (SEQ ID NO: 14) |
| INPPL1-g2 | forward | caccccaaccaacccaataat (SEQ ID NO: 15) |
| INPPL1-g2 | reverse | attattggggttggttggggtg (SEQ ID NO: 16) |
| INPPL1-g3 | forward | gagatcctgccccaccccaacc (SEQ ID NO: 17) |
| INPPL1-g3 | reverse | ggttggggtggggcaggatctc (SEQ ID NO: 18) |
| INPPL1-g4 | forwatd | cactttatggctgagatcctgc (SEQ ID NO: 19) |
| INPPL1-g4 | reverse | gcaggatctcagccataaagtg (SEQ ID NO: 20) |
| INPPL1-g5 | forward | taagcaaactggcactttatgg (SEQ ID NO: 21) |
| INPPL1-g5 | reverse | ccataaagtgccagtttgctta (SEQ ID NO: 22) |
| INPPL1-g6 | forward | gacagtgagaactaagcaaact (SEQ ID NO: 23) |
| INPPL1-g6 | reverse | agtttgcttagttctcactgtc (SEQ ID NO: 24) |
| INPPL1-g7 | forward | cacagaccaggagacagtgaga (SEQ ID NO: 25) |
| INPPL1-g7 | reverse | tctcactgtctcctggtctgtg (SEQ ID NO: 26) |
| INPPL1-g8 | forward | agagcagggcagcacagaccag (SEQ ID NO: 27) |
| INPPL1-g8 | reverse | ctggtctgtgctgccctgctct (SEQ ID NO: 28) |
| INPPL1-g9 | forward | ccgtgcatccccagagcagggc (SEQ ID NO: 29) |
| INPPL1-g9 | reverse | gccctgctctggggatgcacgg (SEQ ID NO: 30) |
| INPPL1-g10 | forward | cccaccctgccgccgtgcatcc (SEQ ID NO: 31) |
| INPPL1-g10 | reverse | ggatgcacggcggcagggtggg (SEQ ID NO: 32) |
| INPPL1-g11 | forward | gaacctccctcccccaccctgc (SEQ ID NO: 33) |
| INPPL1-g11 | reverse | gcagggtggggagggaggttc (SEQ ID NO: 34) |
| SPSB1_g1 | forward | gtatacggacggcatgcaggga (SEQ ID NO: 35) |
| SPSB1_g1 | reverse | tccctgcatgccgtccgtatac (SEQ ID NO: 36) |
| SPSB1_g2 | forward | caaagagggttgtatacggac (SEQ ID NO: 37) |
| SPSB1_g2 | reverse | gtccgtatacaacccctctttg (SEQ ID NO: 38) |
| SPSB1_g3 | forward | tgtgtcttttttcaaagagggg (SEQ ID NO: 39) |
| SPSB1_g3 | reverse | cccctctttgaaaaaagacaca (SEQ ID NO: 40) |
| SPSB1_g4 | forward | gagtttattctctgtgtctttt (SEQ ID NO: 41) |
| SPSB1_g4 | reverse | aaaagacacagagaataaactc (SEQ ID NO: 42) |

TABLE 4-continued

Oligonucleotides that were used to create gRNAs for IXPPL1 and SPSB1 3'UTRCES

| Primer | Direction | 5'-3' Sequence |
|---|---|---|
| SPSB1_g5 | forward | gggctttcgtaggagtttattc (SEQ ID NO: 43) |
| SPSB1_g5 | reverse | gaataaactcctacgaaagccc (SEQ ID NO: 44) |
| SPSB1_g6 | forward | gagctcaatgtagggctttcgt (SEQ ID NO: 45) |
| SPSB1_g6 | reverse | acgaaagccctacattgagctc (SEQ ID NO: 46) |
| SPSB1_g7 | forward | ccgagcagattggagctcaatg (SEQ ID NO: 47) |
| SPSB1_g7 | reverse | cattgagctccaatctgctcgg (SEQ ID NO: 48) |
| SPSB1_g8 | forward | acccgtcccaccccgagcagat (SEC ID NO: 49) |
| SPSB1_g8 | reverse | atctgctcggggtgggacgggt (SEQ ID NO: 50) |
| SPSB1_g9 | forward | ggtgtgggaagcacccgtccca (SEQ ID NO: 51) |
| SPSB1_g9 | reverse | tgggacgggtgcttcccacacc (SEQ ID NO: 52) |
| SPSB1_g10 | forward | ccttctcccagaggtgtgggaa (SEQ ID NO: 53) |
| SPSB1_g10 | reverse | ttcccacacctctgggagaagg (SEQ ID NO: 54) |
| SPSB1_g11 | forward | aggtggctgcagccttctccca (SEQ ID NO: 55) |
| SPSB1_g11 | reverse | tgggagaaggctgcagccacct (SEQ ID NO: 56) |

TABLE 5 gRNA sequences for INPPL1 and SPSB1 3'UTRCES

| gRNA | 5'-3' (spacer sequence) |
|---|---|
| Human-INPPL1_g1 | CCCCAATAATATTAAGGTGCTC (SEQ ID NO: 57) |
| Human-INPPL1_g2 | CACCCCAACCAACCCCAATAAT (SEQ ID NO: 58) |
| Human-INPPL1_g3 | GAGATCCTGCCCCACCCCAACC (SEQ ID NO: 59) |
| Haman-INPPL1_g4 | CACTTTATGGCTGAGATCCTGC (SEQ ID NO: 60) |
| Human-INPPL1_g5 | TAAGCAAACTGGCACTTTATGG (SEQ ID NO: 61) |
| Human-INPPL1_g6 | GACAGTGAGAACTAAGCAAACT (SEQ ID NO: 62) |
| Human-INPPL1_g7 | CACAGACCAGGAGACAGTGAGA (SEQ ID NO: 63) |
| Human-INPPL1_g8 | AGAGCAGGGCASCACAGACCAG (SEQ ID NO: 64) |
| Human-INPPL1_g9 | CCGTGCATCCCCAGAGCAGGGC (SEQ ID NO: 65) |
| Human-INPPL1_g10 | CCCACCCTGCCGCCGTGCATCC (SEQ ID NO: 66) |
| Human-INPPL1_g11 | GAACCTCCCTCCCCCACCCTGC (SEQ ID NO: 67) |
| Hunan-SPSB1_g1 | GTATACGGACGGCATGCAGGGA (SEQ ID NO: 68) |
| Human-SPSB1_g2 | CAAAGAGGGGTTGTATACGGAC (SEQ ID NO: 69) |
| Human-SPSB1_g3 | TGTGTCTTTTTTCAAAGAGGGG (SEQ ID NO: 70) |
| Human-SPSB1_g4 | GAGTTTATTCTCTGTGTCTTTT (SEQ ID NO: 71) |
| Human-SPSB1_g5 | GGGCTTTCGTAGGAGTTTATTC (SEQ ID NO: 72) |
| Human-SPSB1_g6 | GAGCTCAATGTAGGGCTTTCGT (SEQ ID NO: 73) |
| Haman-SPSB1_g7 | CCGAGCAGATTGGAGCTCAATG (SEQ ID NO: 74) |

TABLE 5-continued gRNA sequences for INPPL1 and SPSB1 3'UTRCES

| gRNA | 5'-3' (spacer sequence) |
|---|---|
| Human-SPSB1_g8 | ACCCGTCCCACCCCGAGCAGAT (SEQ ID NO: 75) |
| Human-SPSB1_g9 | GGTGTGGGAAGCACCCGTCCCA (SEQ ID NO: 76) |
| Human-SPSB1_g10 | CCTTCTCCCAGAGGTGTGGGAA (SEC ID NO: 77) |
| Human-SPSB1_g11 | AGGTGGCTGCAGCCTTCTCCCA (SEQ ID NO: 78) |

Similarly, blocking of the distal PAS of the DUSP4 genes by g4 and g5 (FIG. 13) impaired NEPC cell growth in vitro.

The forward and reverse primers for the g4 and g5 gRNAs for DUSP4 3'UTRCES are shown in Table 6 and the gRNA spacer sequences are shown in Table 7.

TABLE 6

Oligonucleotides that were used to create gRNAs for DUSP4 3'UTRCES

| Gene | Direction | gRNA | Sequence |
|---|---|---|---|
| DUSP4 | forward | g4 | aataaataaaaccagacatatt (SEQ ID NO: 79) |
| DUSP4 | reverse | g4 | aatatgtctggttttatttatt (SEQ ID NO: 80) |
| DUSP4 | forward | g5 | tggttgaaaatgtatttatttt (SEQ ID NO: 81) |
| DUSP4 | reverse | g5 | aaaataaatacattttcaacca (SEQ ID NO: 82) |

TABLE 7 gRNA sequences for targeting DUSP4

| Gene | gRNA | 5'-3' (spacer sequence) |
|---|---|---|
| Human DUSP4 | g4 | AATAAATAAAACCAGACATATT (SEQ ID NO: 83) |
| Human DUSP4 | g5 | TGGTTGAAAATGTATTTATTTT (SEQ ID NO: 84) |

Conclusion

Alternative polyadenylation (APA) constitutes a major mechanism of epigenetic gene regulations. 3'UTR usage between proximal and distal PAS shifts during prostate cancer (PC) progression. 3'UTR shortening is associated with prostate cancer progression to CRPC, while genes with lengthened 3'UTR are involved in NEPC cell proliferation and invasion. 3'UTR length changes can be a biomarker of prostate cancer patient survival independent of gene expression levels. Genes with shortened 3'UTR are involved in CRPC cell proliferation, invasion, and colony formation. PAS in clinical prostate cancer samples can be validated in CRPC cell models by 3'RACE. Finally, 3'UTR length can be modulated by dCas13d mRNA editing system described herein.

Example 12: Lipid Nanoparticles to Encapsulate the 3'UTRCES

Lipid Nanoparticles (LNP) containing optimized ionizable amino lipids, helper lipids and other two formulations have demonstrated considerable utility for siRNA, mRNA, plasmid DNA without toxicity in vitro and in vivo. Moreover, the first siRNA drug approved by U.S. Food and Drug Administration (FDA), patisiran, was delivered by LNP. The LNP with optimized lipid composition and amino to phosphate charge ratios between total lipids and plasmids for the 3'UTRCES system delivery can protect them from serum breakdown when administrate in vivo, facilitating uptake into cells and encourage cytosolic release of the encapsulated 3'UTRCES and then support them entry into the nucleus.

LNP composition comprising DLin-KC2-DMA, DOPE, Cholesterol, PEG-DMG at the final molar ratio of 50:10:39:1 (Kulkarni et al. *Nanomedicine* 2017; 13:1377-87) can be used to encapsulate 3'UTRCES and inject these NPs into CRPC tumor-bearing mice to treat prostate cancer.

One skilled in the art will readily appreciate that the present disclosure is well adapted to carry out the objects and obtain the ends and advantages mentioned, as well as those inherent therein. The present disclosure described herein are presently representative of preferred embodiments, are exemplary, and are not intended as limitations on the scope of the present disclosure. Changes therein and other uses will occur to those skilled in the art which are encompassed within the spirit of the present disclosure as defined by the scope of the claims.

No admission is made that any reference, including any non-patent or patent document cited in this specification, constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinence of any of the documents cited herein. All references cited herein are fully incorporated by reference, unless explicitly indicated otherwise.

The present disclosure shall control in the event there are any disparities between any definitions and/or description found in the cited references.

The invention claimed is:

1. A system for modifying the length of a 3' untranslated region (UTR) of an mRNA transcript, the system comprising one or more nucleic acid molecules comprising:
   (i) a nucleic acid sequence encoding a direct repeat RNA sequence that can bind a catalytically dead Cas13;
   (ii) a nucleic acid sequence encoding a guide RNA (gRNA) sequence that can bind to a target site that is proximal and/or distal to a polyadenylation site (PAS) of the 3' UTR of the mRNA transcript; and
   (iii) a nucleic acid sequence encoding a catalytically dead Cas13, wherein the system causes modification of the length of the 3' untranslated region (UTR) of an mRNA transcript,
   wherein the one or more nucleic acids molecules are contained in one or more vectors and wherein the vector comprises the nucleic acid sequence set forth in SEQ ID NO: 02.

2. The system of claim 1, wherein components (i), (ii), and (iii) are located on the same nucleic acid molecule or components (i) and (ii) are located on the same nucleic acid molecule and component (iii) is located on a separate nucleic acid molecule.

3. The system of claim 1, wherein the catalytically dead Cas13 is Cas13d-NLS from Ruminococcus flavefaciens XPD3002 (dCasRx).

4. The system of claim 1, wherein the catalytically dead Cas13 is dCas13a, dCas13b, dCas13c, or dCas13d.

5. The system of claim 1, wherein the target site is proximal or distal to the PAS of the 3' UTR of the mRNA transcript.

6. The system of claim 1, wherein the mRNA transcript is from a CDC26, INPPLI, DLLI, HEATR3, SLC25A40, SPSBI, MRH, MED18, GABPA, TTC82 DUSP4, TUBB2B, ELAVL1, CHGA, MAP3K4, and/or FHIT gene.

7. The system of claim 1, wherein the vector comprises a dCas13d gRNA all-in-one vector or a lenti-gRNA-RFP-PuroR and a lenti-dCas13Rx-EGFP vector, wherein the dCas13 gRNA all-in-one vector comprises nucleic acid sequences encoding one or two nuclear localization peptides (NLS), a dCas13, an epitope tag, a linker peptide, a 2A self-cleaving peptide, and a fluorescent protein.

8. The system of claim 1, wherein the gRNA sequence targets an INPPLI mRNA transcript or a SPSBI mRNA transcript.

9. The system of claim 8, wherein the gRNA sequence is selected from the group consisting of SEQ ID NO: 17, SEQ ID NO: 18, SEQ ID NO: 23, SEQ ID NO: 24, SEQ ID NO: 31, SEQ ID NO: 32, SEQ ID NO: 39, SEQ ID NO: 40, SEQ ID NO: 45, SEQ ID NO: 46, SEQ ID NO: 53, SEQ ID NO: 54, SEQ ID NO: 59, SEQ ID NO: 62, SEQ ID NO: 66, SEQ ID NO: 70, SEQ ID NO: 73, and SEQ ID NO: 77.

10. The system of claim 1, wherein the gRNA sequence targets a DUSP4 mRNA transcript.

11. The system of claim 10, wherein the gRNA sequence is selected from the group consisting of SEQ ID NO: 79, SEQ ID NO: 80, SEQ ID NO: 81, SEQ ID NO: 82, SEQ ID NO: 83, and SEQ ID NO: 84.

12. A method of modifying the length of a 3' UTR of an mRNA transcript, the method comprising:
   introducing into a cancer cell the system of claim 1, wherein the system causes modification of the length of the 3' UTR of the mRNA relative to a cancer cell that has not been transformed with the system of claim 1.

13. The method of claim 12, wherein the modification of the 3' UTR causes the 3' UTR to increase, decrease, or stay about the same length.

14. The method of claim 12, wherein the modification of the 3' UTR prevents the progression of a prostate cancer cell to an advanced androgen-dependent prostate cancer (ADPC)

cell, castration-resistant prostate cancer (CRPC) cell, or a neuroendocrine prostate cancer (NEPC) cell.

15. The method of claim 12, wherein the system prevents PAS cleavage or polyadenylation.

16. The method of claim 12, wherein the cancer cell is a primary prostate cancer cell, an ADPC cell, a CRPC cell, or a NEPC cell.

17. A method of treating or preventing the progression of prostate cancer, the method comprising administering to a subject a therapeutically effective amount of the system of claim 1.

18. The method of claim 17, wherein the prostate cancer is CRPC or NEPC.

19. The method of claim 17, wherein the method further comprises improving sensitivity to an androgen receptor (AR) inhibitor.

20. The method of claim 19, wherein the AR inhibitor is enzalutamide, bicalutamide, abiraterone acetate, darolutamide or apalutamide.

21. The method of claim 17, wherein the system of claim 1 is contained in a lipid nanoparticle.

22. The method of claim 17, wherein the lipid nanoparticle consists of DLin-KC2-DMA, DOPE, Cholesterol, and PEG-DMG.

* * * * *